US010440459B2

(12) United States Patent
Smith et al.

(10) Patent No.: US 10,440,459 B2
(45) Date of Patent: Oct. 8, 2019

(54) ERGONOMIC EARPIECE

(71) Applicant: SureFire, LLC, Fountain Valley, CA (US)

(72) Inventors: Richard C. Smith, Costa Mesa, CA (US); Diann Y. Smith, Costa Mesa, CA (US)

(73) Assignee: SureFire, LLC, Fountain Valley, CA (US)

( * ) Notice: Subject to any disclaimer, the term of this patent is extended or adjusted under 35 U.S.C. 154(b) by 0 days.

(21) Appl. No.: 15/333,050

(22) Filed: Oct. 24, 2016

(65) Prior Publication Data
US 2017/0238079 A1    Aug. 17, 2017

Related U.S. Application Data

(63) Continuation of application No. 14/720,531, filed on May 22, 2015, now Pat. No. 9,479,856, which is a (Continued)

(51) Int. Cl.
*H04R 1/10* (2006.01)
*H04R 1/28* (2006.01)
(Continued)

(52) U.S. Cl.
CPC ............ *H04R 1/1016* (2013.01); *H04M 1/05* (2013.01); *H04M 1/6058* (2013.01); (Continued)

(58) Field of Classification Search
CPC .... H04R 1/1016; H04R 1/105; H04R 1/1066; H04R 1/1075; H04R 25/652
See application file for complete search history.

(56) References Cited

U.S. PATENT DOCUMENTS 1,614,987 A    1/1927    Bernhard et al.
1,668,890 A    5/1928    Curran et al.
(Continued)

FOREIGN PATENT DOCUMENTS

GB    2 085 694 A    4/1982

OTHER PUBLICATIONS

Howard Leight; "Detachable Earplugs"; http://howardleight.com/products/products1.asp?id=4;Oct. 17, 2005;1 page.
(Continued)

*Primary Examiner* — David Bilodeau
(74) *Attorney, Agent, or Firm* — Haynes and Boone, LLP

(57) ABSTRACT

A cable assembly for electronic devices such as cellular telephones and music devices is disclosed. The cable assembly can comprise either one or two earpieces, each of which is configured to be received into the concha of a user's ear. The earpiece(s) can be configured so as to be held in place by at least one anatomical structure of the concha. A speaker can be in acoustic communication with each earpiece. A cable can be configured to communicate a signal representative of sound from the electronic device to each earpiece. A microphone can be permanently attached or removably attachable to the cable to facilitate use with a cellular telephone. The cable assembly can facilitate hands free operation of a cellular telephone and can facilitate listening to a music device. Other implementations and related methods are also disclosed.

20 Claims, 56 Drawing Sheets

Related U.S. Application Data continuation of application No. 14/106,693, filed on Dec. 13, 2013, now Pat. No. 9,042,947, which is a continuation of application No. 13/198,308, filed on Aug. 4, 2011, now Pat. No. 8,611,969, which is a continuation-in-part of application No. 11/696,987, filed on Apr. 5, 2007, now abandoned, which is a continuation-in-part of application No. 11/618,344, filed on Dec. 29, 2006, now abandoned, and a continuation-in-part of application No. 11/411,314, filed on Apr. 26, 2006, now abandoned, said application No. 13/198,308 is a continuation-in-part of application No. 11/411,314, filed on Apr. 26, 2006, now abandoned, which is a continuation-in-part of application No. 11/247,105, filed on Oct. 11, 2005, now abandoned, said application No. 13/198,308 is a continuation-in-part of application No. 11/870,165, filed on Oct. 10, 2007, now abandoned, which is a continuation-in-part of application No. 11/403,646, filed on Apr. 13, 2006, now abandoned, which is a continuation-in-part of application No. 10/769,158, filed on Jan. 29, 2004, now Pat. No. 7,394,910, and a continuation-in-part of application No. 11/247,105, filed on Oct. 11, 2005, now abandoned, said application No. 13/198,308 is a continuation-in-part of application No. 11/869,931, filed on Oct. 10, 2007, now abandoned, which is a continuation-in-part of application No. 11/411,314, filed on Apr. 26, 2006, now abandoned, and a continuation-in-part of application No. 11/869,526, filed on Oct. 9, 2007, now abandoned, said application No. 13/198,308 is a continuation-in-part of application No. 11/618,317, filed on Dec. 29, 2006, now Pat. No. 8,548,395, which is a continuation-in-part of application No. 11/493,242, filed on Jul. 26, 2006, now abandoned, said application No. 13/198,308 is a continuation-in-part of application No. 12/852,179, filed on Aug. 6, 2010, now Pat. No. 8,879,769, which is a continuation of application No. 11/236,969, filed on Sep. 27, 2005, now Pat. No. 7,778,435.

(60) Provisional application No. 60/613,742, filed on Sep. 27, 2004.

(51) Int. Cl.
  *H04M 1/05* (2006.01)
  *H04M 1/60* (2006.01)
  *H04R 3/00* (2006.01)

(52) U.S. Cl.
  CPC .......... *H04R 1/105* (2013.01); *H04R 1/1033* (2013.01); *H04R 1/1041* (2013.01); *H04R 1/1066* (2013.01); *H04R 1/1075* (2013.01); *H04R 1/2876* (2013.01); *H04R 3/007* (2013.01); *H04R 2201/107* (2013.01); *H04R 2420/07* (2013.01); *H04R 2420/09* (2013.01); *Y10T 29/49005* (2015.01)

(56) References Cited

U.S. PATENT DOCUMENTS

| | | |
|---|---|---|
| 1,753,817 A | 4/1930 | Aber |
| 2,535,258 A | 12/1950 | Bland |
| 2,670,737 A | 3/1954 | Cantor |
| D176,810 S | 1/1956 | Norris |
| 2,763,334 A | 9/1956 | Starkey |
| 2,939,923 A | 6/1960 | Henderson |
| 3,041,856 A | 7/1962 | Neal |
| 3,045,073 A * | 7/1962 | Vickerson ............ H04R 25/65 381/109 |
| 3,226,501 A | 12/1965 | Seserman |
| 3,547,219 A | 12/1970 | Brothos |
| 3,614,344 A | 10/1971 | Gorike |
| 3,676,611 A | 7/1972 | Stephens |
| 3,787,643 A | 1/1974 | Nielsen |
| D237,090 S | 10/1975 | Yanagawa |
| 4,020,297 A | 4/1977 | Brodie |
| 4,138,598 A | 2/1979 | Cech |
| 4,160,449 A | 7/1979 | Wade |
| D272,904 S | 3/1984 | Kawano |
| 4,443,668 A | 4/1984 | Warren |
| 4,471,496 A | 9/1984 | Gardner et al. |
| 4,585,089 A | 4/1986 | Topholm |
| 4,588,868 A | 5/1986 | Bertagna et al. |
| 4,720,857 A | 1/1988 | Burris et al. |
| 4,724,922 A | 2/1988 | Kalayjian |
| 4,809,708 A * | 3/1989 | Geisler ............ A61B 5/121 600/552 |
| 4,864,610 A | 9/1989 | Stevens |
| 4,870,688 A | 9/1989 | Voroba et al. |
| 4,878,560 A | 11/1989 | Scott |
| 4,965,838 A | 10/1990 | Kamon et al. |
| 4,977,976 A | 12/1990 | Major |
| 5,048,092 A | 9/1991 | Yamagashi et al. |
| 5,110,161 A | 5/1992 | Bartholomew |
| 5,118,909 A | 6/1992 | Husting |
| 5,201,007 A | 4/1993 | Ward et al. |
| 5,298,692 A | 3/1994 | Ikeda et al. |
| 5,333,622 A | 8/1994 | Casali et al. |
| D350,961 S | 9/1994 | Nakamura |
| 5,412,736 A | 5/1995 | Keliiliki |
| 5,449,865 A | 9/1995 | Desnick et al. |
| 5,654,530 A | 8/1997 | Sauer et al. |
| 5,655,026 A | 8/1997 | Peters et al. |
| 5,659,156 A | 8/1997 | Mauney et al. |
| D383,757 S | 9/1997 | Dobrusskin et al. |
| 5,677,964 A | 10/1997 | Sun |
| D388,093 S | 12/1997 | Frengley |
| 5,757,932 A | 5/1998 | Lindemann et al. |
| 5,757,944 A | 5/1998 | Jensen et al. |
| 5,881,159 A | 3/1999 | Aceti et al. |
| 5,917,918 A | 6/1999 | Callahan |
| 5,923,522 A | 7/1999 | Sajna |
| 5,949,896 A | 9/1999 | Nageno et al. |
| 6,035,961 A | 3/2000 | Sun |
| 6,070,693 A | 6/2000 | Hamery |
| 6,101,260 A | 8/2000 | Jensen et al. |
| 6,122,388 A | 9/2000 | Feldman |
| 6,153,840 A | 11/2000 | Dreher |
| 6,181,254 B1 | 1/2001 | Vogele |
| D449,295 S | 10/2001 | Smith et al. |
| 6,332,345 B1 | 12/2001 | Huang |
| 6,386,314 B1 | 5/2002 | Sheehan et al. |
| 6,411,722 B1 | 6/2002 | Wolf |
| 6,427,018 B1 | 7/2002 | Keliiliki |
| 6,466,681 B1 | 10/2002 | Siska et al. |
| 6,484,726 B1 | 11/2002 | Remer et al. |
| D469,755 S | 2/2003 | Hlas et al. |
| D470,122 S | 2/2003 | Hlas et al. |
| D470,123 S | 2/2003 | Hlas et al. |
| 6,513,621 B1 | 2/2003 | Deslauriers et al. |
| D471,537 S | 3/2003 | Ham |
| 6,584,306 B2 * | 6/2003 | Mirabelli ............ H04M 19/04 455/347 |
| 6,681,022 B1 * | 1/2004 | Puthuff ............ H04R 1/105 379/431 |
| 6,695,093 B1 | 2/2004 | Falco |
| 6,704,429 B2 | 3/2004 | Lin |
| 6,741,719 B1 | 5/2004 | Orten |
| 6,810,987 B1 | 11/2004 | DeKalb |
| 7,010,275 B2 | 3/2006 | Davies |
| 7,027,608 B2 | 4/2006 | Fretz et al. |
| D523,845 S | 6/2006 | Smith et al. |
| 7,110,799 B1 | 9/2006 | Willins et al. |
| 7,127,078 B2 | 10/2006 | Mann et al. |
| 7,281,815 B1 | 10/2007 | Gustafson et al. |

(56) References Cited

U.S. PATENT DOCUMENTS

| | | | |
|---|---|---|---|
| D565,024 S | 3/2008 | Kim et al. | |
| D576,610 S | 9/2008 | Johnson | |
| D585,429 S | 1/2009 | Dean | |
| D585,881 S | 2/2009 | Nam et al. | |
| D618,218 S | 6/2010 | Burgett et al. | |
| D618,219 S | 6/2010 | Burgett et al. | |
| D621,817 S | 8/2010 | Brickstad | |
| D622,704 S | 8/2010 | Fahrendorff et al. | |
| D622,705 S | 8/2010 | Fahrendorff et al. | |
| 7,778,435 B2 | 8/2010 | Smith et al. | |
| D638,398 S | 5/2011 | Morison | |
| 7,949,127 B2 | 5/2011 | Pedersen et al. | |
| D641,737 S | 7/2011 | Krauss et al. | |
| D645,458 S | 9/2011 | Silvestri et al. | |
| D647,514 S | 10/2011 | Wikel et al. | |
| 8,054,985 B2 | 11/2011 | Doty | |
| 8,111,864 B2 | 2/2012 | Oliveira et al. | |
| 2001/0014618 A1 | 8/2001 | Martin et al. | |
| 2002/0005317 A1 | 1/2002 | Ohashi et al. | |
| 2002/0080990 A1 | 6/2002 | Lin | |
| 2002/0096391 A1 | 7/2002 | Smith et al. | |
| 2002/0172386 A1 | 11/2002 | Bayer | |
| 2002/0181729 A1 | 12/2002 | Smith | |
| 2002/0186858 A1 | 12/2002 | Masuda et al. | |
| 2003/0008688 A1* | 1/2003 | Fujino | H04B 1/3877 455/569.2 |
| 2003/0091210 A1* | 5/2003 | Baskerville | H04R 1/1016 381/380 |
| 2003/0174853 A1 | 9/2003 | Howes | |
| 2004/0137963 A1 | 7/2004 | Barras et al. | |
| 2004/0165742 A1 | 8/2004 | Shennib et al. | |
| 2004/0165743 A1 | 8/2004 | Bayer | |
| 2005/0008180 A1 | 1/2005 | Smith et al. | |
| 2005/0018838 A1 | 1/2005 | Meunier et al. | |
| 2005/0031146 A1 | 2/2005 | Baskerville | |
| 2005/0064915 A1 | 3/2005 | Lair | |
| 2005/0111686 A1 | 5/2005 | Bayer | |
| 2005/0143140 A1 | 6/2005 | Sanders et al. | |
| 2006/0035687 A1 | 2/2006 | Wong et al. | |
| 2006/0050917 A1* | 3/2006 | Skillicorn | H04B 1/385 381/384 |
| 2006/0133636 A1 | 6/2006 | Harvey et al. | |
| 2006/0148425 A1 | 7/2006 | Carlson | |
| 2007/0281725 A1 | 12/2007 | Hyatt | |
| 2008/0026699 A1 | 1/2008 | Smith | |
| 2008/0214223 A1 | 9/2008 | Klein | |
| 2008/0240485 A1 | 10/2008 | Dyer et al. | |
| 2012/0064845 A1 | 3/2012 | Smith et al. | |

OTHER PUBLICATIONS

Howard Leight; Banded Earplugs; http://howardleight.com/products/products1.asp?id=5; Oct. 17, 2005; 1 page.

Howard Leight; "Features for Every Worker", http://howardheight.com/products/products1.asp?id=2; Oct. 17, 2005; 2 pages.

Newagesafty.com; "Hearing Protection, 3 Foam Earplugs"; http://newagesafty.com/proddetail.php?prod=Ear1;Oct. 17, 2005;1 page.

3M Safety Products, 4130, Inconel, Titanium, http://65.61.148.23/category_s/45.htm; Oct. 17, 2005; 2 pages.

3M "Banded Hearing Protector", http://multimedia.mmm.com/mws/mediawebserver/dyn?BBBBBBkiuNQBWeCBB . . . , Oct. 17, 2005; 1 page.

3M United States; "3MTM Corded Expandable Ear Plugs 8658ES", http://products3.3m.com/catalog/us/em001/home_leisure/-/node_GS259KWRFRgs/root_ . . . ;Oct. 17, 2005;1 page.

3M "Reusable Earplugs", http://www.google.com/#hl=en&tbo=d&sclient=psy-ab&q=3M+Hearing+Protection++product+information+sheet&oq=3M+Hearing+Protection++product+information+sheet&gs_l=serp.3..33i2l12.350.2952.1.3010.25.22.0.1.1.0.281.3696.0j15j6.21.0.les%3B..0.0...1c.1.ppZvHanNH6l&pbx=1&bav=on.2,or.r_gc.r_pw.r_qf.&fp=e91a4d48e51ce469&bpcl=38625945&biw=1680&bih=955; Oct. 17, 2012; 1 page.

3M "Corded Reusable Earplugs", http://www.google.com/#hl=en&tbo=d&sclient=psy-ab&q=3M+Hearing+Protection++product+information+sheet&oq=3M+Hearing+Protection++product+information+sheet&gs_l=serp.3..33i2l12.350.2952.1.3010.25.22.0.1.1.0.281.3696.0j15j6.21.0.les%3B..0.0...1c.1.ppZvHanNH6l&pbx=1&bav=on.2,or.r_gc.r_pw.r_qf.&fp=e91a4d48e51ce469&bpcl=38625945&biw=1680&bih=955; Oct. 17, 2005; 1 page.

3M "Corded Reusable Earplugs with Case", http://www.google.com/#hl=en&tbo=d&sclient=psy-ab&q=3M+Hearing+Protection++product+information+sheet&oq=3M+Hearing+Protection++product+information+sheet&gs_l=serp.3..33i2l12.350.2952.1.3010.25.22.0.1.1.0.281.3696.0j15j6.21.0.les%3B..0.0...1c.1.ppZvHanNH6l&pbx=1&bav=on.2,or.r_.gc.r_pw.r_qf.&fp=e91a4d48e51ce469&bpcl=38625945&biw=1680&bih=955; Oct. 17, 2005; 1 page.

Howard Leight; "Features for Every Worker, Hearing Safety Tools for the Most Demand Environments"; hthttp://howardleight.com/products/products.asp; Oct. 17, 2005; 1 page.

Howard Leight; "Single-Use Earplugs"; http://howardleight.com/products/products1.asp?id=2; Oct. 17, 2005; page.

Howard Leight; "Multiple-Use Earplugs"; http://howardleight.com/products/products1.asp?id=1; Oct. 17, 2005; 1 page.

E-A-R Hearing Protection Products; "E-A-R® TaperFit® 2, Regular Size, Uncorded Bag"; Mar. 6, 2006; 1 page.

E-A-R Earplugs; Products Info/Free Samples/Quotes;http://www.e-a-r.com/e-a-r.com/prod._lit.cfm; Oct. 17, 2005;1 page.

E-A-R; E-A-R® Express® Pod Plugs with Blue Grips, 321-2100;http://www.e-a-r.com/e-a-r.com/pushin_detail.cfm?prod_family=Pod%20Plug%20Exp&ind_prod_num=321-2100001; Oct. 17, 2005; 1 page.

E-A-R® Push-Ins TM Earplugs; New E-A-R Push-Ins, No Roll, No Touch, No Problem; www.earpushins.com;Oct. 17, 2005;1 page.

E-A-R® ; New E-A-R Push-Ins, No Roll Down Earplugs; www.earpushins.com;Oct. 17, 2005;1 page.

E-A-R Hearing Protection Products; E-A-R® UltraFit® Plugs with Carring Case 340-4001;http://www.e-a-r.com/e-a-r.com/premold_detail.cfm?prod_family=UltraFit&ind_prod_num=340-4001001;Oct. 17, 2005; 1 page.

E-A-R®; New the Improves UltraFit Costs Even Less Protects Even More; www.ultrafitoffer.com;Oct. 17, 2005;1 page.

E-A-R ; "New E-A-R® UltraFit EarPlugs"; Oct. 17, 2005; www.ultrafitoffer.com; 1 page.

E-A-R Hearing Protection Products; "Professional Musician E-A-R® Plugs aka, HI-1 410-3019"; http://www.e-a-r.com/e-a-r.com/premold_detail.cfm?prod_family=Hi-Fi&ind_prod_num=410-301900110/17/2005;Oct. 17, 2005;1 page.

Blasts tm Disposable E-A-R® Plugs; http://209.000.67.149/aosafety.com/shooters/products/ear_02.htm; Oct. 17, 2005; 1 page.

Indoor/Outdoor Range E-A-R® Plugs; HTTP://209.200.67.149/aosafety.com/shooters/products/ear_03.HTM.; Oct. 17, 2005; 1 page.

Otto Communications Advertisement, "Stick It in Your Ear", Law Enforcement Technology, Jul. 1998, p. 55.

Otto Communications Advertisement/Brochure Insert, "Which Communication Product Isn't Offered by Otto?," 1 page, Carpentersville, IL.

Otto Communications Product Brochure, 5 pages, "Your Specialist in Two-Way Radio Accessories".

* cited by examiner

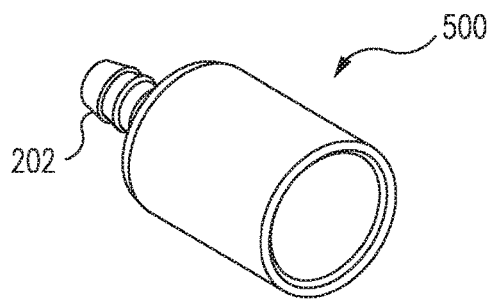
FIG. 5
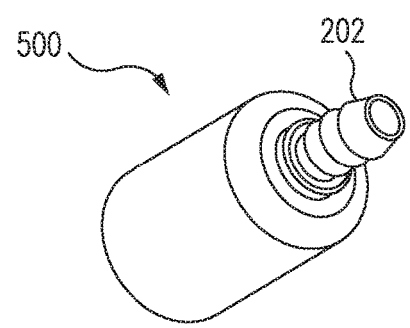
FIG. 6
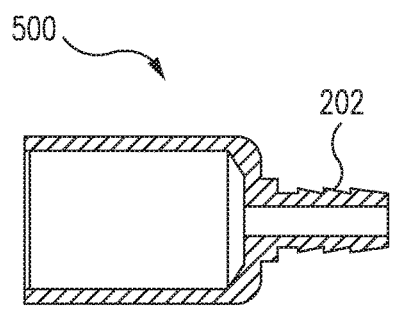
FIG. 7
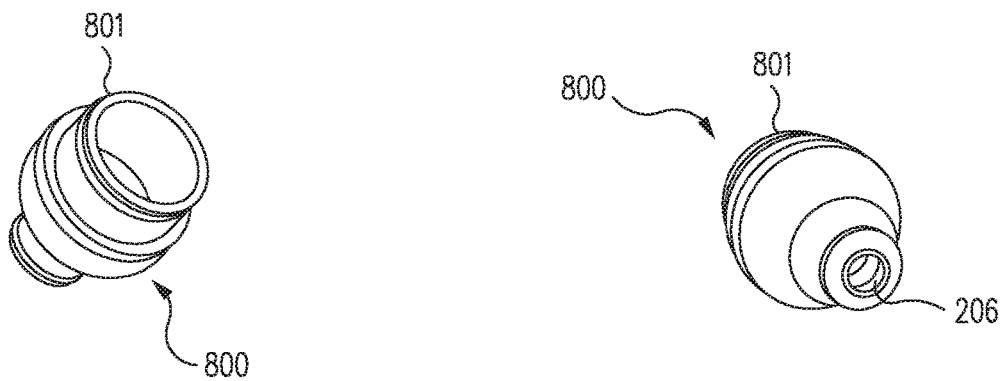
FIG. 8
FIG. 9

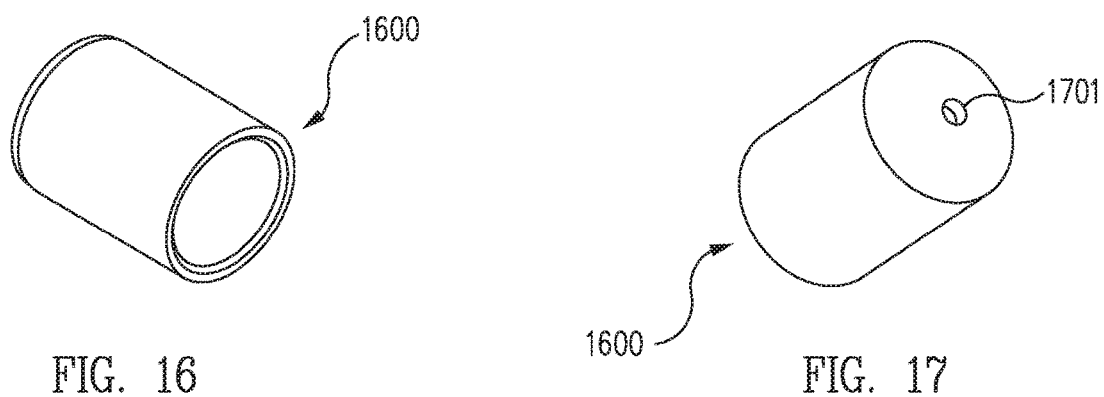
FIG. 16
FIG. 17
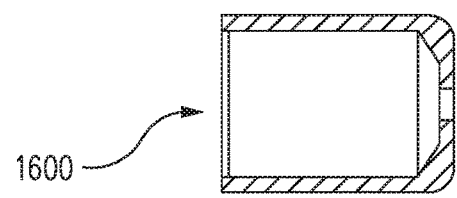
FIG. 18
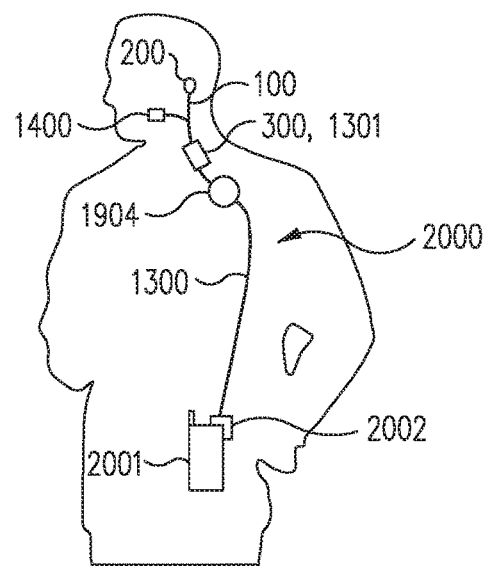
FIG. 20

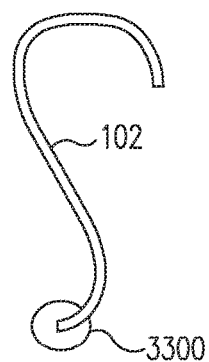
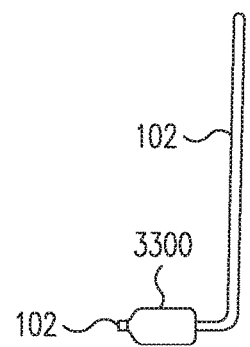
FIG. 54   FIG. 55
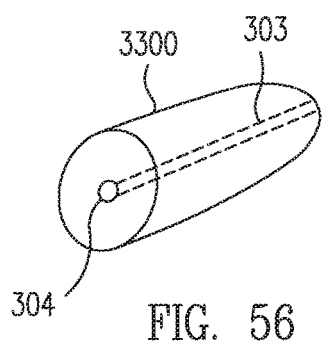
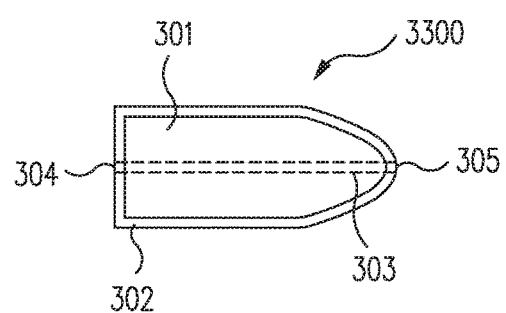
FIG. 56   FIG. 57

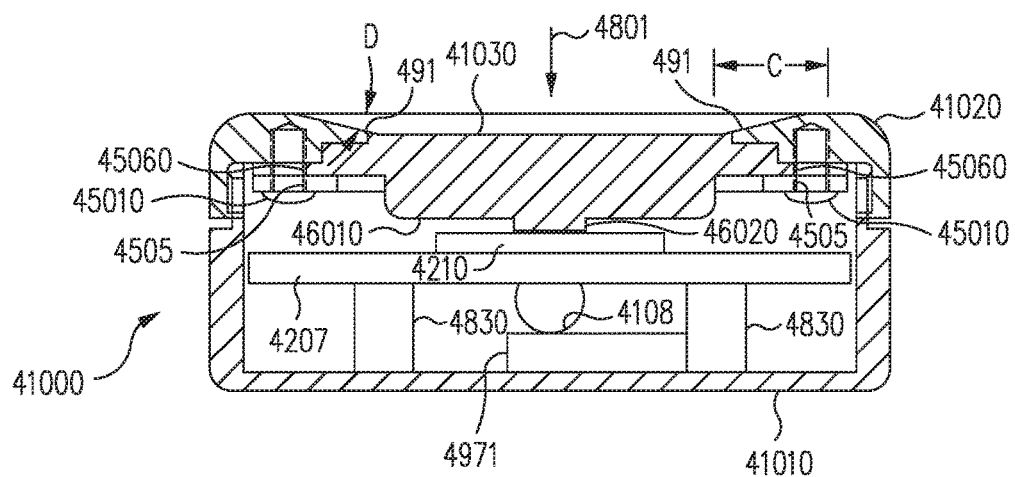
FIG. 70
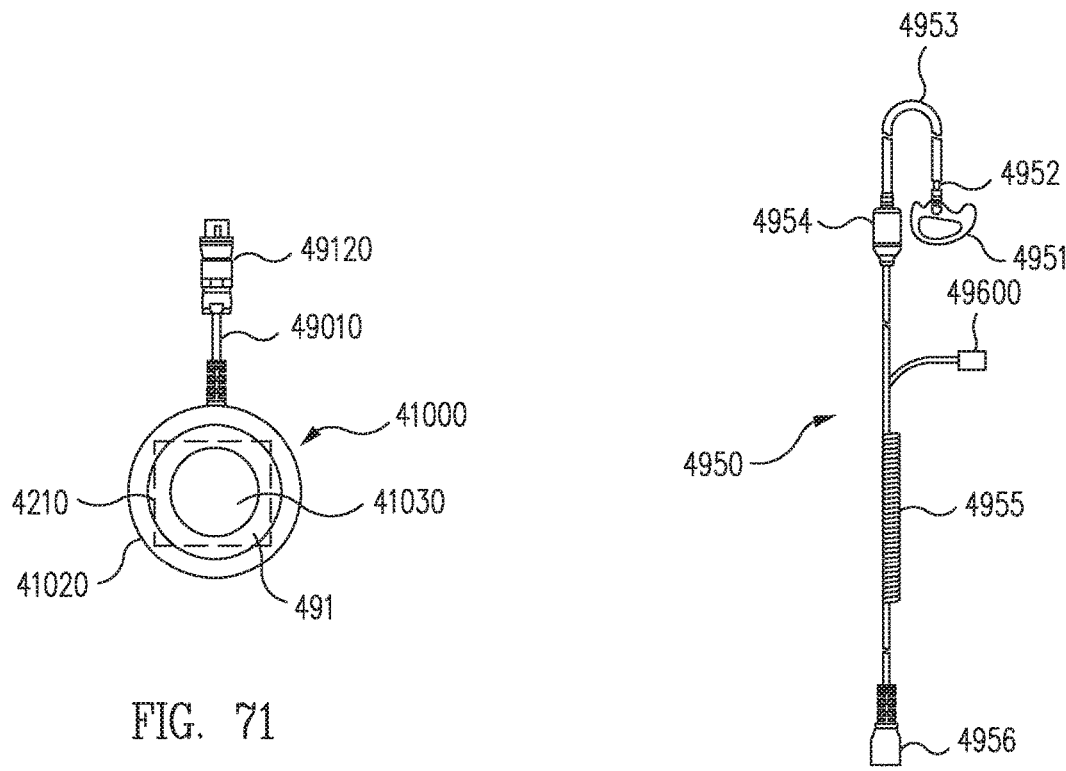
FIG. 71
FIG. 72

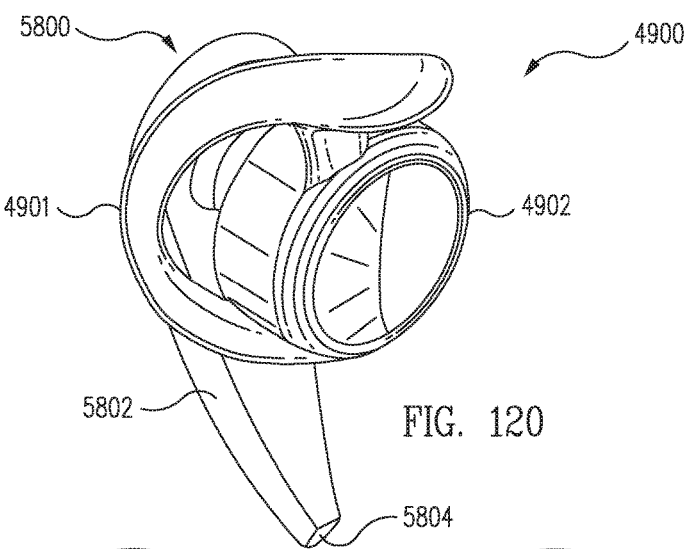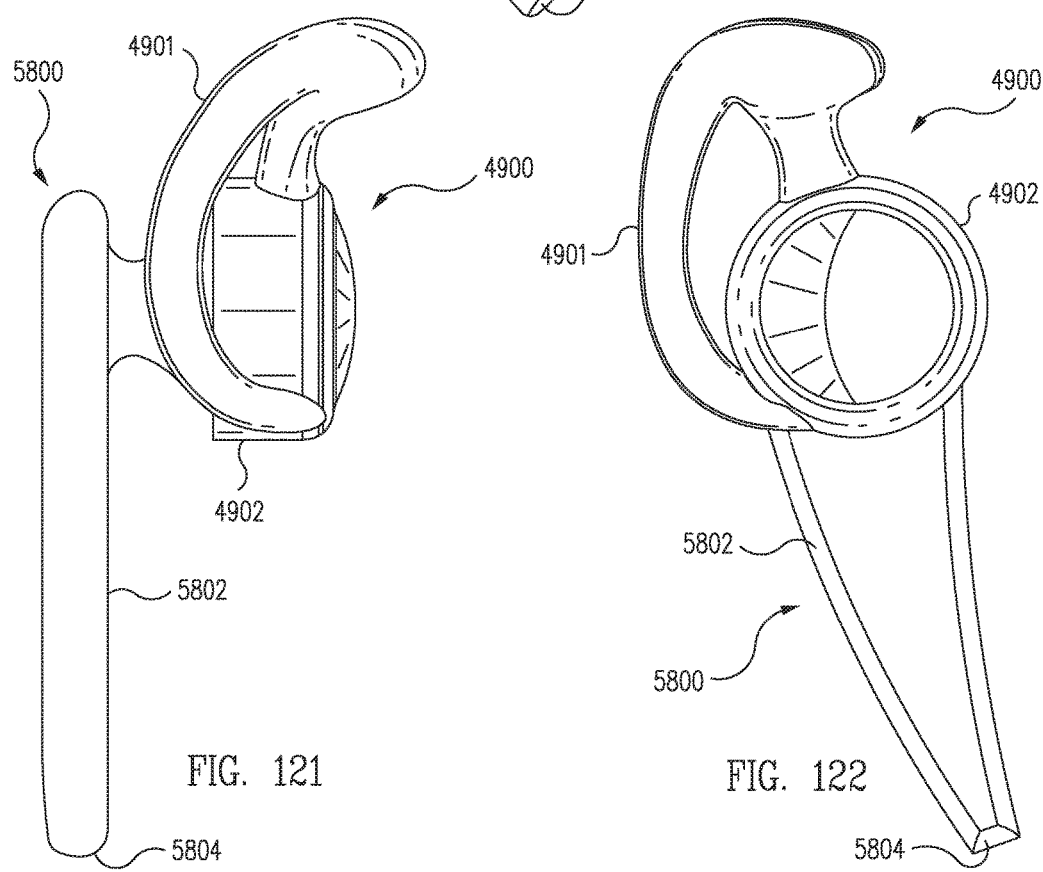

ERGONOMIC EARPIECE

CROSS-REFERENCE TO RELATED APPLICATIONS

This patent application is a continuation of U.S. patent application Ser. No. 14/720,531 filed on May 22, 2015.

U.S. patent application Ser. No. 14/720,531 is a continuation of U.S. patent application Ser. No. 14/106,693 filed on Dec. 13, 2013. U.S. patent application Ser. No. 14/106,693 is a continuation of U.S. patent application Ser. No. 13/198,308 filed on Aug. 4, 2011. U.S. patent application Ser. No. 13/198,308 is a continuation-in-part of U.S. patent application Ser. No. 11/696,987 filed on Apr. 5, 2007. U.S. patent application Ser. No. 11/696,987 is a continuation-in-part of U.S. patent application Ser. No. 11/618,344 filed on Dec. 29, 2006, and is a continuation-in-part of U.S. patent application Ser. No. 11/411,314 filed on Apr. 26, 2006.

U.S. patent application Ser. No. 13/198,308 is a continuation-in-part of U.S. patent application Ser. No. 11/411,314 filed on Apr. 26, 2006, which is a continuation-in-part of U.S. patent application Ser. No. 11/247,105 filed on Oct. 11, 2005.

U.S. patent application Ser. No. 13/198,308 is a continuation-in-part of U.S. patent application Ser. No. 11/870,165 filed on Oct. 10, 2007, which is a continuation-in-part of U.S. patent application Ser. No. 11/403,646 filed on Apr. 13, 2006. U.S. patent application Ser. No. 11/403,646 is a continuation-in-part of U.S. patent application Ser. No. 10/769,158 filed on Jan. 29, 2004, and is a continuation-in-part of U.S. patent application Ser. No. 11/247,105 filed on Oct. 11, 2005.

U.S. patent application Ser. No. 13/198,308 is a continuation-in-part of U.S. patent application Ser. No. 11/869,931 filed on Oct. 10, 2007. U.S. patent application Ser. No. 11/869,931 is a continuation-in-part of U.S. patent application Ser. No. 11/411,314 filed on Apr. 26, 2006, and is a continuation-in-part of U.S. patent application Ser. No. 11/869,526 filed on Oct. 9, 2007.

U.S. patent application Ser. No. 13/198,308 is a continuation-in-part of U.S. patent application Ser. No. 11/618,317 filed on Dec. 29, 2006, which is a continuation-in-part of U.S. patent application Ser. No. 11/493,242 filed on Jul. 26, 2006.

U.S. patent application Ser. No. 13/198,308 is a continuation-in-part of U.S. patent application Ser. No. 12/852,179 filed on Aug. 6, 2010, which is a continuation of U.S. patent application Ser. No. 11/236,969 filed on Sep. 27, 2005, which claims the benefit of U.S. Provisional Patent Application No. 60/613,742 filed on Sep. 27, 2004.

The entire contents of all of the above-mentioned patent applications are hereby expressly incorporated by reference in their entirety.

BACKGROUND

Technical Field

The present invention relates generally to electronics and acoustics. The present invention relates more particularly, for example, to a cable assembly and/or earpiece for electronic devices such as two-way radios, cellular telephones, music devices, and the like.

Related Art

Portable two-way radios are well known. Police officers, firefighters, and military personnel commonly use portable two-way radios to communicate when performing their duties. Such two-way radios may be used either with their built-in microphone and speaker or with an external microphone and speaker. A cable assembly having a microphone and a speaker can be used to facilitate such use.

Although contemporary cable assemblies have proven generally suitable for their intended purposes, they possess inherent deficiencies which detract from their overall effectiveness and desirability. For example, the speaker of a contemporary cable assembly can be damaged too easily, the microphone can pick up unwanted noises, the acoustic tube of the cable assembly is conspicuous, and the cable assembly does not accommodate a variety of different types of electronic devices such as cellular telephones and music devices. Further, the push-to-talk buttons of contemporary cable assemblies can be difficult to operate in some situations (such as emergency situations where their proper operation is extremely important) and require a wired connection to the cable assembly. As such, it is desirable to provide a cable assembly that overcomes these deficiencies.

SUMMARY

According to various embodiments, a cable assembly with an earpiece is disclosed for use with electronic devices. The cable assembly and earpiece can be used with electronic devices that produce sound such as cellular telephones, radios (both one way and two-way radios), hearing aids, music devices (e.g., MP3 players, iPods®, CD players, cassette players, or other types), pocket computers, laptop computers, desktop computers, DVD players, video game consoles, and the like. The cable assembly and earpiece can facilitate hands free operation of cellular telephones. It can also facilitate listening to music devices.

According to an embodiment, a device can comprise a first cable assembly configured to facilitate communication from a transceiver to an eardrum. The first cable assembly can have an electrical portion and an acoustic portion. A speaker transducer can be in electrical communication with the electrical portion and can be in acoustic communication with the acoustic portion. The speaker transducer can be disposed within a speaker housing. The housing can be formed of a substantially rigid material. A microphone transducer can be in electrical communication with the electrical portion. A push-to-talk switch can be configured to facilitate use of the microphone transducer when actuated. An earpiece can be in acoustic communication with the acoustic portion and can be configured to be received in a concha of an ear and to be held in place by at least one anatomical structure of the concha.

According to an embodiment, a communications system can comprise a transceiver and a first cable assembly can be configured to facilitate communication via the transceiver to an eardrum. The first cable assembly can have an electrical portion and an acoustic portion. A speaker transducer can be in electrical communication with the electrical portion and can be in acoustic communication with the acoustic portion. A microphone transducer can be in electrical communication with the electrical portion. A push-to-talk switch can be configured to facilitate use of the microphone transducer when actuated. An earpiece can be in acoustic communication with the acoustic portion and can be configured to be received in a concha of an ear and to be held in place by at least one anatomical structure of the concha.

According to an embodiment, a method can comprise providing a first cable assembly configured to facilitate communication via a transceiver to an eardrum. The first cable assembly can have an electrical portion and an acoustic portion. A speaker transducer can be placed in electrical communication with the electrical portion and can be placed in acoustic communication with the acoustic portion. A microphone transducer can be placed in electrical communication with the electrical portion.

Thus, a cable assembly having enhanced reliability and functionality is provided. The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

FIG. 5 and FIG. 6 are perspective views of an upper speaker housing, according to an embodiment;

FIG. 7 is a cross-sectional view of an upper speaker housing, according to an embodiment;

FIG. 8 and FIG. 9 are perspective views of a lower speaker housing, according to an embodiment;

FIG. 16 and FIG. 17 are perspective views of a microphone upper housing, according to an embodiment;

FIG. 18 is a cross-sectional view of a microphone upper housing, according to an embodiment;

FIG. 20 shows a person wearing a radio system, according to an embodiment.

FIG. 54 is a side view of an acoustic tube having a reusable foam ear insert attached to the acoustic tube, according to an embodiment;

FIG. 55 is a front view of an acoustic tube and foam ear insert, according to an embodiment;

FIG. 56 is a perspective view of a reusable foam ear insert, according to an embodiment;

FIG. 57 is a cross-sectional side view of a reusable foam ear insert, according to an embodiment;

FIG. 70 is a cross-sectional side view taken along line 8-8 of FIG. 63, according to an embodiment;

FIG. 71 is a side view of a wireless push-to-talk switch and cable assembly in which a transceiver within the switch housing transmits signals representative of actuation/deactuation of the push-to-talk switch and representative of voice received by the microphone and in which the transceiver receives signals representative of voice from a two-way radio and communicates the signals representative of voice from the two-way radio to the speaker, according to an embodiment;

FIG. 72 is a side view of a microphone and speaker assembly—including a cable, a microphone, a speaker, acoustic tubing, and an earpiece—that is suitable for use with a wireless push-to-talk switch (such as by connecting connectors of each together) so as to define a wireless push-to-talk microphone and speaker assembly, according to an embodiment;

FIG. 120 is a front-left-bottom perspective view of the earpiece of FIG. 106 along with a portion of a front-left-top perspective view of the example attachment of FIG. 115 coupled thereto, according to an embodiment;

FIG. 121 is a bottom side elevational view of the earpiece of FIG. 106 along with a portion of a left side elevational view of the example attachment of FIG. 115 coupled thereto, according to an embodiment; and FIG. 122 is a front plan view of the earpiece of FIG. 106 along with a portion of front plan view of the example attachment of FIG. 115 coupled thereto, according to an embodiment.

Embodiments of the present invention and their advantages are best understood by referring to the detailed description that follows. It should be appreciated that like reference numerals are used to identify like elements illustrated in one or more of the figures.

DETAILED DESCRIPTION

Figures 1, 13:
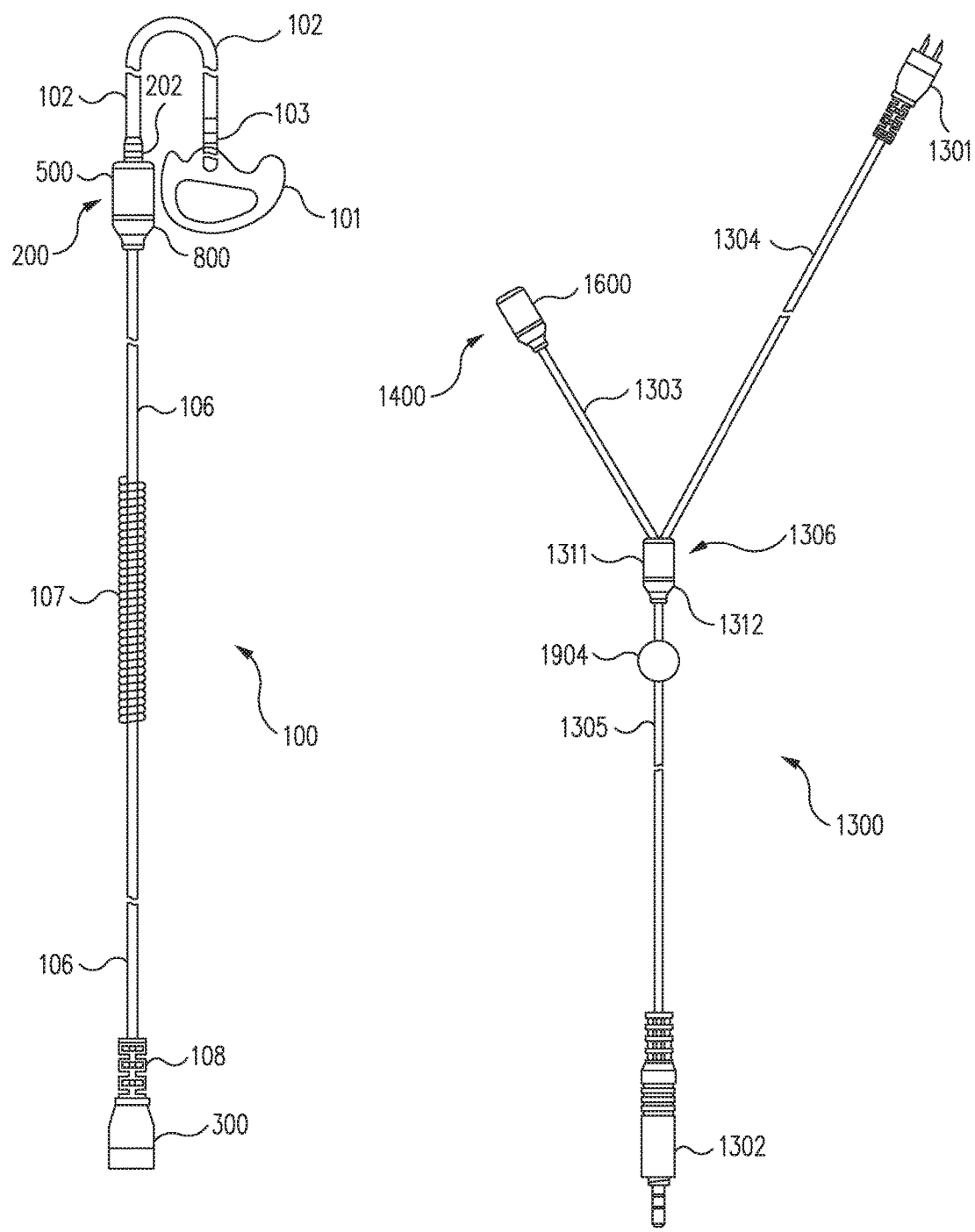
FIG. 1 is a front view of the upper portion of an example of a cable assembly, according to an embodiment.
FIG. 13 is a front view of the lower portion of an example of a cable assembly, according to an embodiment.

Methods and systems for enhancing the utility of electronic devices such as cellular telephones and music devices are disclosed. Such methods and systems can include ways to communicate sound and/or signals representative of sound from the electronic devices to a user's ear and/or a way to communicate sound and/or signals representative of sound from a user's mouth to the electronic devices.

Although cellular telephones and music devices are discussed herein, such discussion is by way of example only and not by way of limitation. Those skilled in the art will appreciate that one or more embodiments can be used with a variety of different types of electronic devices such as cellular telephones, radios (both one way and two-way radios), music devices, pocket computers, laptop computers, desktop computers, DVD players, video game consoles, and the like. Cellular telephones can be stand-alone cellular telephones, or can be integrated with other devices, such as music devices, personal digital assistants (PDAs), and computers.

Further, it should be appreciated that the distinction between different types of electronic devices tends to be blurring over time. For example, cellular telephones and music devices are presently being combined into one type of a single electronic device. One impact of this combination is the need for a common cable assembly that is suitable for use with an electronic device that provides more than one function, such as an electronic device that provides both telephone and music device functionality. One or more embodiments comprise such a cable assembly. Further, an embodiment described as for use with one type of electronic device, e.g., a cellular telephone, can be used with another type of electronic device, e.g., a music device.

One or more embodiments comprise a cable that can be configured to communicate sound and/or signals representative of sound from an electronic device to the user's ear or ears and/or can be used to communicate sound and/or signals representative of sound from a user's mouth to the electronic device. The cable can comprise one or more speakers and/or earpieces. For example, the cable can comprise one speaker and one earpiece, one speaker and two earpieces (where the single speaker is shared by the two earpieces), or two speakers and two earpieces (where each earpiece has a dedicated speaker—such as for stereo listening).

Generally, when the cable is configured for use with a cellular telephone, then only a single speaker and earpiece is provided, although any desired combination of speakers and earpieces can be provided. Generally, when the cable is configured for use with a cellular telephone, then a microphone is also provided. However, the microphone can be omitted, if desired. For example, the microphone can be omitted from the cable and the built-in microphone of the cellular telephone can be used instead.

Generally, when the cable is used with a music device, then two speakers and two earpieces (where each earpiece has a dedicated speaker for stereo listening) are used. Generally, the microphone can be omitted in a cable used with a music device. However, a general purpose cable that is suitable for use with either a cellular telephone or a music device (as well as with other electronic devices) can include a microphone.

The microphone can have a housing, a microphone transducer disposed within the housing, and a buffer disposed intermediate the microphone transducer and the housing so as to mitigate undesirable noise. The speaker can have a speaker transducer disposed within a housing that is comprised of a substantially rigid material that enhances durability. The cable assembly can facilitate electrical communication between the electronic device and the microphone, as well as between the electronic device and the speaker.

In the present disclosure, various earpieces and other features are described and set forth with regard to several embodiments. It is contemplated that features of the disclosed embodiments may be combined in any manner as may be desired for various applications and implementations.

The cable assembly comprises an upper portion 100, as shown in FIG. 1 and a lower portion 1300, as shown in FIG. 13. Upper portion 100 can be connected to lower portion 1300 to form the complete cable assembly.

Referring now to FIG. 1, upper portion 100 can comprise an earpiece 101 that is configured to fit within the concha of a user's ear so as to transmit sound (such as incoming cellular telephone transmissions, music, or other sound) to the user's eardrum, according to an embodiment. Examples of suitable earpieces are disclosed in U.S. patent application Ser. No. 11/411,314 filed on Apr. 26, 2006 and entitled EARPIECE WITH EXTENSION, the entire contents of which are hereby expressly incorporated by reference. The cable assemblies of FIGS. 1 and 13 are further disclosed in U.S. patent application Ser. No. 11/696,987 filed on Apr. 5, 2007 and entitled CELLULAR TELEPHONE CABLE ASSEMBLY, the entire contents of which are hereby expressly incorporated by reference. The earpiece 101 can be used either with or without the extension.

Earpiece 101 can be attached to acoustic tubing 102 (e.g., which is also referred to and may be implemented as an acoustic tube, thin acoustic tube, or thin acoustic tubing), such as via barbed fitting 103. Acoustic tubing 102 can be curved so as to facilitate easy routing thereof behind the ear. Speaker 200 can be worn directly behind the ear, behind the ear at the neck, in front of the ear, in the ear, or at any other desired location. Either acoustic tubing 102 from speaker 200 or electrical cable 106 to speaker 200 can pass by or behind the ear. Barbed fitting 103 can be an elbow fitting.

Acoustic tubing 102 can be attached to speaker 200, such as via a barbed fitting 202 (better shown in FIGS. 2 and 5-7) thereof. Speaker 200 can comprise upper 500 and lower 800 housings, as discussed in detail below. A multi-conductor electrical cable 106 can extend from speaker 200 to a connector, such as female connector 300 that electrically connects upper portion 100 of the cable assembly to lower portion 1300 (FIG. 13) thereof. For example, electrical cable 106 can comprise two conductors that facilitate operation of speaker 200. Strain relief 108 can be provided for electrical cable 106 at connector 300. Electrical cable 106 can comprise coils 107 that allow it to stretch as necessary to fit a particular individual.

Electrical cable 106 can provide electrical signals to speaker 200. Speaker 200 can convert such electrical signals into acoustic signals representative thereof (and generally representative of speech or music such as that received from a cellular telephone, music device, or the like).

Figure 2:
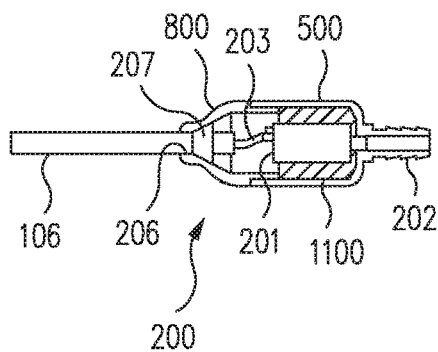
FIG. 2 is an enlarged cross-sectional view of a speaker, according to an embodiment.

Referring now to FIG. 2, a speaker housing can enclose and protect a speaker transducer 201, according to an embodiment. The speaker housing can comprise upper speaker housing 500 (also referred to as an upper housing and an upper speaker housing) and lower speaker housing 800 (also referred to as a lower housing and a lower speaker housing). Upper speaker housing 500 and lower speaker housing 800 can be formed of a durable, substantially rigid material.

For example, upper speaker housing 500 and lower speaker housing 800 can be formed of a metal or alloy, such as a metal or alloy comprised of aluminum (anodized aluminum, for example), titanium, magnesium, or steel. Alternatively, upper speaker housing 500 and lower speaker housing 800 can be formed of a polymer, such as ABS, polycarbonate, or high density polyethylene. Upper speaker housing 500 can attach to lower speaker housing 800 via threads, friction fit, adhesive bonding, ultrasonic welding, or by any other desired method.

Speaker transducer 201 can be selected so as to provide a substantially flat (when not modified by a sound limiting circuit) and clean response. A sound limiting circuit can be used to modify the response of speaker transducer 201 so as to enhance the comfort, utility, and safety thereof.

For example, the sound limiting circuit can modify the otherwise flat response so as to have dips in the response curve where objectionable noise is known to occur. That is, the sound limiting circuit can mitigate such objectionable noise.

Cable 106 enters lower speaker housing 800 through opening 206 formed therein. Ferrule 207 can be crimped around cable 106 to hold cable 106 within the speaker housing, to provide strain relief, and/or to seal the speaker housing (such as to seal moisture, atmospheric particulates and other contaminants out of the speaker housing). A knot (not shown) can be formed in cable 106 and or conductors 203 thereof to inhibit cable 106 from being inadvertently pulled from the speaker housing.

Conductors 203 from electrical cable 106 are electrically connected to speaker transducer 201, so as to communicate speech from cellular telephone or the like, as discussed above. Other conductors (not shown) may be used for other purposes.

Speaker transducer 201 can be generally surrounded by a boot 1100, so as to provide shock and vibration damping to speaker transducer 201. Boot 1100 can be formed of a resilient polymer material, such as rubber, and is discussed in further detail below.

Figure 3:
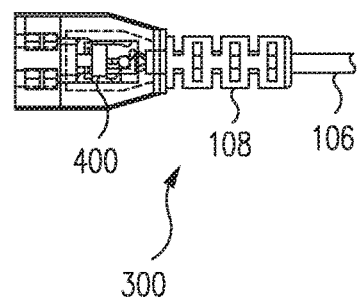
FIG. 3 is an enlarged view, partially in section, of a female connector, according to an embodiment.

Referring now to FIG. 3, connector 300 can be used to attach upper cable assembly 100 to lower cable assembly 1300 (via connector 1301 of lower cable assembly 1300), according to an embodiment. Alternatively, upper cable assembly 100 can be permanently connected to lower cable assembly 1300, according to an embodiment.

Further, a sound limiting circuit 400 can be disposed within connector 300 so as to limit the amplitude and/or frequencies of sound communicated to the user's eardrum, as discussed in detail below. Sound limiting circuit 400 may comprise passive components, active components, or any combination thereof. Sound limiting circuit 400 may comprise discrete components formed upon a printed circuit board or may use any other desired method of packaging. Sound limiting circuit 400 may be analog, digital, or a combination of analog and digital.

Figure 4:
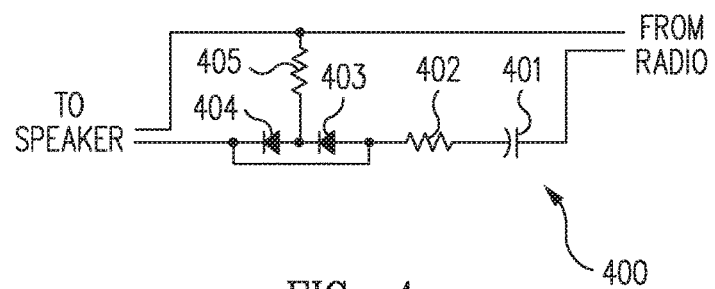
FIG. 4 is an electronic schematic diagram of a sound limiter, according to an embodiment.

Referring now to FIG. 4, sound limiting circuit 400 can be configured so as to prevent loud, annoying, distracting, and/or harmful sounds from being communicated from a cellular telephone or the like to the user's eardrum, according to an embodiment. The amplitude and frequency of the sound can be controlled, enhancing the safety, comfort, and utility of a cellular telephone or the like.

For example, sound limiting circuit 400 can comprise a capacitor 401 and a resistor 402 configured as a resistance-capacitance (RC) network, providing a desired frequency response. Capacitor 401 can be a 2.2 microfarad capacitor and resistor 402 can be a 100 ohm resistor, for example.

Further, sound limiting circuit 400 can comprise a pair of diodes 403 and 404, and a resistor 405 configured so as to form an amplitude limiter that shunts excessive amplitudes so that they are not transformed into acoustic energy by speaker transducer 201. Diode 403 can be SOT-23 diode, diode 404 can be a BAV199 diode, and resistor 405 can be a 10 ohm resistor, for example. Those skilled in the art will appreciate that various such sound limiting circuits can be suitable for use in various situations.

For example, in situations where it is anticipated that undesirable sounds of a particular frequency may be present in the received cellular telephone signal or music device output, then sound limiting circuit 400 can be specifically configured to mitigate such sounds.

Referring now to FIGS. 5-7, the speaker housing can comprise upper speaker housing 500, according to an embodiment. Upper speaker housing 500 can be generally cylindrical and substantially hollow. Thus, it can be configured to receive a miniature speaker, such as those commonly used with earpieces like earpiece 101. Barbed fitting 202 can extend from upper housing 500 and facilitates connection of upper housing 500 to acoustic tubing 102. Upper speaker housing 500 can have a diameter of approximately 8.0 mm, for example.

Figure 10:
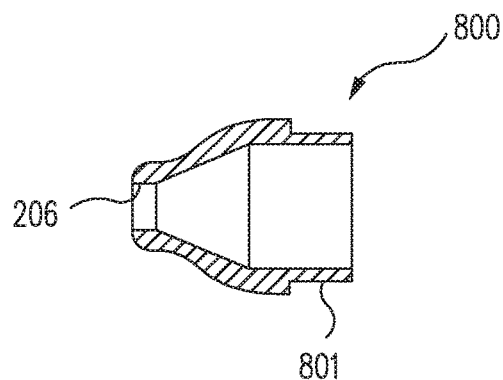
FIG. 10 is a cross-sectional view of a lower speaker housing, according to an embodiment.

Referring now to FIGS. 8-10, the speaker housing can also comprise lower speaker housing 800, according to an embodiment. Lower speaker housing 800 can comprise an area of reduced diameter 801 that is configured to be received within upper speaker housing 500 (as shown in FIG. 2) so as to facilitate attachment of lower speaker housing 800 to upper speaker housing 500.

Figure 11:
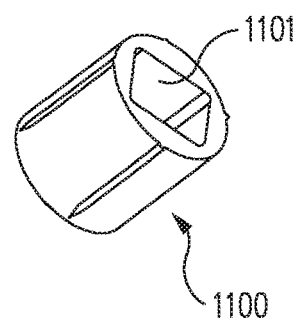
FIG. 11 is a perspective view of a speaker boot, according to an embodiment.
Figure 12:
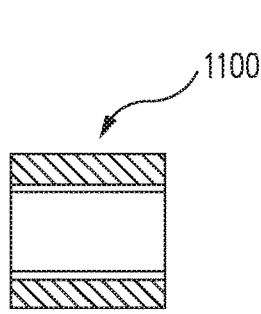
FIG. 12 is a cross-sectional view of a speaker boot, according to an embodiment.

Referring now to FIGS. 11-12, boot 1100 can be generally cylindrical in shape and can have a diameter approximately equal to the inside diameter of upper speaker housing 500, according to an embodiment. Boot 1100 can be formed of a resilient polymer material. Boot 1100 can have a diameter slightly greater than the inside diameter of upper speaker housing 500, such that boot 1100 must be compressed slightly in order to insert it into upper speaker housing 500. Boot 1100 can have a generally square opening 1101 formed therein for receiving speaker transducer 201.

Referring now to FIG. 13, lower cable assembly 1300 can comprise a microphone 1400 that is configured to attach to the user's clothing, according to an embodiment. For example, the microphone 1400 can attach to the user's clothing proximate the user's mouth. For example, microphone 1400 can clip to the user's lapel. A connector, such as male connector 1301, can facilitate electrical connection of lower cable assembly 1300 to upper cable assembly 100 to define a complete cable assembly, as mentioned above.

A connector 1302, such as stereo phono plug, can be used to connect lower cable assembly 1300 (and consequently the complete cable assembly) to an electronic device. Connector 1302 can plug directly into the electronic device.

Cable 1303 facilitates electrical connection between microphone 1400 and connector 1302. Similarly, cable 1304 facilitates electrical connection between upper portion of cable assembly 100 and connector 1302. Cable 1303 and cable 1304 can join at Y-joint 1306 to form single cable 1305. Y-joint 1306 can comprise a housing similar in construction to the speaker housing. Cable 1303 can be omitted for use with a music device.

More particularly, an upper Y-joint housing portion 1311 and a lower Y-joint housing portion 1312 can be formed of a durable, substantially rigid material. For example, upper Y-joint housing portion 1311 and lower Y-joint housing portion 1312 can be formed of a metal or alloy, such as a metal or alloy comprised of aluminum (anodized aluminum, for example), titanium, magnesium, or steel. Alternatively, upper Y-joint housing portion 1311 and lower portion 1312 can be formed of a polymer, such as ABS, polycarbonate, or high density polyethylene. Upper portion 1311 can attach to lower portion 1312 via threads, friction fit, adhesive bonding, ultrasonic welding, or by any other desired method.

Microphone 1400 can be removably attachable to lower cable assembly 1300, such as via a connector. Alternatively, microphone 1400 can be permanently attached to lower cable assembly 1300, such as by being an integral part thereof.

Figure 14:
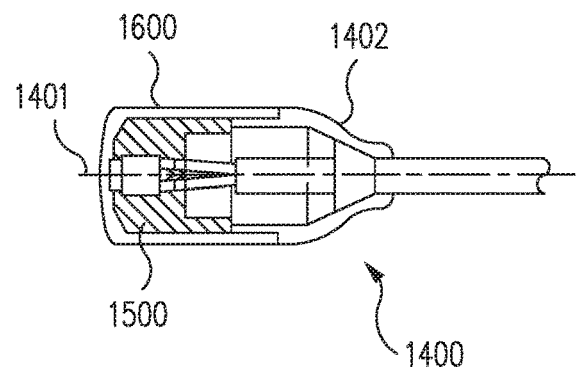
FIG. 14 is an enlarged cross-sectional view of a microphone, according to an embodiment.

Referring now to FIG. 14, microphone 1400 can comprise a microphone transducer 1401 generally surrounded by a buffer 1500 and disposed within a housing comprised of upper housing 1600 and lower housing 1402, according to an embodiment. Upper housing 1600 is discussed in detail below. Lower housing 1402 can be similar to lower speaker housing 800.

Buffer 1500 can comprise a vibration damping material that mitigates the undesirable transmission of ambient sound and vibration to microphone transducer 1401 and, thus, enhances the quality of sound transmitted by a cellular telephone or the like. In one embodiment, buffer 1500 can comprise a resilient polymer material.

For example, if a person is in a noisy vehicle, then engine, wind, and other noise can be substantial. In the absence of buffer 1500, such engine noise can be undesirably transferred through the microphone housing and to microphone transducer 1401. When the person attempts to transmit a telephone message, the noise will be transmitted as well. However, buffer 1500 inhibits the transmission of such noise from the microphone housing to microphone transducer 1401 and thereby enhances transmission quality.

Further, the microphone housing can mitigate the undesirable generation and transmission of harmonics, thereby tending to acoustically stabilize the microphone. As those skilled in the art will appreciate, such harmonics detract from the ability of a listener to understand transmitted telephone messages.

Figure 15:
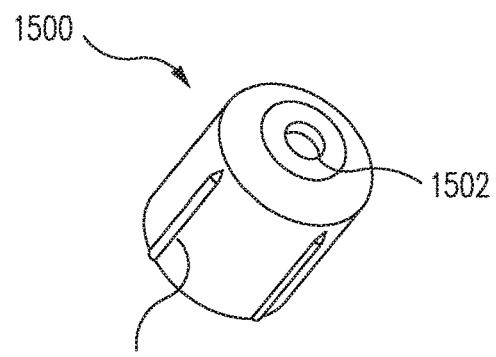
FIG. 15 is an enlarged perspective view of a microphone buffer, according to an embodiment.

Referring now to FIG. 15, buffer 1500 can be generally cylindrical in shape and can conform in size and shape to at least a portion of the inside of the microphone housing, such as the upper housing 1600 thereof, according to an embodiment. Buffer 1500 can comprise ribs 1501. Ribs 1501 can function as standoffs that reduce the cross-sectional area of the path for sound to travel from the microphone housing through buffer 1500.

That is, ribs 1501 can separate the bulk of buffer 1500 from the microphone housing. Ribs 1501 can also provide a tighter fit of buffer 1500 within the microphone housing, so as to prevent it from slipping therefrom, such as during assembly thereof. An opening 1502 can be formed in upper buffer 1500, so as to facilitate the transmission of airborne sound to microphone transducer 1401.

Referring now to FIGS. 16-18, upper housing 1600 is generally cylindrical in shape, according to an embodiment. An opening 1701 can be formed in upper housing 1600, so as to facilitate the transmission of airborne sound to microphone transducer 1401.

Upper housing 1600 and lower housing 1402 can be formed of a durable, substantially rigid material. For example, upper housing 1600 and lower housing 1402 can be formed of a metal or alloy, such as a metal or alloy comprised of aluminum (anodized aluminum, for example), titanium, magnesium, or steel. Alternatively, upper housing 1600 and lower housing 1402 can be formed of a polymer, such as ABS, polycarbonate, or high density polyethylene. Upper housing 1600 can attach to lower housing 1402 via threads, friction fit, adhesive bonding, ultrasonic welding, or by any other desired method.

Figure 19:
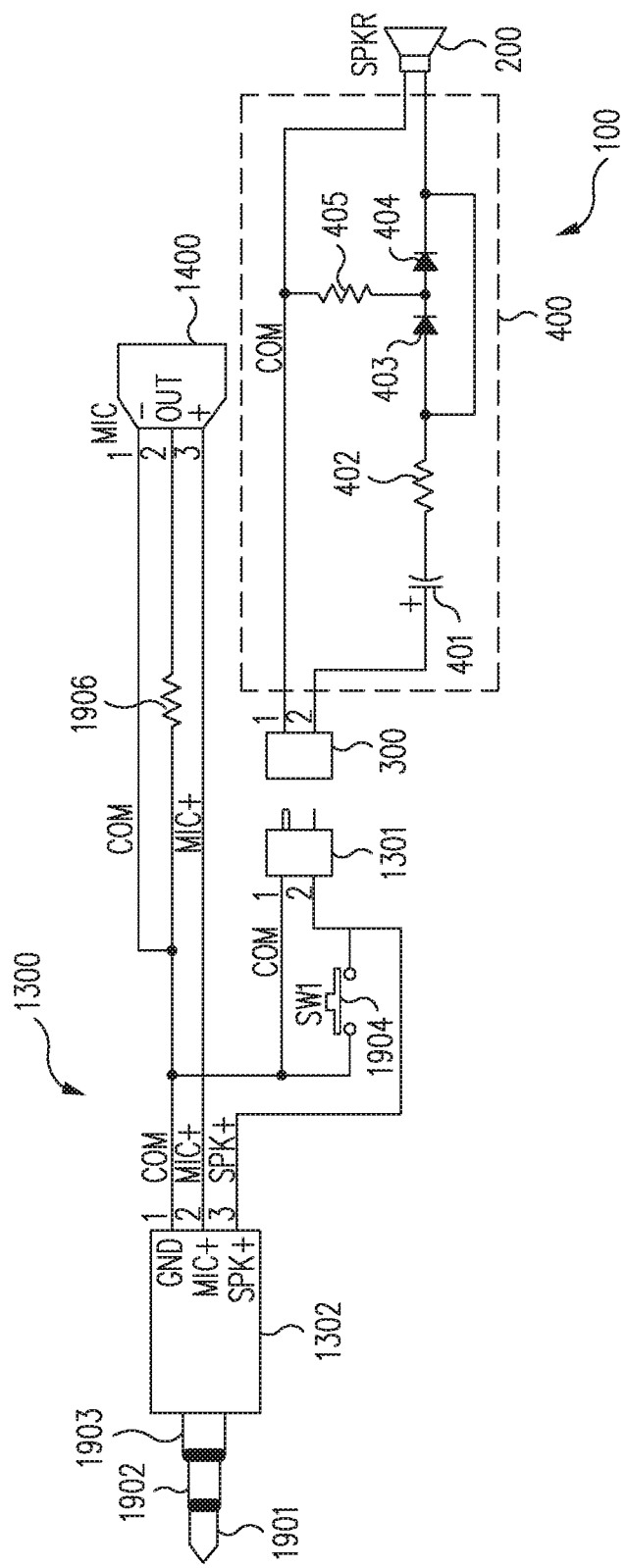
FIG. 19 is an electronic schematic diagram of a cable assembly, according to an embodiment.

Referring now to FIG. 19, an electrical schematic of the cable assembly is provided, according to an embodiment. A connector 1302, such as a stereo phono plug, facilitates electrical connection of the cable assembly to an electronic device.

The use of a stereo phono plug for connector 1302 provides for three separate electrical connections to an electronic device. The tip 1901 of phono plug connector 1302 can be used to provide electrical connection for speaker 200. The middle 1902 of phono plug connector 1302 can be used to provide electrical connection for microphone 1400. The base 1903 of phono plug connector 1302 can be a common conductor, e.g., ground, for both speaker 200 and microphone 1400. Other configurations of connector 1302 and other types of connectors can alternatively be utilized.

Optionally, a push-to-talk switch 1904 (also referred to as a press-to-talk switch) can be used to facilitate transmission of voice according to well known principles. For example, push-to-talk switch 1904 can be used when the cable assembly is to be used with a two-way radio, e.g., a walkie talkie. However, push-to-talk switch 1904 can be omitted when the cable assembly is used with many electronic devices.

A resistor 1906 can be used for current limiting or impedance matching for microphone 1400. As those skilled in the art will appreciate, various other components can be used in the cable assembly for a variety of different purposes.

As discussed above, male connector 1301 and female connector 300 can be used to connect lower cable portion 1300 to upper cable portion 100. Alternatively, lower cable portion 1300 and upper cable portion 100 can be formed integrally, as a one-piece cable assembly that eliminates the need for connectors 300 and 1301.

As discussed above, sound limiting circuit 400 enhances the comfort and safety of the user by modifying the electrical signal prior to the electrical signal being converted into acoustic energy. Sound limiting circuit 400 can be inside of connector 300.

Alternatively, sound limiting circuit 400 can be inside of connector 1301, inside of phono plug connector 1302, inside of the speaker 200, or at any other desired location on cable assembly 2000. For example, sound limiting circuit 400 can be along cable 106.

Figure 21:
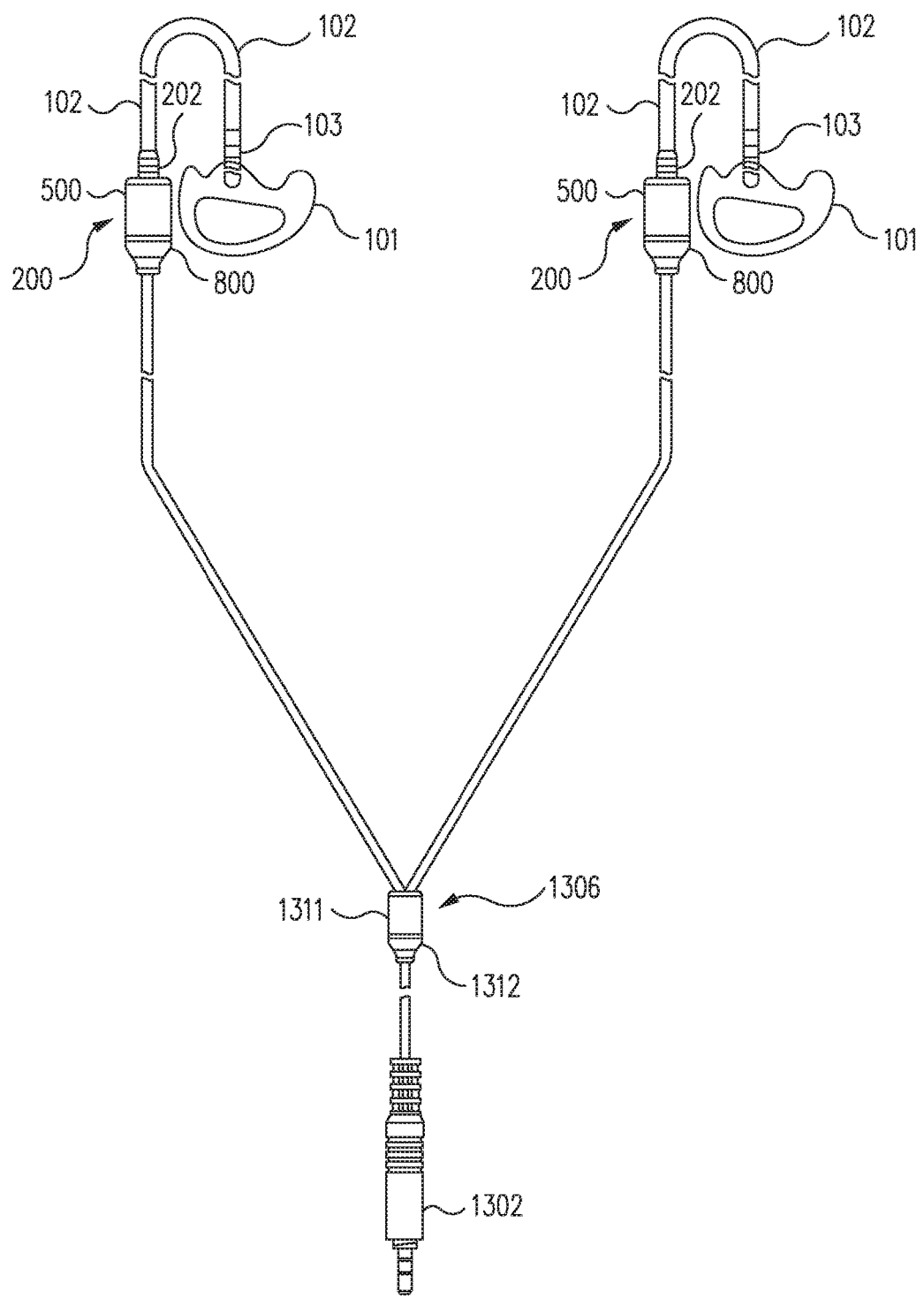
FIG. 21 is a front view of a stereo cable assembly, according to an embodiment.
Figure 22:
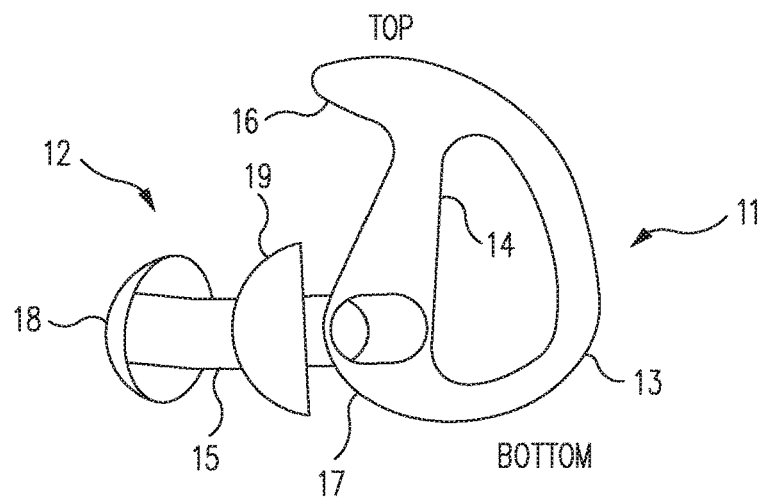
FIG. 22 is a perspective view of an earpiece having a flanged extension, according to an embodiment.

Referring now to FIG. 21, Y-joint 1306 can be used to form a two speaker/two earpiece cable, such as for stereo listening to a music device, according to an embodiment. Optionally, the microphone 1400 can be included, such as by additionally having microphone cable 1303 branch off from Y-joint 1306 as well.

Instead of having two separate speakers for a stereo configuration as shown in FIG. 21, the cable assembly can alternatively have a single speaker that provides sound to both earpieces to define a monaural configuration. For example, a single speaker can be placed at Y-joint 1306 and two acoustic tubes can lead therefrom to earpieces 101.

Figure 98:
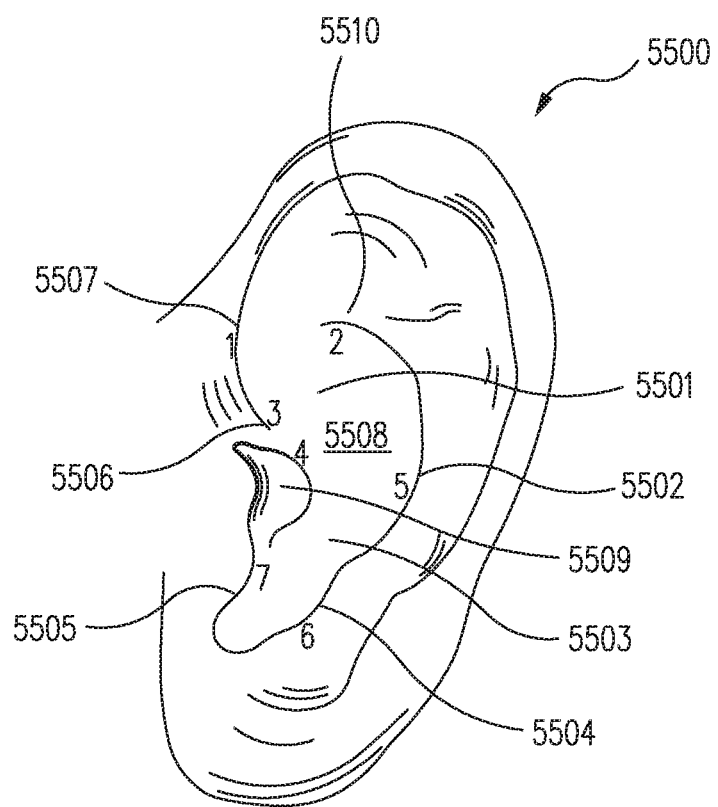
FIG. 98 shows a human ear with some anatomical structures labeled and with examples of grab points for an earpiece labeled, according to an embodiment.

According to one embodiment, an earpiece is held in place by anatomical structures of the ear and the earpiece holds the extension in place within the ear canal 5509 (see FIG. 98). That is, the earpiece prevents the extension from loosening or falling out of the ear canal 5509. According to one embodiment, the earpiece positions a sound port at the distal end of the extension near the eardrum so that the volume of a two-way radio can be reduced. That is, the earpiece determines how far into the ear the extension extends.

Various combinations of sound attenuation and sound transmission may be provided. For example, a hollow or partially hollow extension may be configured so as to substantially attenuate some ambient sound (such as potentially harmful loud noise), while allowing some ambient sound (such as voices) to be heard. Optionally, the extension can comprise one or more openings that allow a substantial portion of ambient sound to be heard, while also allowing radio communications to be heard. Optionally, a filter may be used to selectively allow sounds to be heard.

Referring now to FIGS. 22, 23, 27, and 28, one exemplary embodiment comprises an earpiece 11 to which an extension 12 (also referred to as an insert and an ear insert) is attached. Earpiece 11 is configured to be disposed in the concha of the outer ear. Extension 12 is configured to be disposed within the ear canal 5509.

In one embodiment, earpiece 11 can have a generally D shaped configuration. Earpiece 11 can comprise a generally arcuate rib 13 that has upper and lower ends. Generally arcuate rib 13 can be attached to a generally vertical rib 14 at the upper and lower ends of generally arcuate rib 13. An upper lobe 16 can be formed proximate where generally arcuate rib 13 and generally vertical rib 14 join at the top of earpiece 11. A smooth curve 17 can be formed proximate where generally arcuate rib 13 and generally vertical rib 14 join at the bottom of earpiece 11, or if necessary a lower lobe could be formed to engage the tragus 5505 and antitragus 5504 (see FIG. 98).

According to an embodiment, earpiece 11 is configured to fit multiple sizes of ears. More particularly, generally arcuate rib 13 is deformable so as to permit earpiece 11 to fit into smaller concha bowls.

Earpiece 11 is configured to be disposed and held in place within the concha of a human ear. More particularly, the crus 5506 of the helix 5507 and the antihelix 5510 (see FIG. 98) of a wearer's ear cooperate to capture upper lobe 16. The antihelix 5510 and the antitragus 5504 cooperate to capture generally arcuate rib 13. Thus, earpiece 11 is configured to be captured by protrusions of the concha. In this manner, earpiece 11 is held firmly in place within the concha and can therefore maintain extension 12 in a desired position within the ear canal 5509.

Extension 12 can be either removably or permanently attached to earpiece 11. Extension 12 can be removably attached to earpiece 11 by friction fit, by detents, by threads, or by any other desired means. For example, extension 12 can be friction fit to earpiece 11 by sizing a proximal portion 21 (see FIG. 23) of extension 12 so as to fit tightly within an aperture 61 (also referred to as an opening or a hole) of earpiece 11 (see FIG. 27). Extension 12 can be permanently attached to earpiece 11 by adhesive bonding, ultrasonic welding, or by any other desired means. Alternatively, extension 12 can be integrally formed to earpiece 11, such as by injection molding earpiece 11 and extension 12 within a common mold cavity. Thus, earpiece 11 and extension 12 can be formed either integrally or separately.

Earpiece 11 and extension 12 can be formed of a soft, resilient material to enhance comfort during use. Both earpiece 11 and extension 12 can be formed of the same material. For example, earpiece 11 and extension 12 can be formed of a resilient polymer, such as silicon rubber. For example, in one embodiment, earpiece 11 and extension 12 can be formed of a material having a Shore A durometer of between 35 and 45, such as a Shore A durometer of approximately 40. Alternatively, in another embodiment, the earpiece 11 can be formed of a more rigid material.

In one embodiment, earpiece 11 functions as a stop to prevent extension 12 from being inserted too far into the ear. In one embodiment, earpiece 11 also prevents extension 12 from being inadvertently removed or loosened from the ear. In one embodiment, the length of extension 12 determines, at least in part, how close the tip thereof is positioned with respect to the eardrum.

Figure 23:
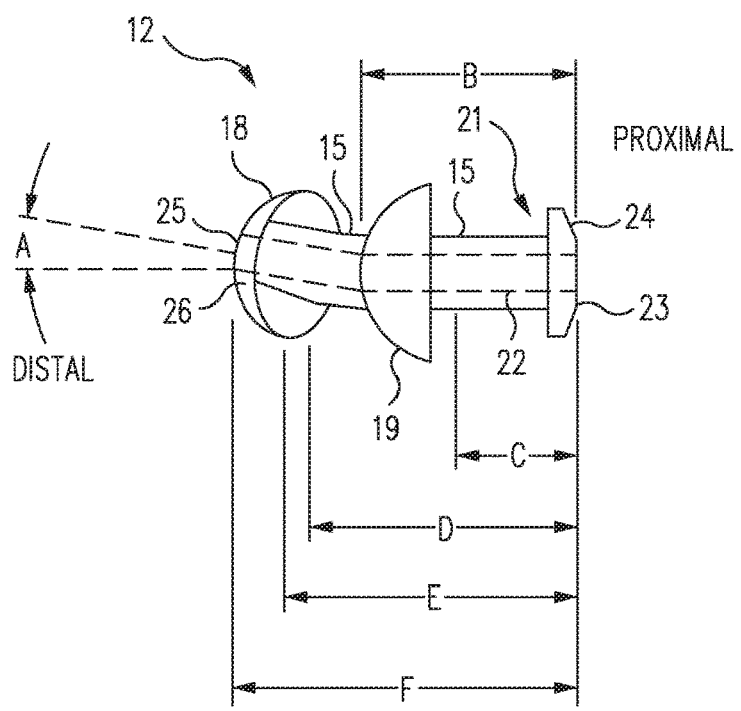
FIG. 23 is a perspective view of the extension of the earpiece of FIG. 22, wherein the extension is removed from the earpiece, according to an embodiment.

With particular reference to FIG. 23, according to one embodiment the extension 12 comprises a stem 15 and two flanges, 18 and 19 (e.g., also referred to as flanged members). Extension 12 can comprise any desired number of flanges, including no flanges at all, as discussed in further detail herein. Stem 15 can either be solid (so as to substantially block sound) or hollow (so as to substantially transmit sound). Stem 15 can also be partially hollow (so as to selectively transmit sound).

Stem 15 can bend such that it angles upwardly to conform to the upward angle of the ear canal 5509. For example, in one embodiment, stem 15 can bend such that it angles upwardly at an angle, angle A, of approximately 30°. In one embodiment, the distance between the proximal end of extension 12 and the distal end of outer flange 19, dimension B, can be approximately 0.545 inch. In one embodiment, the distance between the proximal end of extension 12 and the point where a filter (such as a Hocks filter) ends, dimension C, can be approximately 0.304 inch. In one embodiment, the distance between the proximal end of extension 12 and the bend in stem 15, dimension D, can be approximately 0.680 inch. In one embodiment, the distance between the proximal end of extension 12 and a distal end of inner flange 18, dimension E, can be approximately 0.743 inch. In one embodiment, the distance between the proximal end of extension 12 and the distal end of inner flange 18, dimension F, can be approximately 0.870 inch.

In one embodiment, the diameter of stem 15 can be approximately 0.189 inch. Stem 15 can optionally have a bore 22 fainted therethrough. In one embodiment, bore 22 can have a diameter of approximately 0.094 inch. In one embodiment, outer flange 19 can have a radius of approximately 0.241 inch. Similarly, in one embodiment, inner flange 18 can have a radius of approximately 0.193 inch. Thus, the radius of inner flange 18 can be substantially less than the radius of outer flange 19, so as to better accommodate the manner in which the ear canal 5509 becomes narrower as it gets deeper.

The exemplary angle and dimensions discussed above provide a single extension 12 that is suitable for use with a large number of individuals. Those skilled in the art will appreciate that other dimensions are likewise suitable.

Figure 30:
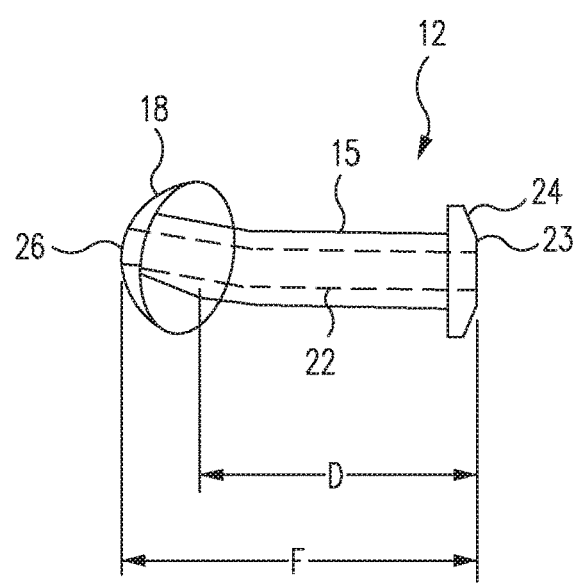
FIG. 30 is a perspective view of the extension of the earpiece of FIG. 29 wherein the extension is removed from the earpiece, according to an embodiment.

The distal end 25 of bore 22 defines a sound output port 26 (see FIGS. 23 and 30). Extension 12 is configured such that sound output port 26 is positioned proximate the wearer's eardrum. That is, extension 12 can be configured so as to position a distal end 25 thereof proximate the eardrum. In this manner, sound transmitted through bore 22 (such as sound from a two-way radio), is brought close to the eardrum such that the volume of the sound required can be substantially reduced. For example, the extension can position sound output port 26 within one, two, or three millimeters of the eardrum. In one embodiment, the extension can have a length of approximately ½ inch. In one embodiment, the extension can have a length of ⅝ inch or more.

Adjustment of the position of the distal end 25, as well as of the flanges 18 and 19, facilitates enhanced fitting of the earpiece 11. In this manner, comfort is enhanced. Because comfort is enhanced, a user is more likely to wear the earpiece 11. A better fit allows earpiece 11 to be worn for longer periods of time for both communications and hearing protection. A better fit also substantially reduces the likelihood of tissue damage to the ear caused by the earpiece 11.

A head 23 can be formed upon the proximal end of stem 15 so as to enhance friction with respect to aperture 61 of earpiece 11 and/or so as to define detents that tend to keep extension 12 attached to earpiece 11. Bevels 24 can optionally be formed upon head 23 to better facilitate insertion of head 23 through aperture 161. The head 23 can be positioned within the aperture 61 (FIGS. 27 and 28) of the earpiece 11 or can be pushed entirely therethrough and thus be position on the outward side of earpiece 11.

The extension 12 may comprise a flanged extension, having flanges 18 and 19 as shown in FIGS. 23-26 and 29-32, or may be a non-flanged extension. In one embodiment, the flanges 18 and 19 generally fill (close off) the ear canal 5509 and tend to block ambient sound. Although sometimes it is desirable to block ambient sound, other times, it is desirable for the user to hear ambient sound. Thus, the flanges 18 and 19 can have one or more openings 31 formed therein, as discussed herein. Although two flanges 18 and 19 are shown, the extension 12 may comprise more or less flanges. For example, the extension 12 may comprise three, four, five, six, or more flanges, or no flanges. The flanges 18 and 19 need not be identical, but rather may vary in size, shape, orientation and/or positions of attachment to the stem 15, for example.

The extension 12 can have a bore 22 formed therethrough to facilitate the transmission of sound from a speaker (such as via acoustic tubing connected to the speaker) to the user's eardrum. Alternatively, the extension 12 can lack such a bore, so as to define an earplug, such as for attenuating ambient sound. Indeed, the bore 22 and/or openings 31 in the stem 15 and/or flanges 18 and 19 can be configured so as to selectively transmit and block desired sounds. Such selectivity can be based upon the frequency and/or intensity of the sound.

Thus, petitions, baffles, and/or restrictions (such as portions of reduced diameter), as well as openings in the stem and/or flanges, can be configured so as to modify sound transmitted through the extension in a desired manner. For example, sound within the voice range of frequencies can be selectively passed through the extension with comparatively less attenuation and sounds outside of the voice range can be selectively attenuated.

The extension can be configured so as to lack a bore. Thus, a user can wear one earpiece having an extension with a bore and one earpiece lacking a bore. The earpiece having an extension with a bore facilitates listening to a radio, while the earpiece having an extension without a bore at least partially blocks distracting and/or potentially harmful ambient sound (it functions as an earplug).

In a similar manner, one earpiece can be configured so as to selectively pass voice and to selectively mitigate other sounds. The other earpiece can be configured so as to selectively pass all of the sound from a two-way radio.

A user can wear one earpiece 11 having an extension 12 with a bore 22 and one earpiece 11 lacking a bore 22. The earpiece having an extension 12 with a bore 22 facilitates listening to a radio, while the earpiece 11 having an extension 12 without a bore 22 at least partially blocks distracting and/or potentially harmful ambient sound.

Figure 24:
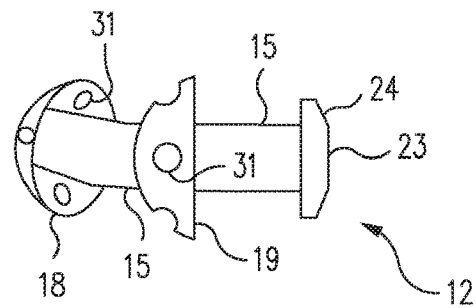
FIG. 24 is a perspective view of an alternative configuration of the extension of FIG. 23, wherein openings are formed in the flanges thereof, according to an embodiment.

Referring now to FIG. 24, flanges, 18 and 19 of extension 12 can optionally have one or more openings 31 formed therein. For example, each flange, 18 and 19, can have one, two, three, or four openings 31 formed therein. Openings 31 can be holes. Alternatively, the openings 31 can be cutouts, such as notches formed in the flanges 18 and 19. The openings 31 allow at least some ambient sound to better reach the user's eardrum.

Such openings 31 may be desirable when an embodiment is intended to facilitate listening to a two-way radio and when it is also desirable to hear ambient sound. For example, such openings 31 may be desirable in police applications where a police officer is required to hear both the two-way radio and face-to-face conversations.

Figure 25:
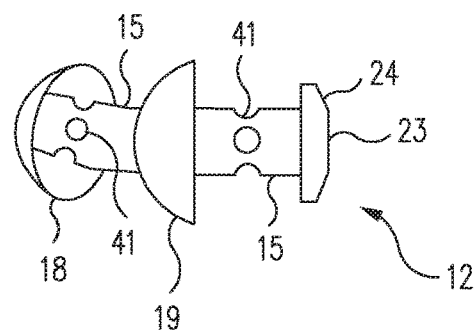
FIG. 25 is a perspective view of another alternative configuration of the extension of FIG. 23, wherein openings are formed in the stem thereof, according to an embodiment.

Referring now to FIG. 25, one or more openings 41 can be formed in stem 15, such as intermediate or proximate flanges 18 and 19. A curable polymer material suitable for use in the ear canal 5509 can be injected into the tube such that it substantially fills the tube and/or at least some space between the flanges 18 and 19. That is, the injected polymer material extrudes from the openings 41 and tends to fill in the space intermediate the flanges 18 and 19. This injection may be accomplished with the extension inserted into a wearer's ear canal 5509, so as to provide a custom fit. Alternatively, this injection may be performed using an artificial ear canal, such as for mass production.

Silicon rubber may be used as the extrudable material. Generally, any extrudable material suitable for use as earplugs can be used. In this fashion, attenuation of ambient sound is enhanced. Such earplugs are suitable for use in gun ranges and noisy industrial environments.

The opening at the distal end of the tube can optionally be closed to prevent leakage of the injected polymer material therefrom. A skin may be formed over the flanged extension to trap the polymer material and/or to facilitate easier insertion into the ears. Alternatively, the openings 41 can be omitted and the central bore of the tube can still be filled with polymer material to attenuate sound.

Figure 26:
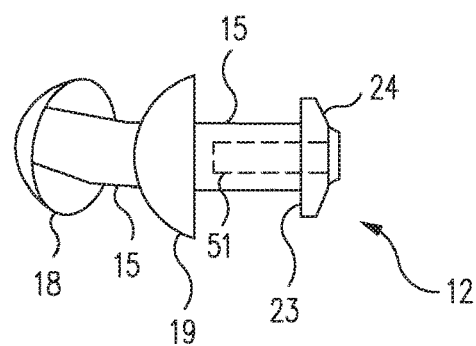
FIG. 26 is a perspective view of the extension of FIG. 23, showing a Hocks filter inserted therein, according to an embodiment.

Referring now to FIG. 26, a filter 51 can be inserted into bore 22 to selectively mitigate sound exposure. For example, a Hocks filter can be used to mitigate exposure to louder sounds, while still allowing a wearer to hear quieter sounds, such as speech.

Figure 27:
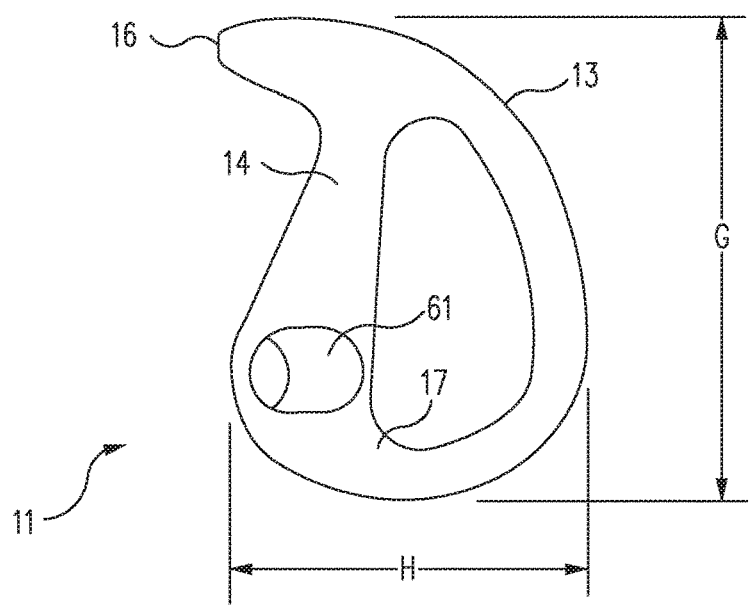
FIG. 27 is a side view of the earpiece of FIG. 22, wherein the extension is removed therefrom, according to an embodiment.
Figure 28:
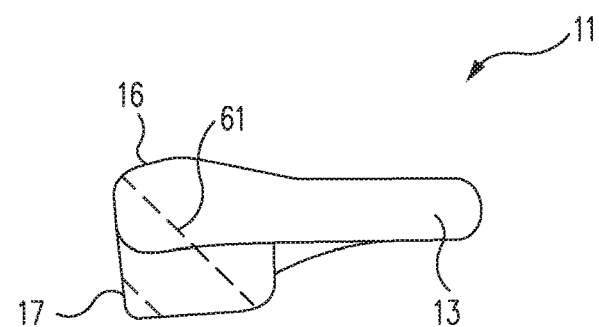
FIG. 28 is a bottom view of the earpiece of FIG. 22, showing the aperture therein with dashed lines, according to an embodiment.

Referring now to FIGS. 27 and 28, an earpiece 11 that is configured for use in the left ear is shown with the extension 12 removed therefrom. Generally arcuate rib 13 and generally vertical rib 14 generally define a D shape. When a mirror image of generally arcuate rib 13 and generally vertical rib 14 are configured for use in the right ear, a reverse (mirror image) generally D shape is similarly defined.

In one embodiment, for a medium size earpiece, the height, dimension G, can be approximately 1.087 inch and the width, dimension H, can be approximately 0.802 inch. In one embodiment, for a large size earpiece, the height, dimension G, can be approximately 1.150 inch and the width, dimension H, is approximately 0.850 inch.

In various embodiments, an earpiece 11 can optionally be used without an extension 12. The number of flanges 18 and 19, as well as the configuration of the flanges 18 and 19, can be varied to provide a desired balance of intensity of ambient sound and sound from the radio. The configuration of the flanges 18 and 19 can include the thickness thereof and the presence of openings 31 therein. This balance can depend upon the environment in which the earpiece 11/extension 12 is being used and can also depend upon the wearer's preference.

Figure 29:
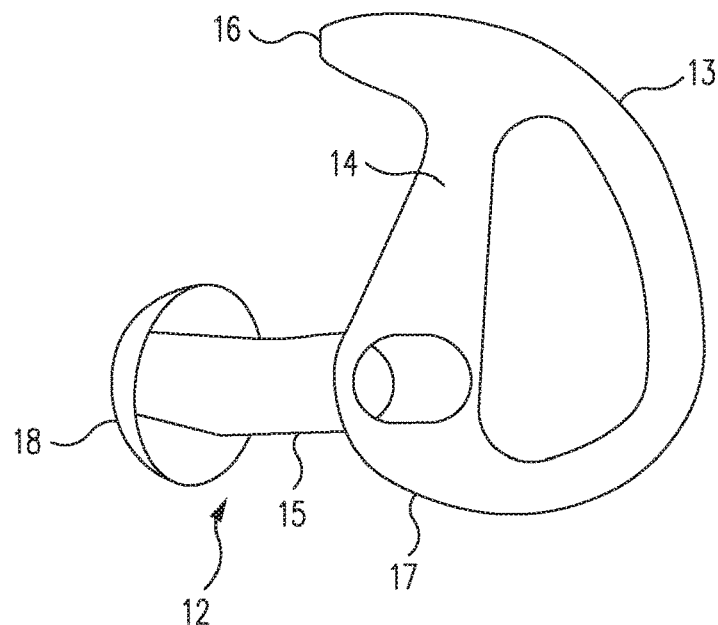
FIG. 29 is a perspective view of an earpiece having a flanged extension, according to an embodiment.

Referring now to FIGS. 29 and 30, outer flange 19 can optionally be omitted. Indeed, as mentioned above, extension 12 can comprise any desired number of flanges, including no flanges. In some instances, a single flange may perform adequately. This is particularly true when it is desirable to allow the wearer to hear ambient sound. Omitting the other flange(s) better allows ambient sound to be heard. In some applications, the primary reason for wearing the earpiece 11 may be to allow the wearer to better hear radio communications. Positioning output port 26 close to the eardrum accomplishes this goal.

Figure 31:
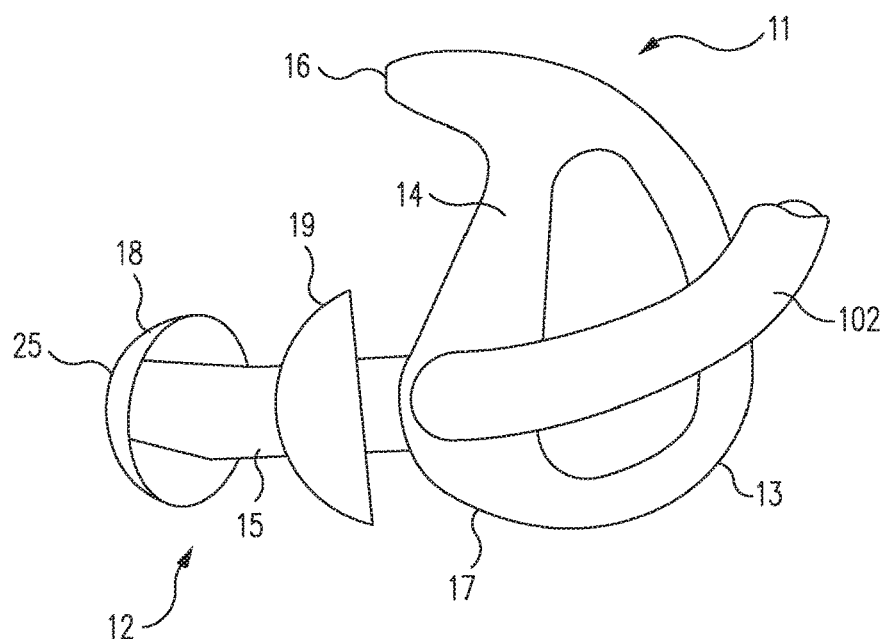
FIG. 31 is a perspective view of the earpiece of FIG. 22 having acoustic tubing attached thereto, according to an embodiment.

Referring now to FIG. 31, an acoustic tube 102 can be attached to earpiece 11 and/or extension 12 such that a generally continuous bore is defined through which sound can travel from a speaker to the eardrum. A barbed metal or plastic fitting can be used to accomplish such attachment. Other methods of attachment, such as the use of adhesive bonding and/or ultrasonic welding, are likewise suitable.

Since the distal end 25 of extension 12 can be placed close to a wearer's eardrum, the volume of a two-way radio or other device (such as a cellular telephone, music device, or other device) can be substantially reduced. With the volume reduced, sound advantageously cannot be as easily heard by others. Thus, during covert operations, for example, the likelihood of someone other than the wearer undesirably hearing sound from a two-way radio is substantially mitigated. By reducing the sound volume, smaller, less powerful, and/or less expensive speakers can be used. Placing the sound closer to the eardrum can make it easier for the hearing impaired to hear.

Sound transmissive embodiments (such as those embodiments having a bore 22 formed through stem 15) can similarly be used with a variety of personal electronic devices that produce sound, including two-way radios, cellular telephones, music devices, personal digital assistants (PDAs), desktop computers, laptop computers, notebook computers, pocket PCs, hearing aids, and other devices.

Figure 32:
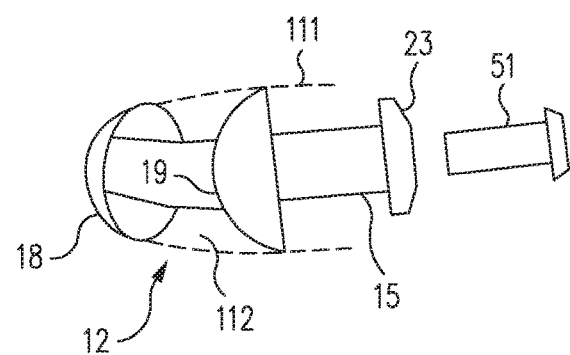
FIG. 32 is a perspective view of the extension of FIG. 26, showing the Hocks filter exploded therefrom and also showing a flexible skin (dashed lines) formed partially thereover, according to an embodiment.

Referring now to FIG. 32, according to another embodiment the extension 12 comprises one or more flanges 18 and 19 (similar to those of FIGS. 22, 23, 24, 25, 26, 29, 30, and/or 31), having a skin or covering 111 formed thereover. Covering 111 can be formed of a thin resilient material, such as rubber, such as that of which common balloons are formed. Optionally, foam or gel 112 can be disposed between the covering 111 and flanges 18 and 19. Foam or gel 112 can comprise a biocompatible material, such as a silicon. Foam or gel 112 can extend proximal of flange 19 if desired.

Foam or gel 112 can be injected between covering 111 and flanges 18 and 19 through openings 41 (see FIG. 25), as discussed herein. Such a covering 111 can be used with extension 12 shown in FIG. 25, where an extrudable substance (which can be a foam or gel) is injected into bore 22 (see FIGS. 22 and 23) and passes through holes 41 to fill the void between the flanges 18 and 19.

Thus, according to at least one exemplary embodiment the extension 12 can comprise a tube (such as stem 15) and a skin or covering 111 (e.g., a rubber skin in one example), wherein foam or gel 112 or some other resilient substance is disposed between the tube and the skin or covering 111. The tube can be formed of a flexible polymer material. However, the tube may alternatively be formed of a rigid polymer or metal material. The tube, foam or gel 112, and skin or covering 111 can be attached to one another via any desired combination of friction fitting, adhesive bonding, and ultrasonic welding. The extension 12 can be tapered to facilitate easy insertion into the ear canal 5509 and to provide a good fit therein. The covering 111 can be smooth and/or lubricated so as to facilitate easy insertion thereof.

Any desired combination of flanges, foam, fiber, and fabric can be used to at least partially block the ear canal 5509 and thereby mitigate the transmission of sound therethrough. For example, the flange 18 of the extension 12 of FIG. 30 could be replaced with a section of foam or gel similar to the foam or gel 112 shown in FIG. 32.

In various embodiments, the extension 12 can be bent as shown in FIGS. 22-26 and 29-32 so as to better conform to the shape of the ear canal 5509. Alternatively, extensions can be provided that are generally vertical (e.g., straight) as shown in FIGS. 33-36 further discussed herein. If an extension is generally vertical, it can be formed of a material that is bendable, so that the extension can conform, at least somewhat, to the shape of the ear canal 5509 when inserted therein.

The aperture 161 (see FIG. 27) in earpiece 111 can be configured such that the extension 12 is positioned at the top of the ear canal 5509, at the bottom of the ear canal 5509, at one side of the ear canal 5509, or is approximately centered in the ear canal 5509. In one embodiment, configuring the aperture 61 such that the extension 12 is not approximately centered causes the extension 12 to be biased toward an inner surface of the ear canal 5509 and can help to keep the earpiece 11 and extension 12 in the ear. In one embodiment, if the earpiece 11 and/or the flanges 18 and 19 of the extension 12 are sufficient to keep the earpiece 11 and the extension 12 in the ear, then the extension 12 can be positioned approximately in the center of the ear canal 5509. Positioning the extension 12 approximately in the center of the ear canal 5509 may be more comfortable for some wearers.

Any of the extensions disclosed herein that employ flanges can either be ambidextrous (fainted to fit either the right or left ear), or can be dedicated to fit only one ear. Thus, the flanges can be either radially symmetric for use with either ear, or can be asymmetric such that they tend to be optimized for a particular ear (left or right). They can also be optimized in configuration so as to better fit a particular person's ear.

In certain embodiments, any of the flanges disclosed herein may be formed integrally with the stem of an associated extension. In other embodiments, the flanges may be formed separate from the stem and may be formed of a different material with respect thereto.

In various embodiments, an extension may be provided with multiple flanges to advantageous effect over implementations employing fewer flanges. For example, in one embodiment, multiple flanges may permit an earpiece to be better secured in the ear. In another embodiment, multiple flanges may mitigate ambient sound before such sound reaches a wearer's eardrum, particularly if the flanges do not have holes formed therein. In another embodiment, multiple flanges may better prevent the sound of a radio or other sound device from escaping from the ear and thus prevent such sound from being undesirably heard by others, particularly if the flanges do not have holes formed therein.

Figure 33:
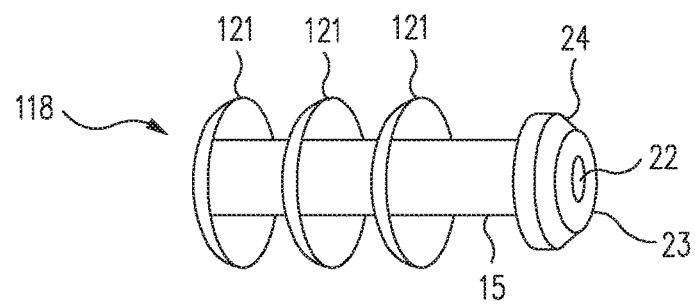
FIG. 33 is a perspective view of an extension having three flanges, according to an embodiment.

FIGS. 33-38 illustrate several extensions that may be used with the various earpieces of the present disclosure. Referring now to FIG. 33, an extension 118 can have three flanges 121 formed upon stem 15 thereof. As those skilled in the art will appreciate, the use of more flanges generally provides better sound reduction. The use of more flanges can also better secure the extension 118 within the ear canal 5509.

Figure 34:
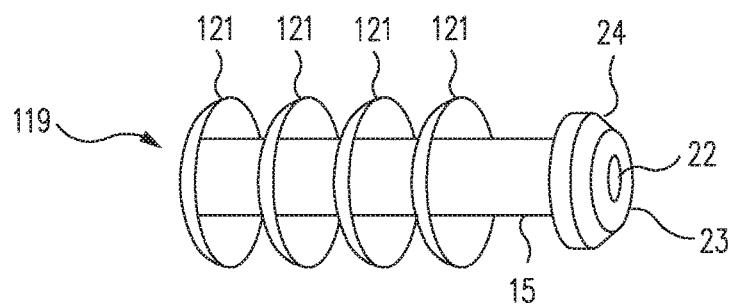
FIG. 34 is a perspective view of an extension having four flanges, according to an embodiment.

Referring now to FIG. 34, an extension 119 can have four flanges 121 formed upon stem 15 thereof. Indeed, the extension 119 can have any desired number of flanges formed upon stem 15 thereof.

Figure 35:
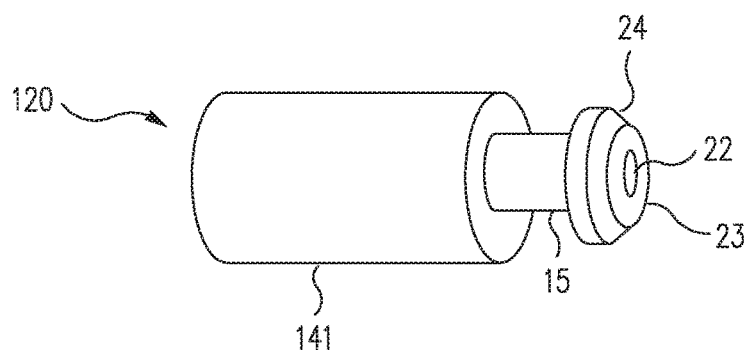
FIG. 35 is a perspective view of a foam, fiber, or fabric extension, according to an embodiment.
Figure 36:
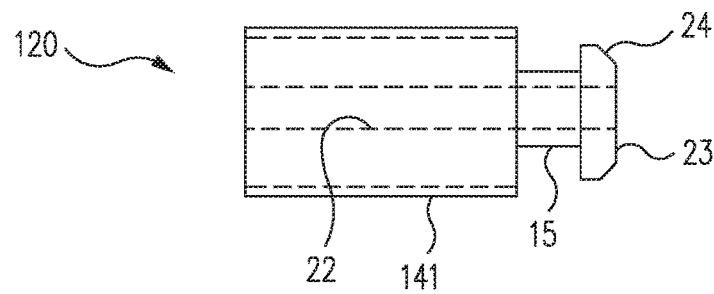
FIG. 36 is a side view of a foam, fiber, or fabric extension having a sound transmissive bore formed therethrough, according to an embodiment.
Figure 37:
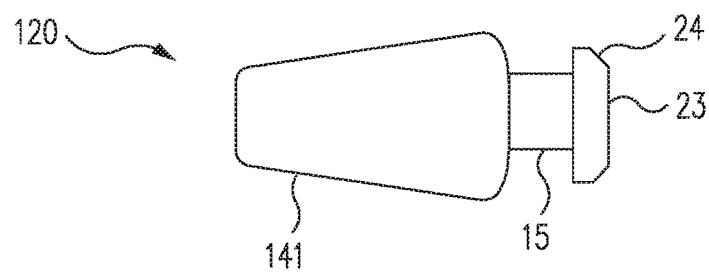
FIG. 37 is a side view of a tapered foam, fiber, or fabric extension, according to an embodiment.

Referring now to FIGS. 35-37, an extension 120 may include a stem 15 covered with a resilient substance 141 such as foam, fiber, or fabric. Foam, such as a polymer foam, can be used to define a portion of the extension 120. In one embodiment, the foam is compressed before or as it enters the ear canal 5509 and then expands so as to effectively block at least a portion of the ear canal 5509. In a similar manner, fiber, such as cotton, can be used to define a portion of the extension. For example, cotton can cover a portion of the extension in a manner similar to the way that cotton covers the end of a cotton swab. Cotton fiber is sufficiently compressible and resilient so as to function in a manner similar to foam. Fabric, such as woven cotton, can similarly be used to cover a portion of the extension 120. Any desired combination of foam, fiber, and fabric may be used. For example, cotton fabric can be used to cover cotton fiber.

Referring now to FIG. 37, the resilient substance 141 can be tapered. In one embodiment, tapering the resilient substance 141 makes it conform better to the shape of the ear canal 5509. In one embodiment, tapering the resilient substance 141 can make insertion thereof into the ear canal 5509 easier.

The resilient substance 141 of FIGS. 35-37 can be formed over stem 15, as discussed above. Alternatively, the resilient substance 141 can be attached to head 23 or the like without being formed over a stem. For example, the resilient substance 141 can be attached to a shorter stem that does not pass substantially therethrough. As a further example, the resilient substance 141 can be attached directly to head 23 or the like.

Figure 38:
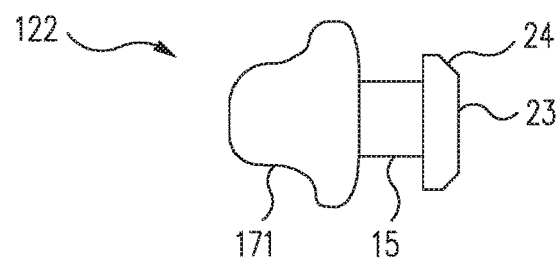
FIG. 38 is a side view of an extension that in use is not inserted substantially into the ear canal, according to an embodiment.

Referring now to FIG. 38, an extension 122 is shown with a portion 171 that is inserted into the ear canal 5509 and can be formed such that it does not substantially enter the ear canal 5509. The portion 171 can be formed of a rigid material or of a resilient substance. It can also be formed by providing a resilient layer over a substantially rigid material. It need only enter the ear canal 5509 far enough so as to be effective in mitigating the level of ambient sound reaching the eardrum.

The number of flanges and/or the selection of resilient material can selectively determine the intensity and/or frequency of ambient sound that is transmitted to a wearer's eardrum. Thus, control over the ambient sound that is heard can be achieved. Desirable, lower intensity sounds can be readily transmitted to the eardrum, while harmful, higher intensity sounds are attenuated.

The use of an extension moves sound closer to the eardrum, thus making it substantially easier to hear cellular telephones, music devices, and the like. This can allow the cellular telephone or other device to operate at a substantially lower sound level, such as at 70-75 dB, for example. The extension can, for example, extend approximately half way up the ear canal 5509. It has been found that the use of such an extension can boost sound by up to approximately 15 dB. Such a boost can make sound much easier to hear in noisy environments, such as in crowds. At the same time, the use of an open earpiece (an earpiece that does not completely obscure the ear canal 5509, such as that shown in FIG. 27) allows the user to hear ambient sound. Such a boost of the sound level provides enhanced listening to cellular telephones and other devices that is beneficial for both hearing impaired and normal hearing people.

Methods and systems for interconnecting acoustic devices, such as those of a communications system, are disclosed. Such methods and systems can facilitate the attachment of multiple acoustic devices to a single earpiece so as to facilitate easy and convenient listening to the acoustic devices. A plurality of acoustic devices can be heard simultaneously, if desired.

According to an embodiment, a multiple input acoustic coupler can comprise an output port configured to attach to an earpiece and a plurality of input ports in acoustic communication with the output port. Each port (input and/or output) can comprise an elongated tubular portion. Each port can optionally further comprise one or more barbs for securely attaching the multiple input acoustic coupler to desired items. For example, the output port can be attached to an earpiece and each of the input ports can be attached to an audio device. The input ports can be attached to the audio devices via acoustic tubing.

The tubular portions of the multiple input acoustic coupler can be generally orthogonal with respect to one another. The tubular portions of the multiple input acoustic coupler can be non-orthogonal with respect to one another. The tubular portions of the multiple input acoustic coupler can be at any desired angle or combination of angles with respect to one another. Thus, the input ports can be generally orthogonal with respect to the output port. Also, the output port and the input ports can be generally orthogonal with respect to one another.

The input ports can be configured so as to accommodate the anatomical configuration of the ear. For example, the multiple input acoustic coupler can comprise two input ports and one output port in which the angle between the two input ports is an angle that allows the two input ports to be comfortably disposed upon the two sides of the tragus 5505. The angle between each of the input ports and the output port can similarly be an angle that allows the two input ports to be comfortably disposed upon the two sides of the tragus 5505. The angle between the two input ports can be greater than 90 degrees and the angle between each input port and the output port can be greater than 90 degrees. By accommodating the anatomical configuration of the ear, the multiple input acoustic coupler can be made more ergonomic.

The input ports can be approximately the same size with respect to one another. Alternatively, input ports can be different sizes with respect to one another.

Similarly, the output port and the input ports can be approximately the same size with respect to one another. Alternatively, the output port and the input ports can be different sizes with respect to one another. All of the ports (input and/or output) can be different sizes with respect to one another.

All of the ports can have approximately the same diameter or the ports can have different diameters. All of the ports can have approximately the same length or the ports can have different lengths. Moreover, the ports can be of any desired combination of diameters, lengths, angles with respect to one another, and configurations (such as regarding number of barbs).

The multiple input acoustic coupler can comprise two ports, three ports, four ports, or more ports. The multiple input acoustic coupler can comprise up to five generally orthogonal input ports. The multiple input acoustic coupler can comprise any desired number of non-orthogonal input ports. The multiple input acoustic coupler will typically comprise one output port. The multiple input acoustic coupler can comprise any desire number of input ports.

The input ports and the output port can be formed of plastic. The input ports and the output port can be integrally formed, such as by molding all of the ports of the multiple input acoustic coupler as a single device. Ports can be formed of different materials with respect to one another.

The multiple input acoustic coupler can comprise a plurality of ports that are attachable to one another. In this manner, the ports can be custom configured for a particular application and/or user. For example, the angle between two adjacent input ports, as well as the diameter and length of the input ports, can be tailored so as to better accommodate the user's ear anatomy, particularly that of the concha and the tragus 5505.

The multiple input acoustic coupler can be formed of a material that allows the ports to be bent. Thus, the angle of the ports with respect to one another, as well as the shape of the ports, can be varied. The input ports can be bent so as to better accommodate the anatomical structures of the ear. For example, the input ports can be bent so as to provide better routing around the tragus 5505.

An embodiment can comprise an earpiece assembly comprising an earpiece configured to be received within the concha of an ear and a multiple input acoustic coupler attached to the earpiece. The acoustic coupler can comprise an output port configured to attach to an earpiece and a plurality of input ports in acoustic communication with the output port. Each of the input ports can be attached to a different audio device so as to facilitate listening thereto.

An embodiment can comprise a cable assembly comprising at least two electrical cables configured to communicate electrical signals representative of sound, at least two speakers in which each speaker is in electrical communication with a dedicated one of the electrical cables, at least two acoustic tubes in which each acoustic tube is in acoustic communication with a dedicated one of the speakers, and an acoustic coupler in acoustic communication with the acoustic tubes. The acoustic coupler can comprise an output port configured to attach to an earpiece and a plurality of input ports in acoustic communication with the output port. An earpiece can be in acoustic communication with multiple input acoustic couplers.

An embodiment can comprise a method for assembling an earpiece assembly in which the method comprises attaching an acoustic coupler to an earpiece. The acoustic coupler can comprise an output port that is configured to attach to the earpiece and a plurality of input ports that are in acoustic communication with the output port. The acoustic coupler can be attached to the earpiece by any desired method. For example, the acoustic coupler can be friction fit, attached via barbs or detents, adhesively bonded, and/or ultrasonically welded to the earpiece.

Optionally, a filter can be disposed within or proximate one of the ports. For example, a Hocks filter can be disposed within the output port to facilitate filtering of all of the audio provided to the earpiece. Similarly, a Hocks filter can be disposed within one or more of the input ports to facilitate filtering of the audio provided via those particular input ports.

The output port and the input ports can have any desired number of barbs formed thereon. For example, the output port and the input ports can have zero, one, two, three, four, or more barbs formed thereon. Each port (input or output) can have any desired number of barbs formed thereon. Thus, each port does not have to have the same number of ports formed thereon. For example, the output port can have zero barbs formed thereon, one input port can have one barb formed thereon, another input port can have two barbs formed thereon, and another input port can have three barbs formed thereon. Thus, the multiple input acoustic coupler can have any desired combination of barbs formed upon the ports thereof.

Indeed, the multiple input acoustic coupler can have any combination of port diameters, lengths, number of barbs and any other attributes. For example, all of the ports can have different diameters, lengths, and number of barbs.

According to an embodiment, a method for providing sound from two audio devices to an earpiece can comprise acoustically mixing the sound in a fitting that is attached to the earpiece. The fitting can have any desired physical configuration.

Figure 39:
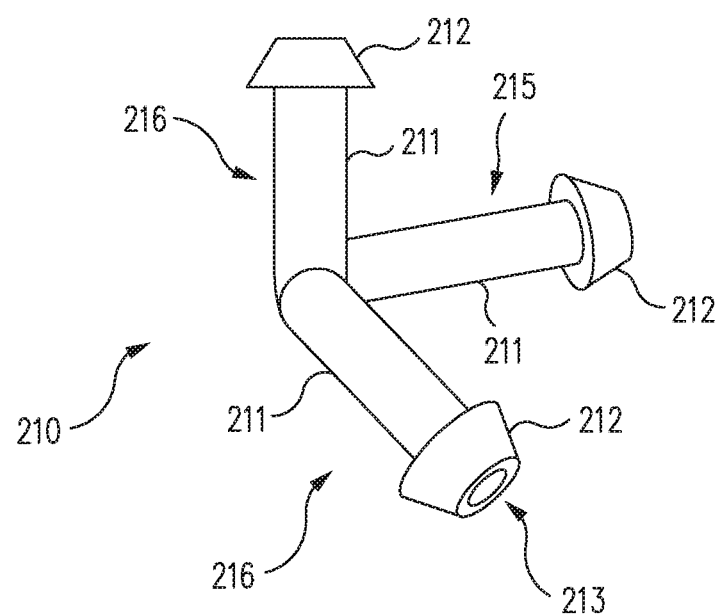
FIG. 39 is a perspective view of a single barb multiple input acoustic coupler, according to an embodiment.
Figure 40:
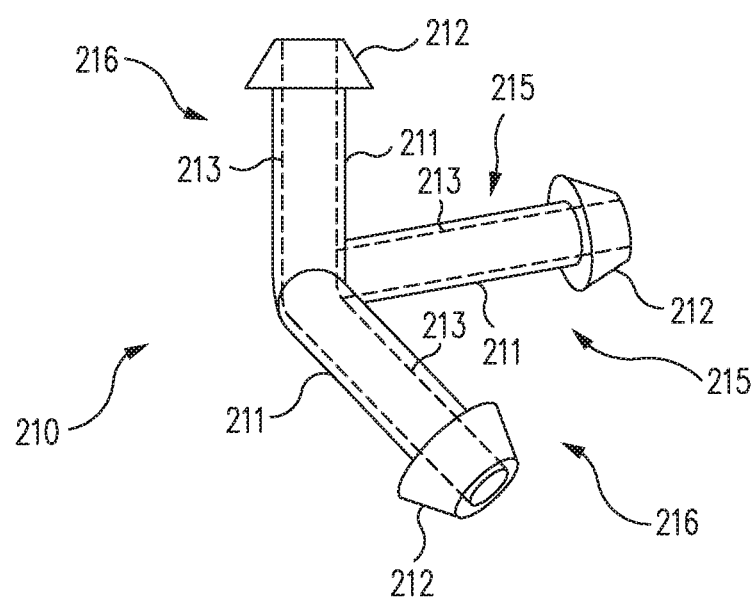
FIG. 40 is a perspective view of the multiple input acoustic coupler of FIG. 39, showing in dashed lines the bores of the acoustic coupler, according to an embodiment.

Referring now to FIGS. 39 and 40, according to an embodiment, a multiple input acoustic coupler 210 comprises three ports. Each port can comprise a tubular portion 211 and a barb 212. The ports can be generally orthogonal to one another. Alternatively, the ports can be at any other desired angle with respect to one another.

One of the ports can be an output port 215. The other two ports can be input ports 216. The output port 215 and the input ports 216 can be substantially identical to one another, thus making the designations of output and input somewhat arbitrary (at least when the acoustic coupler 210 is not attached to anything). Alternatively, the output port 215 and/or the input ports 216 can be different from one another. For example, the ports can vary in length, inner diameter, outer diameter, number of barbs, material, configuration of bore (presence of obstructions or filters) or in any other aspect thereof.

The tubular portion 211 of each port can comprise a bore 213 formed therethrough. The bore 213 can be formed entirely through the tubular portion 211 or can be formed partially therethrough. The bore 213 can be formed entirely through the tubular portion so as allow sound to travel therethrough substantially unmodified. The bore 213 can be formed partially through the tubular portion 211 so as to modify sound passing therethrough. For example, the bore 213 can contain obstructions, partitions, filters, and/or portions of reduced diameter so as to modify the spectral content and/or intensity of sound passing therethrough.

All bores 213 can be interconnected such that sound can be communicated therethrough. Thus, sound from any input port 216 can be transmitted to the output port 215.

Figure 41:
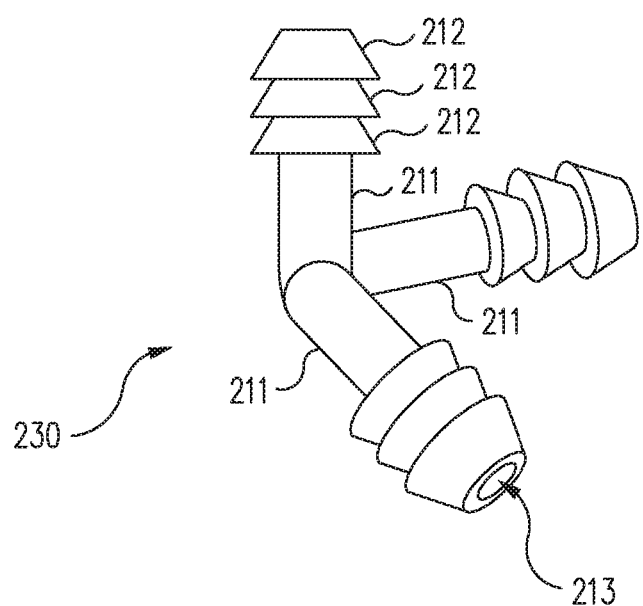
FIG. 41 is a perspective view of a triple barb multiple input acoustic coupler, according to an embodiment.

Referring now to FIG. 41, according to an embodiment, a multiple input acoustic coupler 230 can have three barbs 212 on each port thereof. Generally, the more barbs that a port has, the more securely that port can be attached to another item such as an earpiece or acoustic tubing.

Figure 42:
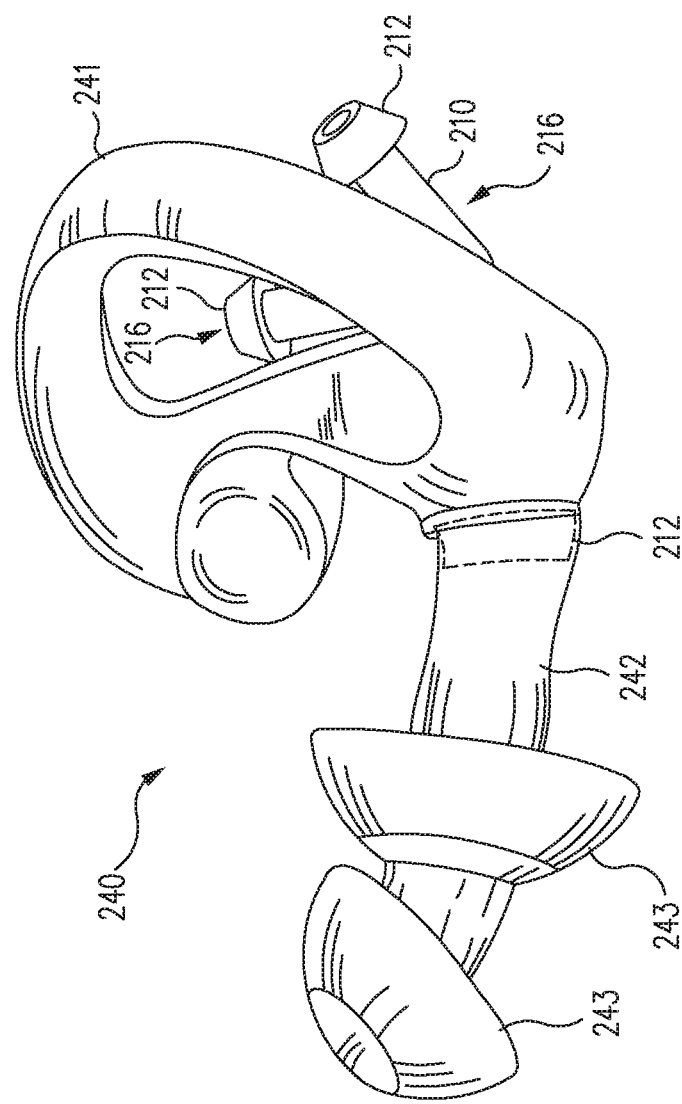
FIG. 42 is a perspective view of an earpiece with a flanged extension and having a multiple input acoustic coupler attached to the earpiece, according to an embodiment.
Figure 43:
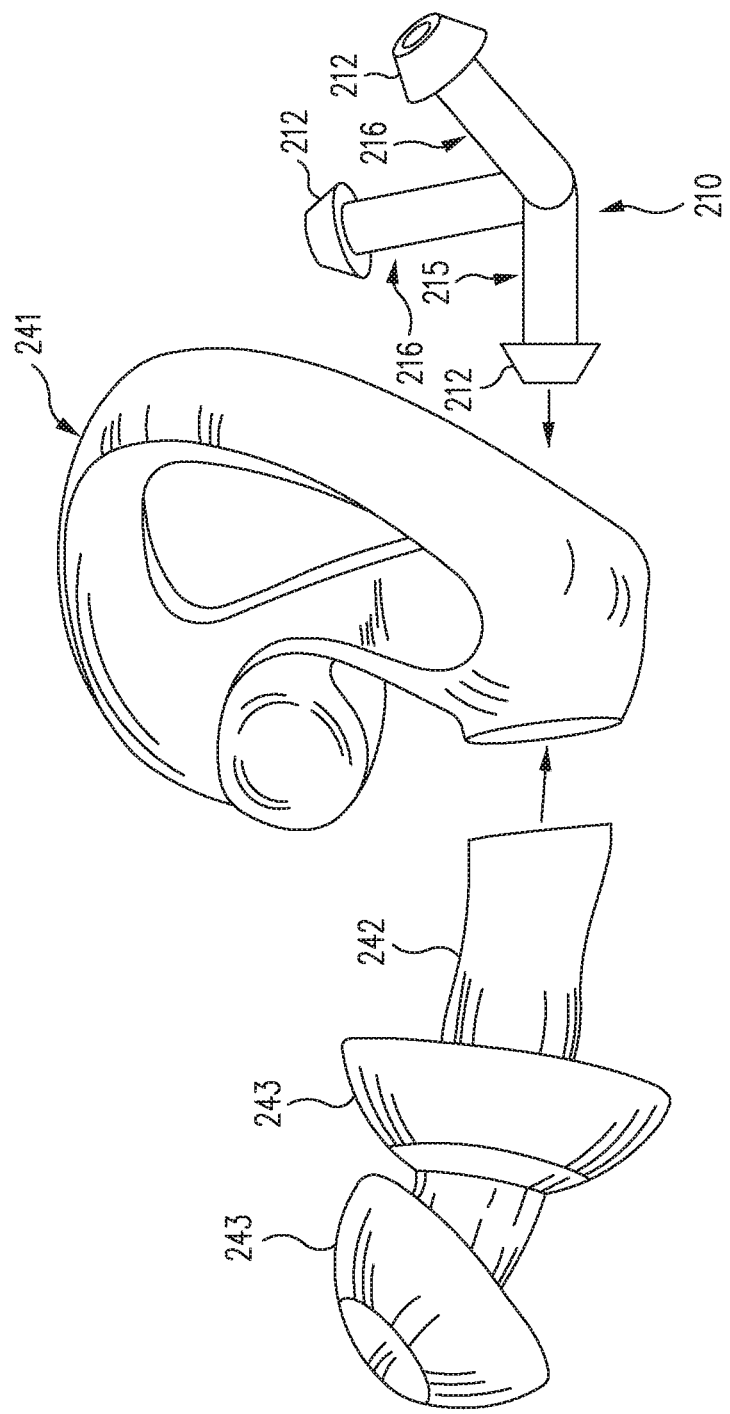
FIG. 43 is an exploded perspective view of the earpiece of FIG. 42, showing the flanged extension and multiple input acoustic coupler, according to an embodiment.

Referring now to FIGS. 42 and 43, an earpiece assembly 240 can comprise a multiple input acoustic coupler 210 that is attached to an earpiece 241. The earpiece 241 can be configured to be disposed within the concha of a user's ear.

Optionally, an insert such as flanged insert 242 (also referred to as an extension) can extend from the earpiece 241. The insert can be configured to be received within a user's ear canal 5509. One or more flanges 243 can be formed upon insert 242.

Figure 44:
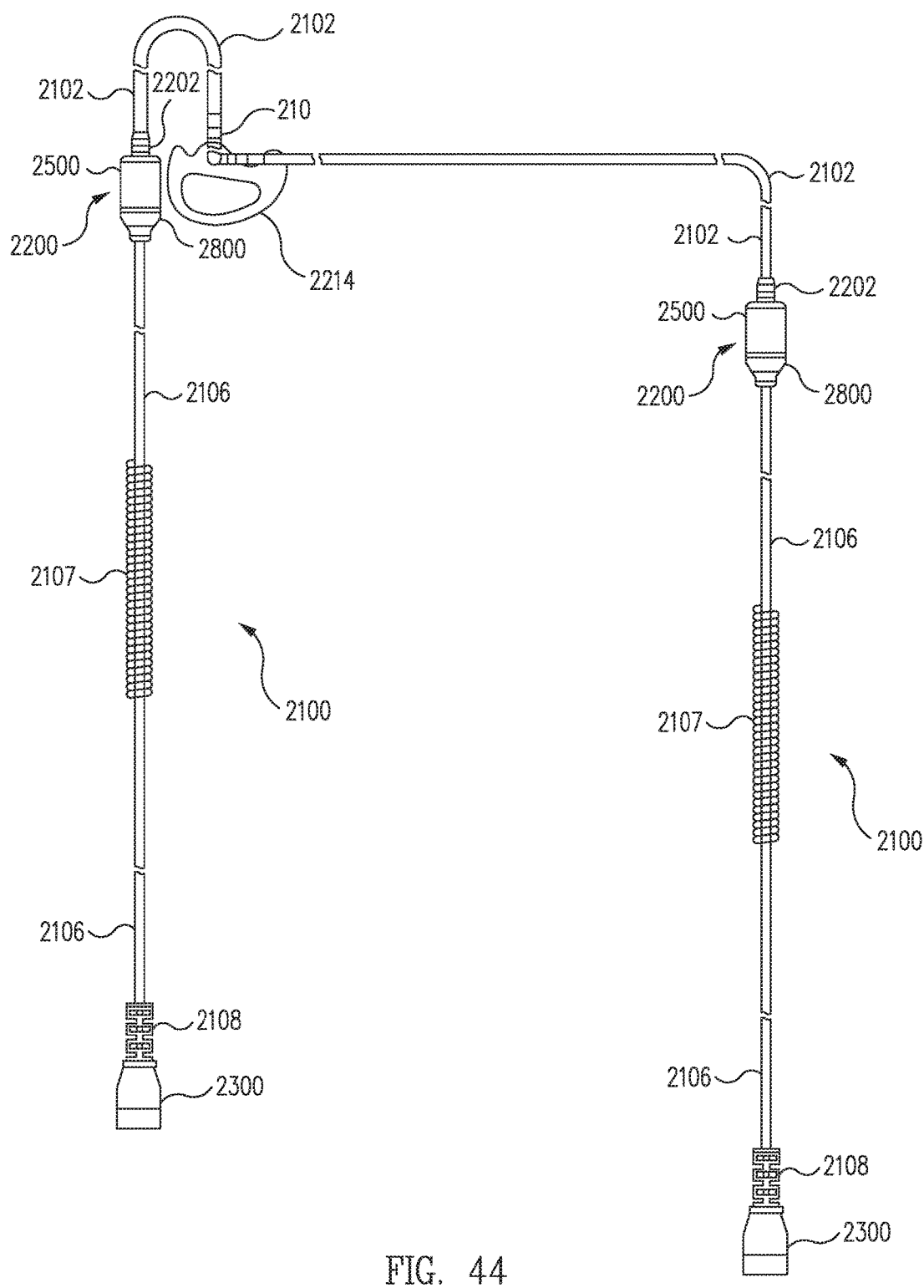
FIG. 44 is a side view of an upper portion of a cable assembly that is attached to an earpiece using a multiple input acoustic coupler, according to an embodiment.

Referring now to FIG. 44, one or more embodiments of the multiple input acoustic coupler can be used to partially define a cable assembly for use with multiple audio devices. For example, the cable assembly can be used with a two-way radio and a cellular telephone. As a further example, the cable assembly can be used with a cellular telephone and a music device. The cable assembly can be used with any desired number and/or combination of audio devices.

Thus, the multiple inlet acoustic coupler allows two or more cables to provide sound to the user's ear. The sound can be provided from each cable (and thus from each audio device) simultaneously. Each cable can be attached to a different audio device and thus can provide different sound to the user's ear. Connectors 2300 of each cable can attach to an audio device. Alternatively, one or more of the connectors 2300 can attach to another cable, such as another cable that has a microphone like the microphone cable 1303 of FIG. 13.

A cable assembly can comprise a plurality of upper portions 2100, as shown in FIG. 44 (in which two upper portions 2100 are shown). The cable assembly can optionally comprise one or more lower portions 1300, as shown in FIG. 13. One or both upper portions 2100 can be connected to a lower portion 1300, to form a radio cable assembly that facilitates both reception and transmission. Alternatively, one or more upper portions 2100 can attach to an audio device within using a lower portion 1300 as discussed above. Thus, an upper portion 2100 can connect directly to an audio device. For example, when the microphone 1400 of the lower portion 1300 is not required, then the upper portion(s) 2100 can be configured so as to connect directly to one or more audio devices.

The upper portions 2100 can comprise speakers 2200 that provide sound to the user's ear via the multiple input acoustic coupler 210. The lower portion 1300 can comprise a microphone 1400, such as for use with a two-way radio and/or a cellular telephone. The upper portion 2100 and the lower portion 1300 can be integrated so as to provide a single cable instead of two separate cable portions.

With particular reference to FIG. 44, two upper cable portions 2100 can be attached to an earpiece 2214 that is configured to fit within the concha of a user's ear so as to transmit sound (such as incoming radio transmissions) to the user's eardrum, according to an embodiment.

Earpiece 2214 can be attached to acoustic tubing 2102, such as via multiple input acoustic coupler 210. Acoustic tubing 2102 can be curved so as to facilitate easy routing thereof behind the ear. Speaker 2200 can be worn directly behind the ear, behind the ear at the neck, in front of the ear, in the ear, or at any other desired location. Either acoustic tubing 2102 from speaker 2200 or electrical cable 2106 to speaker 2200 can pass by or behind the ear.

Acoustic tubing 2102 can be attached to speaker 2200, such as via a barbed fitting 2202. Speaker 2200 can comprise upper 2500 and lower 2800 housings. A multi-conductor electrical cable 2106 can extend from speaker 2200 to a connector, such as female connector 2300 that electrically connects upper portion 2100 of the radio cable assembly 2000 (see FIG. 20) to lower portion 1300 (FIG. 13). For example, electrical cable 2106 can comprise two conductors that facilitate operation of speaker 2200. Strain relief 2108 can be provided for electrical cable 2106 at connector 2300. Electrical cable 2106 can comprise coils 2107 that allow it to stretch as necessary to fit a particular individual.

Electrical cable 2106 can provide electrical signals to speaker 2200. Speaker 2200 can convert such electrical signals into acoustic signals representative thereof (and generally representative of speech received from a portable two-way radio).

A connector, such as male connector 1301, can facilitate electrical connection of lower cable assembly 1300 to connector 300 of upper cable assembly 100. A connector 1302, such as a stereo phono plug, can be used to connect lower cable assembly 1300 (and, with reference to FIG. 20, consequently complete radio cable assembly 2000, to portable two-way radio 2001). Connector 1302 can plug directly into portable two-way radio 2001 or can plug into a side mount 2002 of two-way radio 2001 (FIG. 20).

Figure 45:
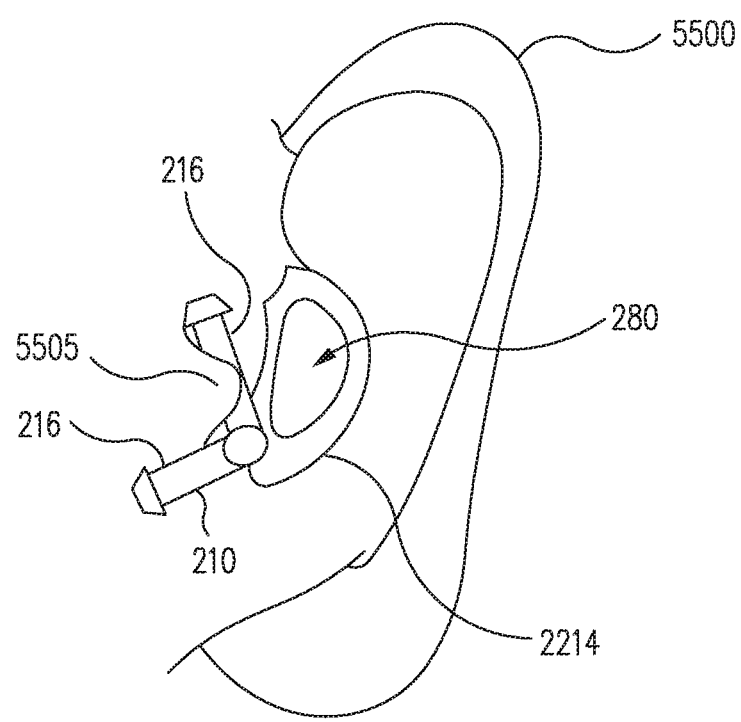
FIG. 45 is a side view of an earpiece disposed within the concha of a user's ear and having a multiple input acoustic coupler attached to the earpiece, according to an embodiment.

Referring now to FIG. 45, an earpiece assembly comprising an earpiece 2214 and a multiple input acoustic coupler 210 is shown being worn by a user, according to an embodiment. The earpiece 2214 is disposed within the concha 280 of the user's ear 5500. The two input ports 216 are routed around the tragus 5505. One input port 216 is routed above the tragus 5505 and one input port 216 is routed below the tragus 5505. In this manner, the input ports 216 of the multiple input acoustic coupler 210 are positioned such that they comfortably facilitate the attachment of two acoustic devices to the earpiece 2214.

The input ports 216 can be bendable as discussed above. In this manner, the input ports 216 can be better routed around the tragus 5505. The input ports 216 can be pre-bent so as to be better routed around the tragus 5505.

Figure 46:
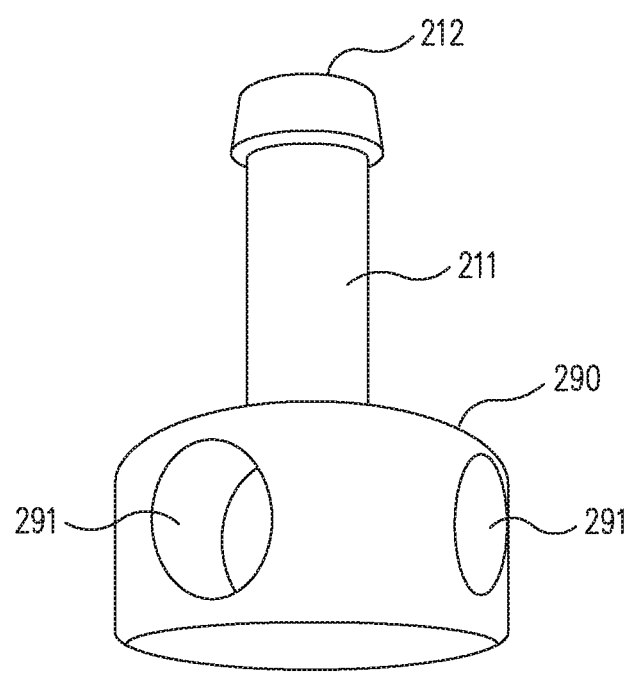
FIG. 46 is a perspective side view of a body and a single barbed tubular portion, according to an embodiment.
Figure 47:
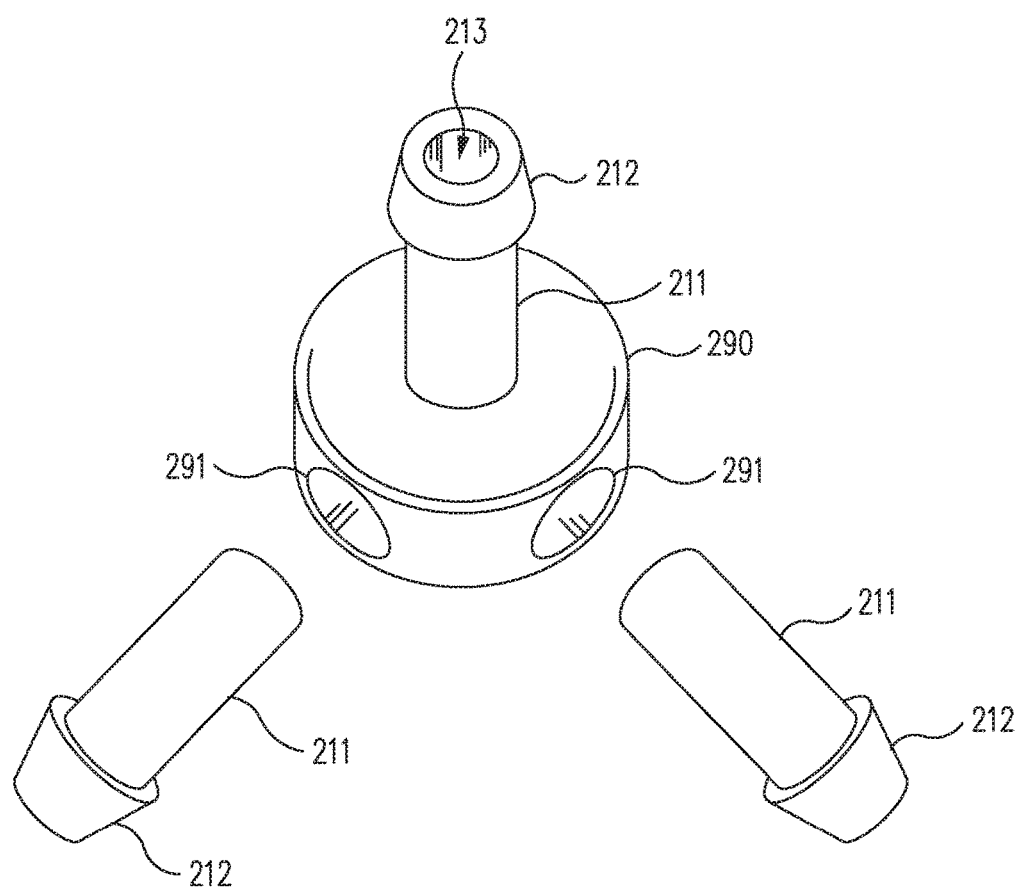
FIG. 47 is an exploded perspective view of the body and tubular portion of FIG. 46, with two more barbed tubular portions, according to an embodiment.
Figure 48:
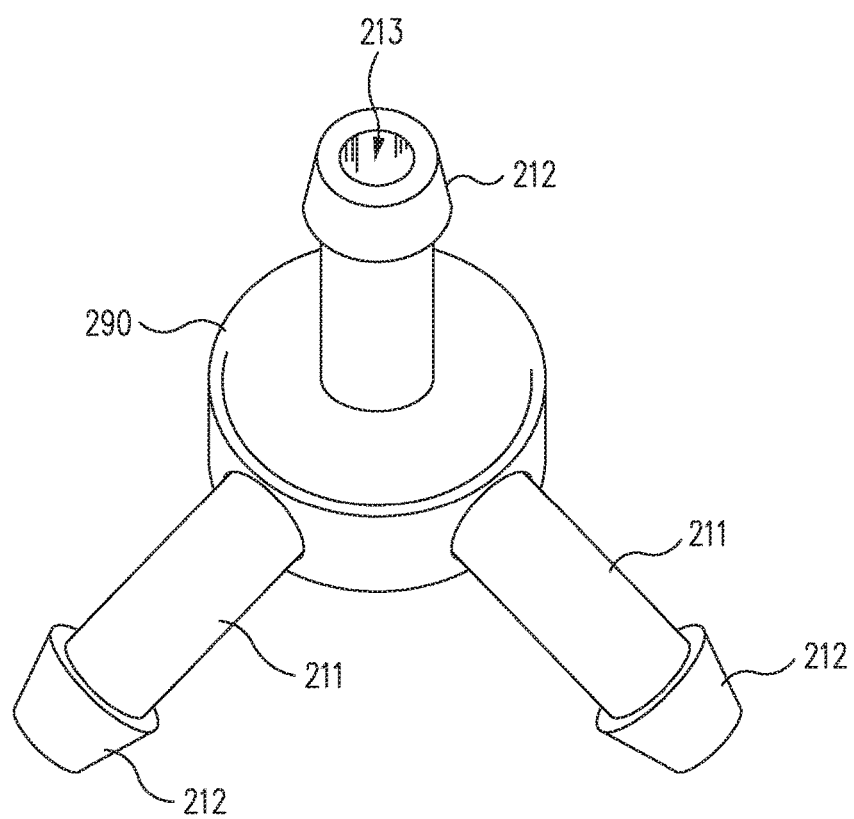
FIG. 48 is a perspective view of the body and barbed tubular portions of FIG. 47 in which all of the barbed tubular portions are attached to the body, according to an embodiment.

Referring now to FIGS. 46-48, an embodiment can comprise a body 290 to which are attached a plurality of tubular portions 211, according to an embodiment. Each tubular portion 211 can have one or more barbs 212 formed thereon. The tubular portions 211 can have bores 213 formed therethrough such that the tubular portions 211 are in acoustic communication with one another.

The body 290 can be generally cylindrical in configuration. The body 290 may be formed with holes 291. One of the tubular portions 211 can extend from a generally flat surface of the body 290. For example, a tubular portion 211 configured for attachment to an earpiece or an ear insert can extend from the flat surface of the body 290. A tubular portion 211 can similarly extend from the opposite generally flat surface of the body 290, if desired.

One or more of the tubular portions 211 can extend from a curved portion of the body 290. For example, two tubular portions 211 that are configured for attachment to acoustic tubing can extend from the curved portion of the body 290.

The body 290 and the tubular portions 211 can be formed as an integral unit. For example, the body 290 and the tubular portions 211 can be integrally molded from plastic. As a further example, the body 290 and the tubular portions 211 can be machined from a single piece of metal.

Alternatively, the body 290 and the tubular portions 211 can be formed separately and subsequently attached together. The tubular portions 211 can be attached to the body 290 by friction fit, adhesive bonding, threading, welding, or any other desired method.

The body 290 and the tubular portions 211 can be formed of stainless steel, aluminum, magnesium, plastic, or any other desired material. The body 290 and the tubular portions 211 can be formed of different materials. For example, the body 290 can be formed of aluminum and the tubular portions 211 can be formed of plastic.

The length of the tubular portions 211 of any embodiment can vary, as desired. For example, the length of the tubular portions 211 can be between two and twenty millimeters, such as ten millimeters.

The inner and outer diameters of the tubular portions 211 of any embodiment can vary, as desired. For example, the inner diameter of the tubular portions 211 can be between one half millimeter and four millimeters, such as two millimeters. For example, the outer diameter of the tubular portions 211 can be between one millimeter and five millimeters, such as three millimeters.

Multiple audio devices, such as any desired combination of two-way radios, cellular telephones and music devices, can be attached to an earpiece. In this manner, an earpiece can be used to simultaneously listen to a plurality of such audio devices. A user can listen to multiple audio devices without reconfiguring an earpiece that is used for such listening.

For example, a user can simultaneously listen to a two-way radio and a cellular telephone. As a further example, a user can simultaneously listen to a cellular telephone and a music device. The audio devices that are connected to the multiple input acoustic coupler do not have to be different audio devices. For example, a user can listen to two or more cellular telephones. Similarly, a user can listen to two or more two-way radios.

The multiple input acoustic coupler allows a user to attach and/or listen to multiple audio devices without having to reconfigure the system. This is particularly advantageous in police operations and battlefield situations, where it may not be safe to reconfigure the system.

The multiple input acoustic coupler can be configured so as to provide enhanced ergonomics and routing with respect to acoustic tubing. The acoustic tubing can be routed around the tragus 5505 in an ergonomic manner that mitigates undesirable contact with the tragus 5505 and/or other anatomical structures of the ear and thus enhance comfort and avoid abrasion.

The multiple input acoustic coupler can make operation of the audio device simpler. For example, a cellular telephone need not be raised to the ear in order to hear it. Again, this may be particularly advantageous in police operations and battlefield situations.

The multiple input acoustic coupler can be used in applications other than communications systems. For example, the multiple input acoustic coupler can be used to direct pressure signals and/or fluid flow in a variety of different tubing systems.

A method and system for facilitating covert radio communications and the like are disclosed. According to an embodiment, a thin acoustic tube facilitates communication of sound from a speaker to an ear insert or earpiece extension that is at least partially within the wearer's ear canal 5509.

According to contemporary practice, acoustic tubing having an outer diameter of approximately 3 mm and an inner diameter of approximately 1.5 mm facilitates the communication of sound from a speaker to the wearer's ear. However, such contemporary acoustic tubing is substantially conspicuous and obtrusive. That is, it is comparatively easy to notice. Having the acoustic tubing noticed can jeopardize covert operations and endanger a covert operative's safety.

Thin acoustic tubing is substantially less conspicuous and obtrusive. It is therefore substantially less likely to be noticed during covert operations. Thin acoustic tubing can be defined herein as tubing having an outer diameter of approximately 0.8 mm to approximately 1.4 mm. Thin acoustic tubing can have an inner diameter of approximately 0.4 mm to approximately 0.8 mm. For example, thin acoustic tubing can have an outer diameter of approximately 1.0 mm and an inner diameter of approximately 0.5 mm. Thin acoustic tubing can be clear, flesh colored (colored to match the color of the skin of the wearer), of any other color that tends to make the tubing less likely to be noticed when worn.

Thin acoustic tubing can be more comfortable to wear, as compared to conventional acoustic tubing. Thin acoustic tubing is lighter and therefore less noticeable to the wearer than conventional acoustic tubing. The smaller outer diameter of thin acoustic tubing allows it to pass over the ear (between the top of the ear and the head) more easily.

Figure 49:
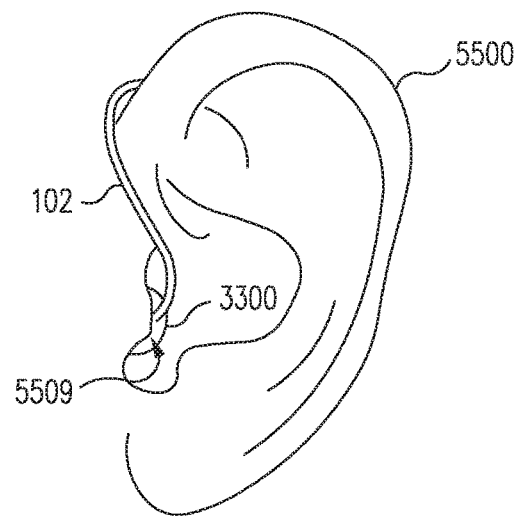
FIG. 49 is a side view of an ear having an ear insert worn within the ear canal, in which the ear insert has a thin acoustic tube extending from the ear insert, according to an embodiment.

Referring now to FIG. 49, a foam ear insert 3300 is inserted within the ear canal 5509 of a wearer's ear 5500, according to an embodiment. The foam ear insert 3300 can have a covering so as to define a reusable foam ear insert. Such a reusable foam ear insert is described in detail with respect to FIGS. 56 and 57 below.

A thin acoustic tube 102 extends from the foam ear insert 3300 (also referred to as a foam insert) and passes over the top of the ear 5500. The thin acoustic tube 102 facilitates the communication of sound from a speaker to the foam ear insert 3300. The thin acoustic tube 102 can attach to a speaker and amplifier, which can be behind the ear 5500. The speaker and amplifier can be used to enhance ambient sound. Either alternatively or additionally, the thin acoustic tube 102 can attach to just a speaker, which can be behind the ear 5500. The speaker can be part of a two-way radio system. Thus, the inconspicuous communications assembly can be used to facilitate enhanced listening to ambient sound and/or to facilitate listening to a sound producing device such as a two-way radio or cellular telephone.

The use of thin acoustic tube 102 in combination with a foam ear insert 3300 provides an inconspicuous and unobtrusive communications assembly. The likelihood of undesirable detection of the communications assembly can be further mitigated by coloring the thin acoustic tube 102 and the covering of the foam ear insert 3300 so as to match the color of the wearer's skin.

Figure 50:
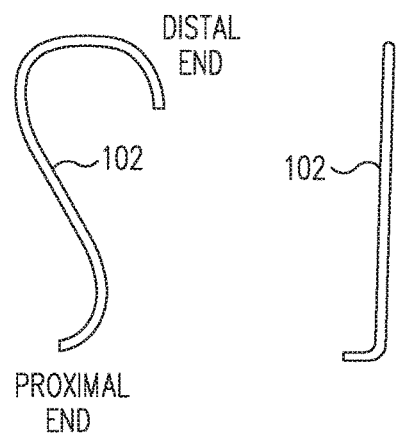
FIG. 50 is a side view of an acoustic tube, according to an embodiment.
Figure 51:
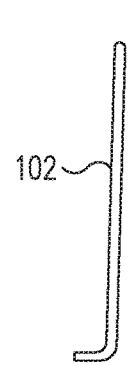
FIG. 51 is a front view of an acoustic tube, according to an embodiment.

Referring now to FIGS. 50 and 51, the thin acoustic tube 102 can be generally shaped somewhat like the letter "S", according to an embodiment. In this manner, routing over the ear and to the ear canal 5509 is readily facilitated. As shown in FIG. 51, there can be a sharp, e.g., approximately right angle, bend near the bottom of the thin acoustic tube 102 so as to position the proximal end thereof for connection to the ear insert 3300.

Figure 52:
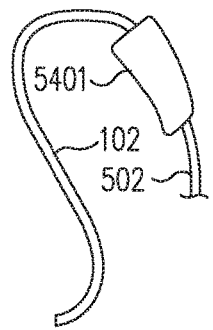
FIG. 52 is a side view of an acoustic tube, having a microphone, sound amplifying circuitry, and speaker attached to the acoustic tube, according an embodiment.

Referring now to FIG. 52, a microphone, amplifier, and speaker assembly 5401 can pick upon ambient sound, amplify the ambient sound electronically, and provide the amplified ambient sound to an ear insert such as foam ear insert 3300 of FIGS. 49 and 54-57 or to an earpiece and/or extension such as those of FIGS. 58-61, according to an embodiment. Thus, the microphone and amplifier assembly 5401 can be attached to the distal end of thin acoustic tube 102 and an insert, earpiece, and/or extension can be attached to the proximal end thereof. The speaker of the microphone and amplifier assembly 5401 can also be provided a signal from a device such as a cellular telephone or two-way radio.

The use of such a microphone and amplifier assembly 5401 can be particularly advantageous in covert operations in which it is desirable to hear ambient sound, such as voices. It facilitates listening to ambient sound while also listening to a two-way radio.

Figure 53:
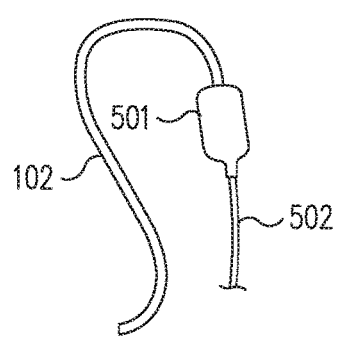
FIG. 53 is a side view of an acoustic tube, having a speaker attached to the acoustic tube, according to an embodiment.

Referring now to FIG. 53, a speaker 501 can be attached to the distal end of thin acoustic tube 102, according to an embodiment. A cable 502 can provide electrical communication from a two-way radio to speaker 501. Alternatively, cable 502 can provide electrical communication from a radio receiver, a cellular telephone, a music device or the like.

Referring now to FIGS. 54 and 55, a foam ear insert 3300 can be attached to the proximal end of thin acoustic tube 102, according to an embodiment. The foam ear insert 3300 substantially blocks ambient sound while communicating sound from a speaker (such as speaker 501 of FIG. 53) through the ear canal 5509.

With particular reference to FIG. 55, the thin acoustic tube 102 can pass almost through or entirely through the foam ear insert 3300, according to an embodiment. Thus, the proximal end of thin acoustic tube 102 can be flush with or extend from the foam ear insert 3300. In this manner, the proximal end of thin acoustic tube 102 can be placed proximate the eardrum so as to achieve the benefits discussed in detail below.

Referring now to FIGS. 56 and 57, an exemplary reusable foam ear insert 3300 can comprise a foam body 301 having a covering 302 formed thereover and having a bore 303 formed generally centrally and longitudinally therethrough, according to an embodiment. The bore 303 can be formed concentrically with respect to the central axis of the body 301 or can be formed at an angle, offset, or eccentrically with respect thereto. The bore 303 can have an outer (generally disposed outside of the ear 5500) opening 304 and an inner (generally disposed inside of the ear 5500) opening 305. The bore 303 facilitates the communication of sound through the ear canal 5509.

The bore 303 can comprise an opening formed through the body 301. Optionally, the bore 303 can comprise a tube disposed within the opening. The tube can be substantially more rigid than the foam of the body 301. For example, the body 301 can comprise foam rubber and the tube can comprise more solid rubber. Such use of a tube can inhibit the undesirable collapse of the bore 303 when the ear insert is disposed within the ear canal 5509.

Thus, a covert communications system may comprise, for example, a two-way radio that is worn beneath the clothing, an electrical cable 502 that extends from the two-way radio to the speaker 501, and a thin acoustic tube 102 that extends from the speaker 501 to a foam ear insert 3300. A cellular telephone can be used instead of a two-way radio.

Figure 58:
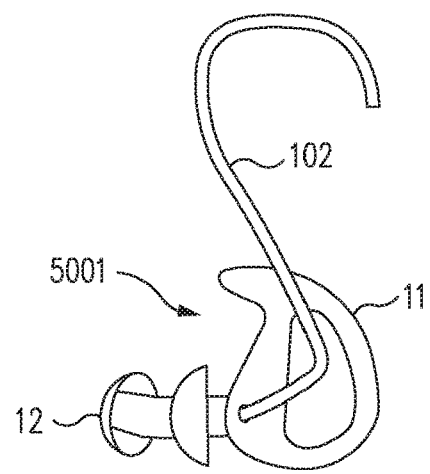
FIG. 58 is a side view of an earpiece with an extension having a thin acoustic tube extending from the earpiece, according to an embodiment.
Figure 59:
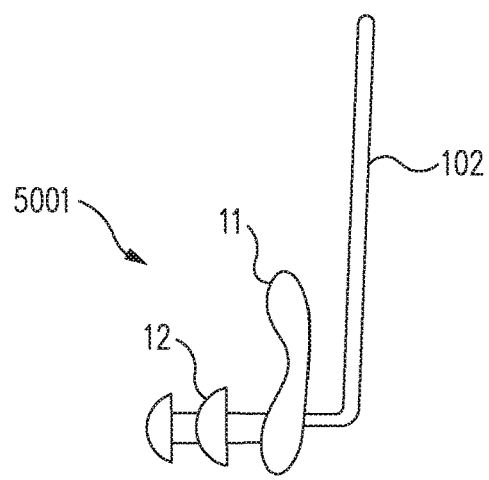
FIG. 59 is a front view of an earpiece with an extension having a thin acoustic tube extending from the earpiece, according to an embodiment.

Referring now to FIGS. 58 and 59, an earpiece with a flanged extension 5001 is attached at the proximal end of thin acoustic tube 102, according to an embodiment. The earpiece with flanged extension 5001 can comprise earpiece 11 having a extension 12 attached thereto.

Figure 60:
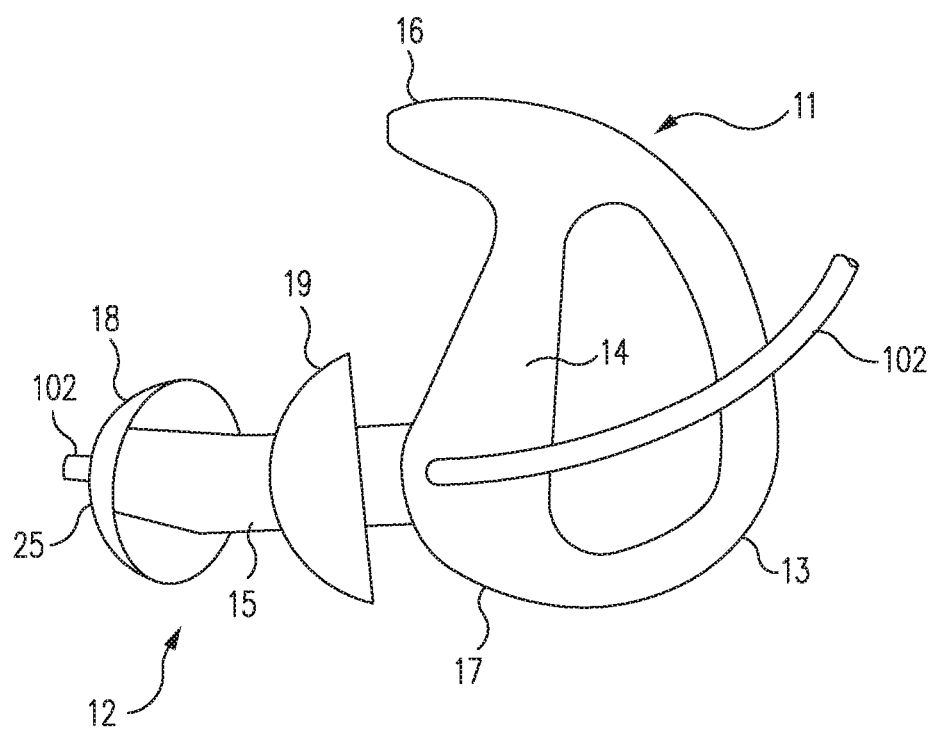
FIG. 60 is a perspective view of an earpiece with an extension having a thin acoustic tube extending from the earpiece, according to an embodiment.

Referring now to FIG. 60, an embodiment of an earpiece 11 is provided, according to an embodiment. It will be appreciated that various features of FIG. 60 are set forth and described with regard to FIGS. 22 and 23. A thin acoustic tube 102 can be attached to earpiece 11 and/or extension 12 such that a generally continuous (lacking abrupt changes in diameter and lacking other restrictions or obstructions) bore is defined for sound to travel through from a speaker to the eardrum, according to an embodiment. The thin acoustic tube 102 can pass completely or almost completely through the extension 12. The thin acoustic tube 102 can pass through the earpiece 11 and extend substantially into the ear canal 5509. Indeed, the proximal end of the thin acoustic tube 102 can be disposed proximate the eardrum. The proximal end of the thin acoustic tube 102 can be flush with or can extend from the extension 12. The thin acoustic tube 102 can attach to the earpiece 11.

The thin acoustic tube 102 can pass through the earpiece 11 and the extension 12 such that the proximal end of the thin acoustic tube 102 is disposed proximate the eardrum. Thus, the thin acoustic tube 102 can extend partially through or completely through the bore 22 of the extension 12. Indeed, the thin acoustic tube 102 can extend substantially beyond the inner end of the extension 12.

In this manner, the thin acoustic tube 102 provides a continuous passage or lumen through which sound travels from the speaker to a point proximate the eardrum. The presence of undesirable discontinuities in the lumen is mitigated. There are no abrupt changes in the diameter or the smoothness of the lumen, such as those discontinuities associated with the connection of the thin diameter tube 102 to the extension 12 via the use of a barbed fitting. The use of a barbed fitting or the like inherently results in abrupt changes in the diameter of the lumen. As those skilled in the art will appreciate, such discontinuities can adversely affect the quality of sound transmitted from the speaker to the eardrum.

Thus, the use of such a continuous lumen from the speaker to a point proximate the eardrum enhances the quality of sound from a two-way radio. Such enhancement of the quality of the sound can make speech from the two-way radio more intelligible. By making speech more intelligible, the volume of the two-way radio can be turned down, thereby making its detection during covert operations less likely.

Thus, since the distal end 25 of extension 12 and/or the proximal end of thin acoustic tube 102 can be placed close to a wearer's eardrum, the volume of a two-way radio or other device (such as a cellular telephone, music device, etc.) can be substantially reduced. With the volume reduced, sound advantageously cannot be as easily heard by others. During covert operations, for example, the likelihood of someone other than the wearer undesirably hearing sound from a two-way radio is substantially mitigated. By reducing the sound volume, smaller, less powerful, and/or less expensive speakers can be used. The use of a smaller speaker facilitates the making of a less conspicuous communications assembly. Placing the sound closer to the eardrum can make it easier for the hearing impaired to hear.

Embodiments (such as those embodiments having a bore 22 formed through stem 15) can be used with a variety of electronic devices that produce sound. The use of a generally smooth and continuous lumen can enhance sound quality in such applications. As those skilled in the art will appreciate, sound quality can be an important factor in music applications.

Figure 61:
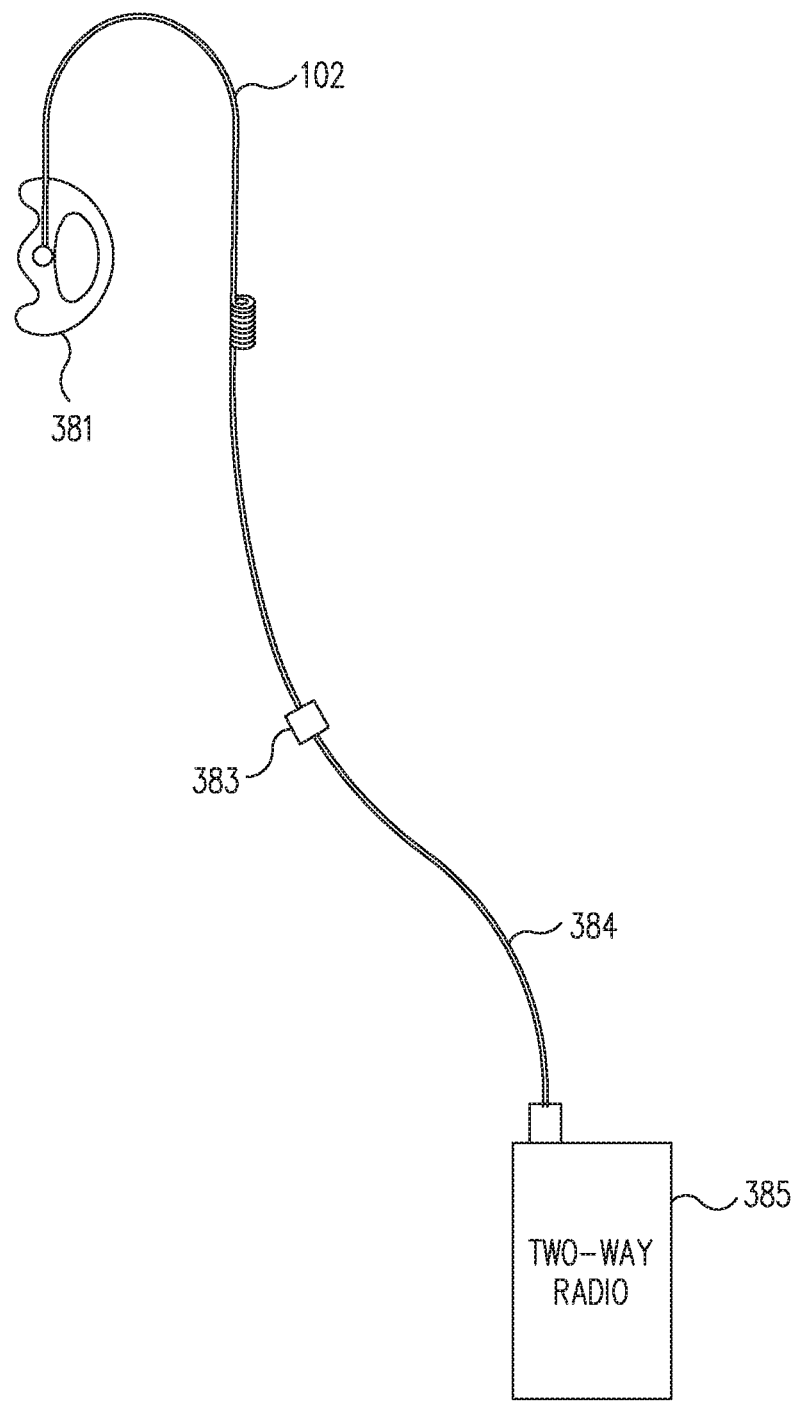
FIG. 61 is a perspective view of a two-way radio system, according to an embodiment.

Referring now to FIG. 61, a two-way radio system can comprise an earpiece 381 to which is attached a thin acoustic tube 102, according to an embodiment. The use of a longer thin acoustic tube 102 can better facilitate enhanced flexibility with respect to positioning of speaker 383. Thus, speaker 383 can be disposed beneath the clothes instead of behind the ear 5500, for example. Speaker 383 is in electrical communication with a two-way radio 385 or the like via cable 384.

As described above, an inconspicuous communications assembly can comprise thin acoustic tubing and an earpiece/extension or an ear insert. In this manner, the likelihood of undesirable discovery of the communications assembly during a covert operation is mitigated.

Systems and methods are disclosed herein to provide a wireless push-to-talk switch, wireless microphone, and wireless speaker for two-way radios, such as those used by police officers, firefighters, military personnel, and others. According to an embodiment, a wireless push-to-talk switch can comprise a switch and a wireless transmitter in electrical communication with the switch. The transmitter can transmit a signal in response to the switch being actuated and/or deactuated.

More particularly, the transmitter of the wireless push-to-talk switch can be configured to transmit a radio signal, an infrared signal; an ultrasonic signal, or any other desired type of wireless signal. Amplitude modulation, frequency modulation, phase modulation, spread spectrum, Bluetooth®, WiFi®, or any other type of transmission or modulation can be used.

According to an embodiment, a wireless push-to-talk system for a two-way radio can comprise a wireless push-to-talk switch and a receiver in communication with the wireless push-to-talk switch and in communication with the two-way radio. The receiver receives a wireless signal from the wireless push-to-talk switch and communicates the signal to the two-way radio, thus causing the two-way radio to begin transmitting or stop transmitting. The wireless push-to-talk switch can comprise a switch and a transmitter in communication with the switch and configured to transmit a signal in response to the switch being pushed.

For example, the receiver can be configured to side mount to the two-way radio. The receiver can be in wired communication with the two-way radio such that when the receiver receives a signal indicating that the wireless push-to-talk switch has been actuated or deactuated, the receiver can communicate this information to the two-way radio so as to cause the two-way radio to begin transmitting or cease transmitting a voice from the user.

According to an embodiment, a wireless microphone can be in wireless communication with a receiver of the two-way radio. The wireless microphone can use either the same transmitter or a different transmitter with respect to the wireless push-to-talk switch.

According to an embodiment, a wireless speaker can be in wireless communication with a transmitter of the two-way radio. The transmitter can be in wired communication with the two-way radio.

Keying a microphone can be defined herein as actuation of a push-to-talk switch for the microphone. According to an embodiment, a method for wirelessly keying a two-way radio can comprise transmitting a wireless signal from a wireless push-to-talk switch, receiving the transmitted wireless signal, and communicating a signal representative of the wireless signal to the two-way radio.

According to an embodiment, a wireless push-to-talk two-way radio system can comprise a two-way radio, a wired microphone in wired communication with the two-way radio, a wireless push-to-talk switch, and a push-to-talk receiver in wireless communication with the wireless push-to-talk switch and in wired communication with the two-way radio. The wireless push-to-talk two-way radio system can further comprise a wired push-to-talk switch in wired communication with the two-way radio.

According to an embodiment, a wireless push-to-talk two-way radio system can comprise a wireless microphone, a microphone receiver in wireless communication with the wireless microphone and in wired communication with the two-way radio, a wireless push-to-talk switch, and a push-to-talk receiver in wireless communication with the wireless push-to-talk switch and in wired communication with the two-way radio. The wireless push-to-talk radio system can further comprise a wired push-to-talk switch in wired communication with the two-way radio.

According to an embodiment, a wireless push-to-talk two-way radio system can comprise a microphone and a push-to-talk switch in wired communication with a common transmitter. The transmitter can be configured to transmit a signal representative of actuation/deactuation of the wireless push-to-talk switch and can be configured to transmit a signal representative of voice from the wired microphone. A receiver can be in wireless communication with the transmitter and in wired communication with the two-way radio. The wireless push-to-talk radio system can further comprise a wired push-to-talk switch in wired communication with the two-way radio.

According to an embodiment, a wireless push-to-talk two-way radio system can comprise a push-to-talk switch, a microphone, and a speaker in wired communication with a first transceiver. The first transceiver can be configured to transmit a wireless signal representative of actuation/deactuation of the push-to-talk switch and representative of voice from the microphone and can be configured to receive a signal representative of voice from a two-way radio.

A second transceiver can be in wired communication with the two-way radio. The second transceiver can be configured to transmit a signal representative of voice from the two-way radio and can also be configured to receive a wireless signal representative of actuation/deactuation of the push-to-talk switch and representative of voice from the microphone. The wireless push-to-talk radio system can further comprise a wired push-to-talk switch in wired communication with the two-way radio.

According to an embodiment, a push-to-talk switch ring can comprise a ring configured to be worn upon a finger and a wireless push-to-talk switch attached to the ring. Actuation of a wireless push-to-talk switch on a ring can be performed discretely.

According to an embodiment, a wireless push-to-talk switch assembly for a vehicle, such as an automobile or a bicycle, can comprise a wireless push-to-talk switch and a mount configured to mount the wireless push-to-talk switch to the vehicle. For example, the wireless push-to-talk switch can be configured to mount the wireless push-to-talk switch to the steering wheel of an automobile or the handlebars of a bicycle.

According to an embodiment, a wireless push-to-talk switch assembly for a firearm can comprise a wireless push-to-talk switch and a mount configured to mount the wireless push-to-talk switch to a firearm. The firearm can be a pistol, rifle, shotgun, or any other type of firearm. The mount can be configured to mount the wireless push-to-talk switch to a grip and/or a stock of the firearm.

A housing of the push-to-talk switch can be configured so as to mitigate sound from the switch. For example, sound dampening/insulating material can be disposed within the housing so as to mitigate sound from the switch disposed therein. The housing itself can have sufficient sound dampening and/or insulating properties so as to mitigate sound from the switch disposed therein. Any combination of quietness of the switch, the use of sound dampening/insulating material, and sound dampening/insulating provided by the housing may be used to provide a substantially silent push-to-talk switch.

More particularly, one embodiment can comprise a switch that produces a sound level below the threshold of hearing, i.e., a sound pressure level of less than approximately 0 dB(A) of wideband sound at 36 inches, can be used. For example, a switch that produces a sound pressure level of less than 5 dB(A) of wideband sound at 36 inches can be used. As used herein, a wideband sound can be an integration of sound from 20 Hz to 20 kHz.

As mentioned above, a sound dampening and/or sound insulating material can be configured so as to mitigate audibility of the switch. For example, the sound dampening/insulating material can be configured so as to generally surround the switch. The sound dampening/insulating material can be used with a switch that would otherwise produce an audible sound. Thus, sound dampening/insulating material can facilitate the use of a switch that would otherwise be too loud.

Alternatively, sound dampening/insulating material can be used with a switch that is already inaudible when actuated. This can be done to further reduce the sound level and/or to help keep the sound level of the switch within an acceptable range if the switch malfunctions or otherwise operates at a louder than anticipated level, such as due to over zealous use.

As mentioned above, the housing of the push-to-talk switch can be constructed so as to provide sufficient sound dampening/insulation. For example, the housing can be made to be thick enough, or have structures or materials that provide sufficient sound dampening/insulation so as to make operation of the switch inaudible. For example, the housing can have double walls (an inner wall and an outer wall). Thus, a louder switch can be used.

The switch can be mounted upon a printed circuit board. The switch can be mounted upon the same printed circuit board as the transmitter or transceiver with which the switch communicates with the two-way radio.

The switch can be actuated by pressing a diaphragm. For example, a membrane switch can be mounted upon a printed circuit board that is disposed within a housing and the diaphragm can be mounted about its periphery to the housing such that pressing the diaphragm causes the diaphragm to deform and press the membrane switch. Alternatively, the diaphragm can be omitted and the membrane switch can be actuated directly, e.g., without a structure (such as the diaphragm) between the switch and the user (such as the user's finger).

The switch can be actuated by touching an electrode, almost touching an electrode, causing something else to touch an electrode, or causing something else to almost touch an electrode. For example, a capacitive switch can be mounted upon a printed circuit board that is disposed within a housing and the diaphragm can be mounted about its periphery to the housing such that pressing the diaphragm causes the diaphragm to deform and actuate the capacitive switch.

Conductive material within or attached to the diaphragm can effect such actuation/deactuation of the capacitive switch. Alternatively, the diaphragm can be omitted and the capacitive switch can be actuated directly, e.g., without a structure (such as the diaphragm) between the switch and the user (such as the user's finger).

Sufficient room can be provided within the housing for an electrical cable to pass through the housing between the circuit board and the housing. By providing such room in the housing, use of the push-to-talk switch in an in-line cable assembly is facilitated. That is, the push-to-talk switch can readily be placed along a cable assembly rather than at one end thereof.

The push-to-talk switch can optionally comprise a bezel that is configured so as to guide a user's finger to the button. In this manner, reliability of operation (particularly in adverse circumstances such as a gunfight) is enhanced. Quieter operation of the push-to-talk switch may also be facilitated by use of the bezel because it may mitigate noisy fumbling with the push-to-talk switch as a user attempts to actuate the push-to-talk switch, particularly in stressful situations. More reliable and quieter operation of the push-to-talk switch can save a user's life in such circumstances.

The push-to-talk switch can comprise an aluminum or polymer housing. The use of such a housing (particularly of an aluminum housing) enhances the durability thereof. Enhancing the durability of the push-to-talk switch can be particularly useful in adverse environments, such as a battlefield.

As used herein, a membrane switch can be a circuit printed on polyethylene terephthalate (PET) or indium tin oxide (ITO). For example, a membrane switch can comprise multiple layers of PET. The layers can be configured so as to effect shorting of electrodes of the switch when actuated.

Such switches are commonly used on the control panels of home appliances such as microwave ovens, air conditioners, and television remote controls. Membrane switches are typically very quiet when actuated. However, some membrane switches have an internal dome structure that provides tactile and/or audible feedback of actuation and/or deactuation to a user. Generally, membrane switches lacking such audible feedback can be used in embodiments. Membrane switches having tactile feedback may be used in embodiments.

However, membrane switches having audible feedback can be used in embodiments. For example, a membrane switch having such audible feedback can be used and sound dampening/insulation material and/or a housing have sound dampening/insulation properties can be used to mitigate the feedback sound.

Capacitive switches comprise an electrode. Touching or almost touching the electrode can cause a change in capacitance that is sensed so as to effect actuation/deactuation of the switch. The electrode can be covered with an insulator, such that it is not exposed. Capacitive switches are commonly used in elevators to select the floors at which the elevator stops.

According to an embodiment, the push-to-talk switch is configured such that the switch is more likely to actuate when pushed near the edge of the button (the top of the button proximate its perimeter, rather than at the center thereof) or at an angle (rather than perpendicularly), as compared to contemporary push-to-talk switches. According to an embodiment, the push-to-talk switch has an enhanced bevel that tends to ensure that the switch is actuated when an attempt to depress the button thereof is made. According to an embodiment, noise produced by the push-to-talk switch is mitigated by using a membrane or capacitive switch rather than a spring switch.

Figure 62:
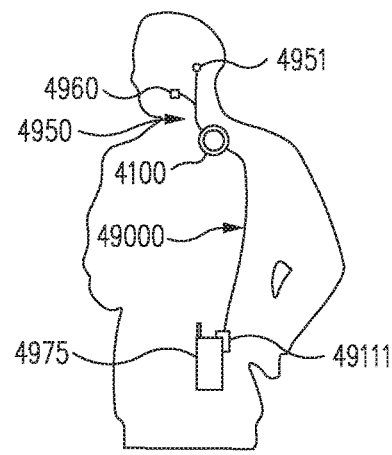
FIG. 62 shows a person wearing a portable two-way radio system having a wired push-to-talk switch, according to an embodiment.

Referring now to FIG. 62, a two-way radio system comprises a wired push-to-talk switch 4100, a wired microphone 4960, and a wired speaker 4951. A user can wear a portable two-way radio 4975, such as upon the user's belt.

Inline cable assembly 49000 communicates electrical signals representative of received radio messages from portable two-way radio 4975 to the speaker 4951. Inline cable assembly 49000 also communicates electrical signals representative of sound from a microphone 4960 to portable two-way radio 4975 Inline cable assembly 49000 also transmits control signals from wired push-to-talk switch 4100 to portable two-way radio 4975 so as to facilitate the transmission of outgoing voice communications from the user. Inline cable assembly 49000 interfaces with the two-way radio 4975 via side mount 49111, as is common according to contemporary practice.

A wireless push-to-talk switch 41000 is shown in detail in FIGS. 63-70, according to an embodiment. Wireless push-to-talk switch 41000 does not need to be connected to the two-way radio via a wired connection, such as cable assembly 49000 of FIG. 62. Rather, wireless push-to-talk switch 41000, as well as an optional wireless microphone and an optional wireless speaker, which are also discussed below, can communicate with the two-way radio via a wireless technology such as radio, infrared, or ultrasound. The construction and operation of the wireless push-to-talk switch 41000 is discussed in detail below.

Figure 63:
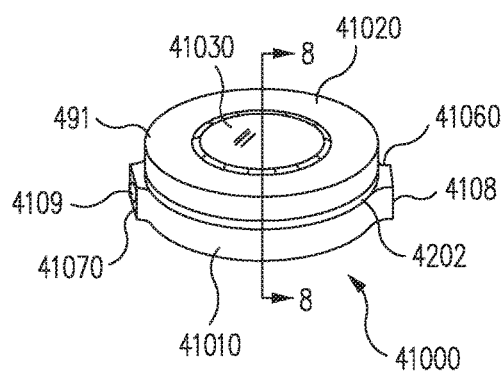
FIG. 63 is a perspective view of a push-to-talk switch for use by police officers, military personnel, firefighters, and others, according to an embodiment.

Referring now to FIG. 63, according to an embodiment, a wireless push-to-talk switch 41000 comprises a transmitter or a transceiver (4210 of FIG. 71), a housing 41010, a bezel 41020 attached to housing 41010, and a button 41030 disposed within bezel 41020, according to an embodiment.

The transmitter/transceiver 4210 can be a transmitter in those instances in which only transmission of wireless signals thereby is required. For example, the transmitter/transceiver 4210 can be a transmitter when the transmitter/transceiver 4210 is used to transmit signals from a wireless push-to-talk switch and/or a wireless microphone (such as in the embodiment of FIG. 64).

The transmitter/transceiver 4210 can be a transceiver when both transmission and reception of wireless signals is required. For example, the transmitter/transceiver 4210 can be a transceiver when the transmitter/transceiver 4210 is used to transmit signals from a wireless push-to-talk switch and/or a wireless microphone and is also used to receive signals for a wireless speaker (such as in the embodiment of FIG. 71).

Wireless push-to-talk switch 41000 can be used by police officers (such as when on patrol or when involved in covert operations), firefighters, military personnel, and others to facilitate enhanced use of a portable two-way radio. For example, a covert police officer can wear a wireless push-to-talk switch 41000 underneath a shirt so that it is hidden from view. A small, unobtrusive microphone can be hidden, such as beneath the collar. An unobtrusive earpiece can be worn to facilitate listening to received radio communications. The portable two-way radio can be worn on the belt and hidden beneath a jacket. In this manner, the officer's ability to communicate by radio is not apparent to casual observers.

When an officer wants to transmit a radio communication, button 41030 of the wireless push-to-talk switch 41000 can be pushed through the officer's shirt. Wide, sloped bezel 41020 guides the user's finger to button 41030 to assure proper actuation/deactuation of the switch. Actuation of the wireless push-to-talk switch 41000 can be effected by pressing the button 41030 and deactuation of the wireless push-to-talk switch 41000 can be effected by releasing the button 41030.

As discussed in detail below, the width and slope of bezel 41020 can be configured so as to enhance the ability thereof in such guiding. Thus, undesirable and potentially noisy fumbling when using the push-to-talk switch can be mitigated.

As also discussed in detail below, button 41030 can be configured so that the wireless push-to-talk switch 41000 is more likely to be actuated regardless of the direction or angle with which a finger presses button 41030. Contemporary standalone push-to-talk switches should be pressed normally (orthogonally), proximate the center thereof, in order to assure reliable actuation/deactuation of the switch. Pressing the button of a contemporary push-to-talk switch normally near an edge thereof, or at an angle (particularly near the edge thereof) does not result in reliable operation of the switch. However, pressing button 41030 normally near the center thereof, normally near an edge thereof, at an angle (either near the center or the edge) is more likely to result in actuation/deactuation of the switch than is the case with a contemporary push-to-talk switch.

Housing 41010 can optionally have one or more bosses 41060 and 41070 formed thereon. One boss 41060 can be longer than the other boss 41070. Alternatively, both bosses can be the same size. Bosses 41060 and 41070 can be diametrically opposed about housing 41010. Alternatively, bosses 41060 and 41070 can have any other desired orientation. For example, bosses 41060 and 41070 can be perpendicular with respect to one another. Any desired number of bosses can be used. Thus, one, two, three, four, or more bosses can be used.

Openings 4108 and 4109 can be formed in bosses 41060 and 41070 to facilitate the passage of one or more cables through housing 41010. Such a cable can, for example, provide wired connection between a transceiver disposed within housing 41010 and a microphone and/or a speaker as shown in the block diagram of FIG. 86, for example.

A sealant, such as RTV (room temperature vulcanizing) silicone rubber can be used to provide a water resistant seal between any cable(s) passing through openings 4108 or 4109 and housing 41010.

An o-ring 4202 can provide a seal between bezel 41020 and housing 41010. Alternatively, any other desired means for providing a seal can be used. For example, silicon sealant can be used to provide the seal. Bezel 41020 can be removably attached to housing 41010, such as via threads. Bezel 41020 can be attached to housing 41010 by other methods, such as a friction fit. Alternatively, bezel 41020 can be permanently attached to housing 41010.

Housing 41010 and bezel 41020 can be formed from aluminum. Housing 41010 and bezel 41020 can comprise anodized aluminum. Housing 41010 and bezel 41020 can be formed by machining. Alternatively, housing 41010 and bezel 41020 can comprise a rigid polymer material or any other desired material. Housing 41010 and bezel 41020 can be formed by injection molding.

Button 41030 can be part of a diaphragm that seals housing 41010, as discussed in detail below. Alternatively, the button and the diaphragm can be two separate components of the push-to-talk switch. Button 41030 (and diaphragm 44010 of FIG. 67) can be formed of a resilient polymer such as rubber.

As mentioned above, bezel 41020 can be sloped (as best seen in FIG. 70) such that it tends to guide a finger toward button 41030. Thus, bezel 41020 makes it easier to push button 41030. This can be important when wireless push-to-talk switch 41000 is worn beneath the user's clothing. It can also be important in hostile situations, such as when a user is being fired upon and is frantically trying to push the button while defending himself and/or others.

Figure 64:
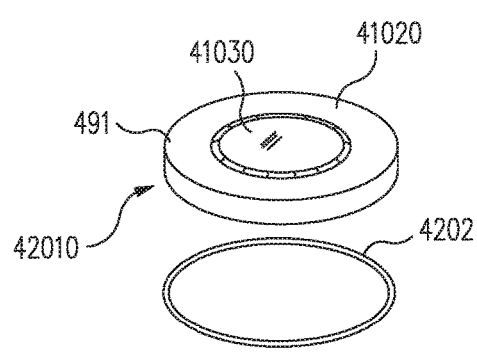
FIG. 64 is a exploded view of the push-to-talk switch, showing the bezel assembly and o-ring removed from the housing so as to provide a view of the interior of the housing, according to an embodiment.
Figure 64:
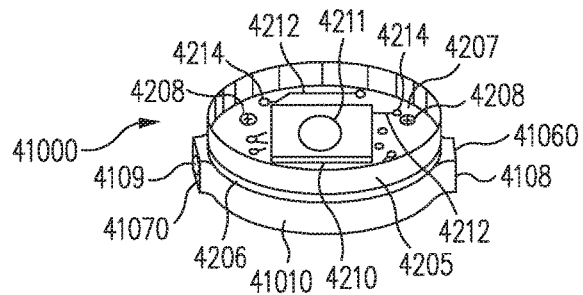

Referring now to FIG. 64, a bezel assembly 42010 comprises bezel 41020, button 41030, and other parts, according to an embodiment. Bezel assembly 42010 can screw onto housing 41010, such as via external threads 4205 formed on housing 41010 and corresponding internal threads 4405 (FIG. 66) formed inside bezel 41020. When bezel assembly 42010 is screwed onto housing 41010, o-ring 4202 can be captured therebetween. An o-ring groove 4206 formed in housing 41010 can receive o-ring 4202 and can help to retain o-ring 4202 in place when bezel assembly 42010 is removed from housing 41010.

A printed circuit board 4207 can be mounted within housing 41010, such as via screws 4208. A transmitter/transceiver 4210 can be mounted to printed circuit board 4207. Transmitter/transceiver 4210 can have a switch 4211 (also referred to as a push button) attached thereto or proximate thereto.

For example, switch 4211 can comprise a membrane switch that actuates transmitter/transceiver 4210 when pressed, such as by diaphragm 44010. Sound dampening/insulating material can be used to mitigate sound from transmitter 4210, as discussed below.

A battery 4971 (FIG. 70) can be disposed beneath the printed circuit board 4207. The battery can be a lithium ion battery, a lithium polymer battery, a nickel metal hydride battery, a nickel cadmium battery, an alkaline battery, or any other desired type of battery.

As a further example, if switch 4211 is a capacitive switch, then it can have an electrode or sensor that effects a change in capacitance, such as when diaphragm 44010 is touching or proximate to a sensor. Diaphragm 44010 can comprise a conductive, e.g., metallic, material so as to effect such a change in capacitance. For example, metal (such as iron filings) can be added to diaphragm 44010 or a piece of metal can be attached thereto (such as on the underside thereof).

Traces 4212 can be formed on printed circuit board 4207 to facilitate electrical interconnection of wires from a cable 49010 (FIG. 71) with transmitter 4210. For example, wires from cable 49010 can be soldered into holes 4214 to facilitate such electrical connection.

As those skilled in the art will appreciate, the use of a membrane or capacitive transmitter 4210, rather than a spring switch (as is used in contemporary push-to-talk switches) provides a substantial advantage with respect to noise. Spring switches are typically comparatively noisy and can produce a noise level well above the threshold of hearing, even at a distance of several yards. Indeed, according to contemporary practice the noise level of such switches can be considerable so as to provide positive auditory feedback of actuation/deactuation to users.

Figure 65:
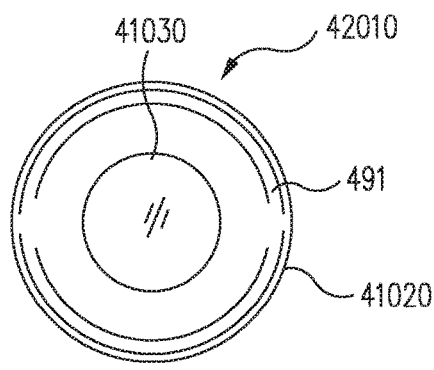
FIG. 65 is a top view of the bezel assembly, showing a button formed by a diaphragm, according to an embodiment.

Referring now to FIG. 65, button 41030 can be round and can be centrally located within bezel 41020, according to an embodiment. Alternatively, button 41030 and bezel 41020 can have any other desired configuration. For example, button 41030 and/or bezel 41020 can be generally rectangular in shape.

Figure 66:
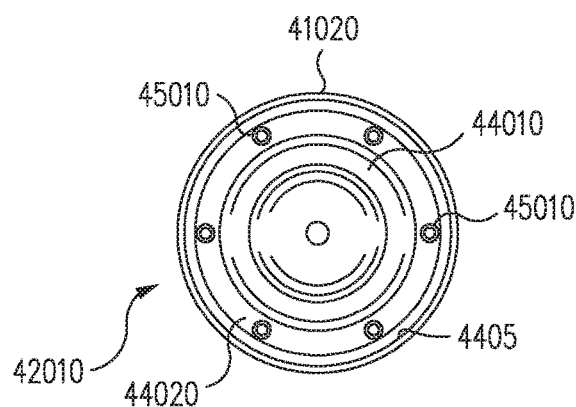
FIG. 66 is a bottom view of the bezel assembly, showing the bottom of the diaphragm of FIG. 65, according to an embodiment.

Referring now to FIGS. 65 and 66, bezel assembly 42010 comprises a diaphragm 44010 that is attached to bezel 41020, according to an embodiment. Diaphragm 44010 can be attached to bezel 41020 using retainer 44020. Retainer 44020 can be shaped generally like a washer and can be formed of aluminum. Alternatively, retainer 44020 can be formed of a substantially rigid polymer material or any other desired material.

Diaphragm 44010 can have button 41030 formed integrally therewith. For example, diaphragm 44010 and button 41030 can be formed of rubber and molded as a single item. Alternatively, diaphragm 44010 and button 41030 can be formed of a resilient polymer material or any other desired material and can be either integrally or separately formed.

Retainer 44020 can be configured as a washer that has a plurality of holes 4505 therein such that retainer 44020 can capture a peripheral portion of diaphragm 44010 between itself and bezel 41020 and such that a plurality of screws 45010 can be used to attach diaphragm 44010 to bezel 41020. Screws 45010 can pass through unthreaded holes 4505 in retainer 44020 and through unthreaded holes 45060 in diaphragm 44010 and then be received into threaded holes 4801 (FIG. 70) formed in bezel 41020.

Diaphragm 44010 can have an intermediate portion 45020. The thickness of intermediate portion 45020 can be greater than the thickness of peripheral portion 4701 and less than the thickness of button 41030. Intermediate portion 45020 can have a thickness that, at least in part, defines the amount of force required to push button 41030 sufficiently so as to actuate transmitter 4210.

Button 41030 can comprise a thicker portion of diaphragm 44010. The thicker portion of diaphragm 44010 that defines button 41030 can be thicker than intermediate portion 45020. Button 41030 can be the thickest portion of diaphragm 44010.

Figure 67:
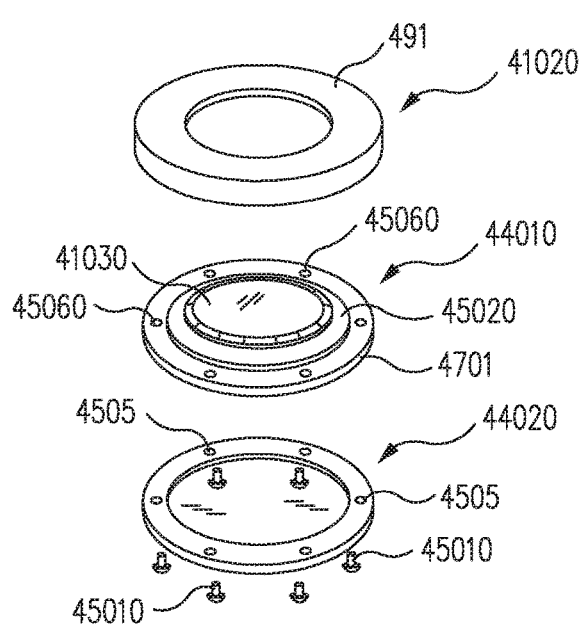
FIG. 67 is a exploded perspective view of the bezel assembly, showing a top view of the diaphragm and showing the retainer removed from the bezel, according to an embodiment.
Figure 68:
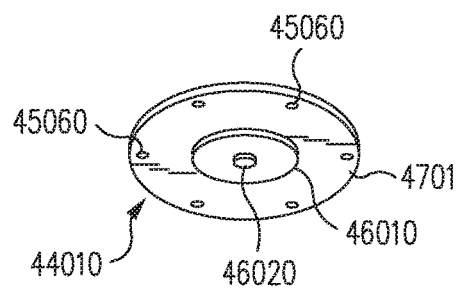
FIG. 68 is a perspective view of the diaphragm of FIG. 67, showing the bottom of the diaphragm, according to an embodiment.
Figure 69:
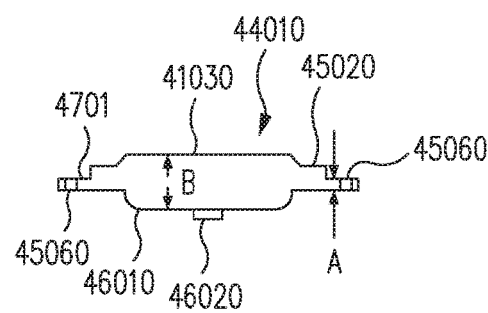
FIG. 69 is a side view of the diaphragm of FIG. 67, showing differences in the thickness of the thicker central portion and the less thick peripheral portion of the diaphragm, according to an embodiment.
Figure 73:
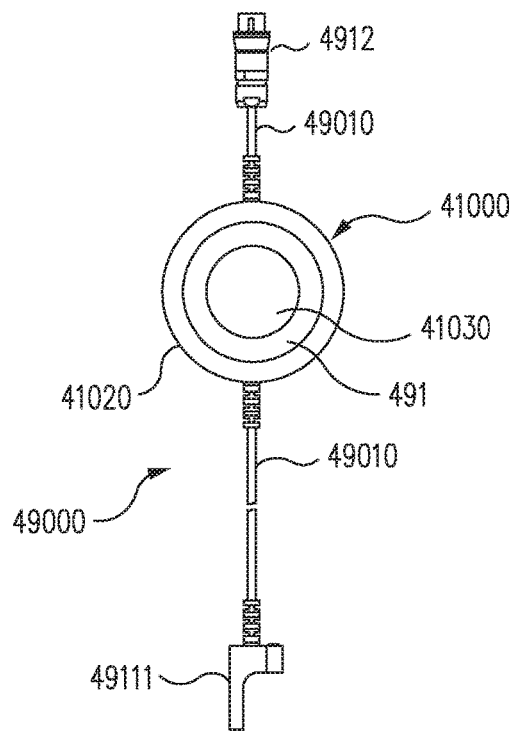
FIG. 73 is a view of an inline cable assembly using a push-to-talk switch according to an embodiment.
Figure 74:
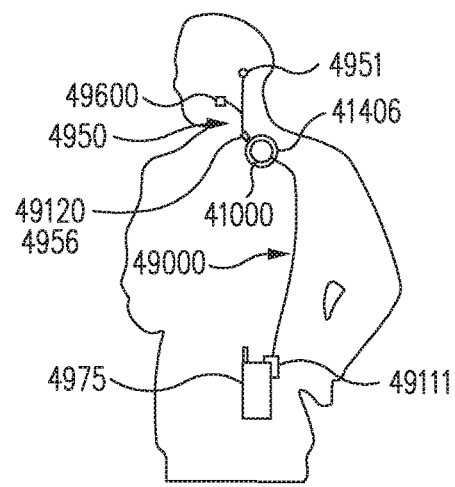
FIG. 74 is a view of a portable two-way radio system having a substantially silent push-to-talk switch as worn by a user, according to an embodiment.

Referring now to FIGS. 67 and 68, the bottom of diaphragm 44010 can comprise a thicker portion 46010 that corresponds generally in position to the thicker portion of diaphragm 44010 that defines button 41030, according to an embodiment. That is, button 41030 can be defined by an increase in the thickness of diaphragm 44010 that extends both upwardly (above peripheral portion 4701) and downwardly (below peripheral portion 4701). Alternatively, button 41030 can be defined by an increase in the thickness of diaphragm 44010 that extends either upwardly (above peripheral portion 4701) or downwardly (below peripheral portion 4701), but not both.

The rigidity of button 41030 and the resilience of peripheral portion 4701 depend upon the material selected and the thickness thereof. Thus, increasing the thickness of peripheral portion 4701 and/or button 41030 can increase the rigidity thereof. Button 41030 can have sufficient rigidity (such as by having sufficient thickness) so as to effect actuation/deactuation of transmitter/transceiver 4210 regardless of where button 41030 is pushed and with less regard as to the angle at which button 41030 is pushed.

A nipple 46020 can extend from the lower surface of diaphragm 44010 to facilitate contact with membrane or sensor 4211 of transmitter 4210. Thus, when button 41030 is pushed, then nipple 46020 presses downwardly against membrane or sensor 4211, so as to effect actuation/deactuation of transmitter 4210. The length of nipple 46020 can be adjusted, either in manufacture of diaphragm 44010 or in assembly of wired push-to-talk switch 4100, so as to properly effect actuation/deactuation of transmitter 4210. For example, nipple 46020 can be formed during manufacture to have excessive length and can be trimmed during assembly to have the desired length, thereby compensating for variations in the construction and mounting of transmitter 4210. Nipple 46020 can be formed of a metallic or other material that effects actuation/deactuation of a capacitive switch (when a capacitive switch is used).

A peripheral portion 4701 of diaphragm 44010 can have a thickness, dimension A, that is between approximately 0.010 inch and 0.100 inch thick. The peripheral portion 4701 can have a thickness, dimension A, that is approximately 0.040 inch thick. The peripheral portion 4701 can be captured intermediate retainer 44020 and bezel 41020. Peripheral portion 4701 provides at least some of the flexibility and resilience that facilitates movement of button 41030.

The thicker portion defines button 41030 and can have a thickness, dimension B, that is between approximately 0.10 inch and 0.35 inch thick. The thicker portion can have a thickness, dimension B, that is approximately 0.25 inch thick. Generally, the thicker portion is thick enough to facilitate use thereof as a button. Thus, the thicker portion is thick enough to provide sufficient rigidity to facilitate use thereof as a button.

Referring now to FIG. 70, a cross-sectional view better shows the sloped portion 491 of bezel 41020, according to an embodiment. Sloped portion 491 can have a width, dimension C, that is between approximately 0.25 inch and approximately 2.0 inch. Sloped portion 491 can have a width, dimension C, that is approximately 0.75 inch. Sloped portion can have an angle, angle D, that is between approximately 35° and approximately 55°. Sloped portion 491 can have an angle, angle D, that is approximately 45°.

The width, dimension C, and the angle, angle D, of sloped portion 491 are configured so as to enhance the ability of a user to actuate the push-to-talk switch in an embodiment. Thus, it is substantially more likely that an attempt to actuate the switch will actually result in the ability of the user to transmit a radio message. As those skilled in the art will appreciate, such ability can have life and death consequences. There are times when the ability to rapidly and reliably transmit radio messages can have an important impact upon police and firefighter operations.

Printed circuit board 4207 can be mounted to housing 41010 via standoffs 4830. Screws 4208 (FIG. 64) can mate with threads formed in standoffs 4830. Standoffs 4830 can define the distance between housing 41010 and printed circuit board 4207. The distance between housing 41010 and printed circuit board 4207 can be sufficient for one or more electrical cables (such as cable 49010 of FIG. 71) to pass therebeneath. This distance can be varied to accommodate the desired amount of cabling within housing 41010. This distance can be varied to accommodate a battery 4971 beneath the printed circuit board 4207.

Alternatively, the diaphragm 44010 can be flat, e.g. generally constant in cross-section. Indeed, the diaphragm 44010 can have any desired configuration. A structure other than a diaphragm 44010 can be used to actuate the switch or the switch can be actuated directly (without the use of an intermediate structure between the user and the switch). For example, a rigid button or button-like structure (rather than an at least somewhat flexible diaphragm 44010) can be pressed by the user and can, in response, press and thereby actuate the switch.

Alternatively, the bezel 41020 can be non-slopped, e.g., flat. Indeed, the bezel 41020 can have any desired configuration or can be absent altogether.

Examples of embodiments include wireless microphones and wireless speakers. A wireless microphone and a wireless speaker can be used with one another and/or with a wireless push-to-talk switch. Any or all of these devices (the wireless push-to-talk switch, the wireless microphone and/or the wireless speaker) can be autonomous.

Thus, any or all of these devices can have a dedicated transmitter or receiver. For example, the wireless push-to-talk switch 41201 of FIG. 80 has a dedicated transmitter 41202, the wireless microphone 41301 of FIG. 81 has a dedicated transmitter 41202, and the wireless speaker 41401 of FIG. 82 has a dedicated receiver 41205.

Any or all of these devices (the wireless push-to-talk switch, the wireless microphone and/or the wireless speaker) can share a transmitter or receiver. For example, the microphone 4960 and speaker 4954 of FIG. 72 can use the transceiver 4210 of FIG. 71.

A battery 4971 (FIG. 70) can provide electrical power to transmitter/transceiver 4210. The battery 4971 can be disposed within the housing 41010 or can be disposed outside of the housing 41010. The battery 4971 can optionally provide power for a microphone and/or speaker.

Referring now to FIGS. 71-74, a cable 49010 of wireless push-to-talk switch 41000 can facilitate communication with a wireless microphone 49600 and/or a wireless speaker 4954 (both of FIG. 72), according to an embodiment. For example, connector 49120 of cable 49010 can connect to complimentary connector 4956 (FIG. 72) of earpiece/microphone assembly 4950 to facilitate such communication. In this manner, wireless push-to-talk switch 41000, wireless microphone 49600, and wireless speaker 4954 can share a common transceiver 4210. Common transceiver 4210 can be disposed within wireless push-to-talk switch 41000, within a housing of wireless microphone 49600, within a housing of wireless speaker 4954, within a dedicated housing, or anywhere else desired.

Referring now to FIG. 72, an earpiece/microphone assembly 4950 is shown that is suitable for use with the wireless push-to-talk switch 41000, according to an embodiment. An electrical connector 4956 facilitates electrical connection of an electrical cable 4955 to an electrical cable 49010 of wireless push-to-talk switch 41000 (FIG. 71) via electrical connector 49120 thereof. In one embodiment, connector 4956 can be a Hirose connector.

A speaker 4954 generates sound in response to received radio messages. Speaker 4954 can be a miniature or button speaker similar to those commonly used in hearing aids. Speaker 4954 can be a balanced armature speaker. The sound from speaker 4954 is communicated via acoustic tubing 4953 to earpiece 4951. A barbed fitting 4952, such as an elbow fitting, can be used to attach earpiece 4951 to acoustic tubing 4953. Earpiece 4951 can be disposed in the concha of a user's ear and directs sound from acoustic tubing 4953 towards the user's eardrum.

Figure 75:
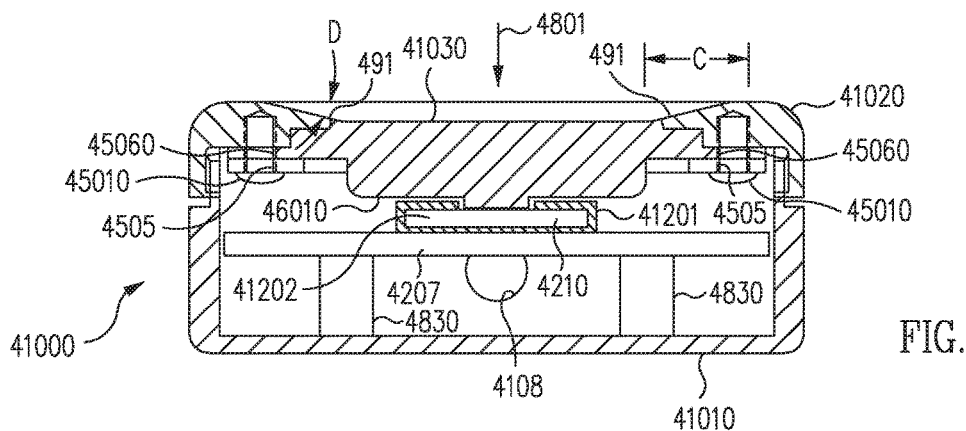
FIG. 75 is a cross-sectional view taken along line 8-8 of FIG. 63, showing sound damping or insulation around the switch so as to substantially mitigate sound produced when actuating the switch, according to an embodiment.

Referring now to FIG. 75, a wireless push-to-talk switch 41000 can comprise a push-to-actuate momentary switch 41201 in electrical communication with a transmitter 41202, according to an embodiment. The transmitter 41202 can have an antenna 41204 (see FIGS. 80-82). The transmitter 41202 can also have a power source, such as a battery 41203 (see FIGS. 80-82). In one embodiment, the battery 41203 can be user replaceable.

The transmitter 41202 can be configured to communicate a signal representative of actuation/deactuation of switch 41201 to a two-way radio. Thus, actuation of switch 41201 can result in a transmission of voice by the two-way radio in a manner that is analogous to the way that actuation of a wired push-to-talk switch (such as wired push-to-talk switch 4100 of FIG. 62) results in a transmission of voice by a two-way radio.

Figure 76:
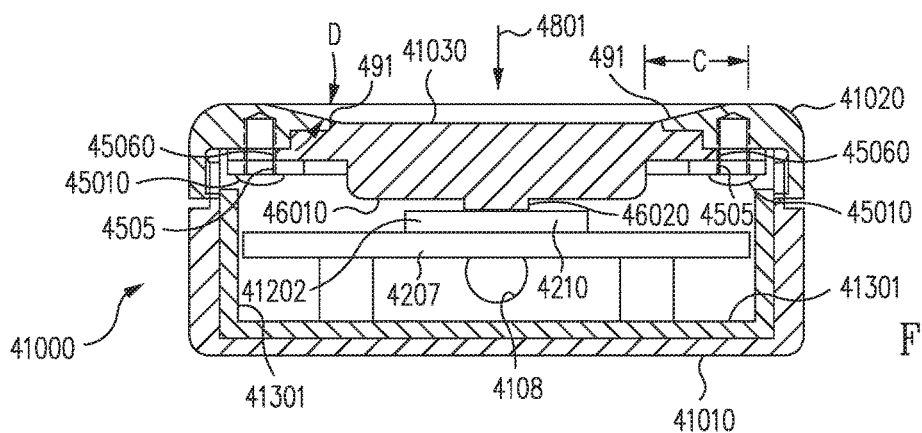
FIG. 76 is a cross-sectional view taken along line 8-8 of FIG. 63, showing sound damping or insulation along the walls of the housing so as to substantially mitigate sound produced by the switch when actuated, according to an embodiment.

Referring now to FIG. 76, a wireless microphone 41300 (see FIG. 81) can comprise a microphone 41301 in electrical communication with a transmitter 41202, according to an embodiment. The transmitter 41202 can have an antenna 41204 and a power source as discussed with regard to FIG. 75.

The wireless microphone can be configured to transmit a signal representative of the user's voice to a two-way radio so that the two-way radio can transmit a signal representative of the user's voice to other two-way radios (such as those of a police dispatcher and other police officers).

Figure 77:
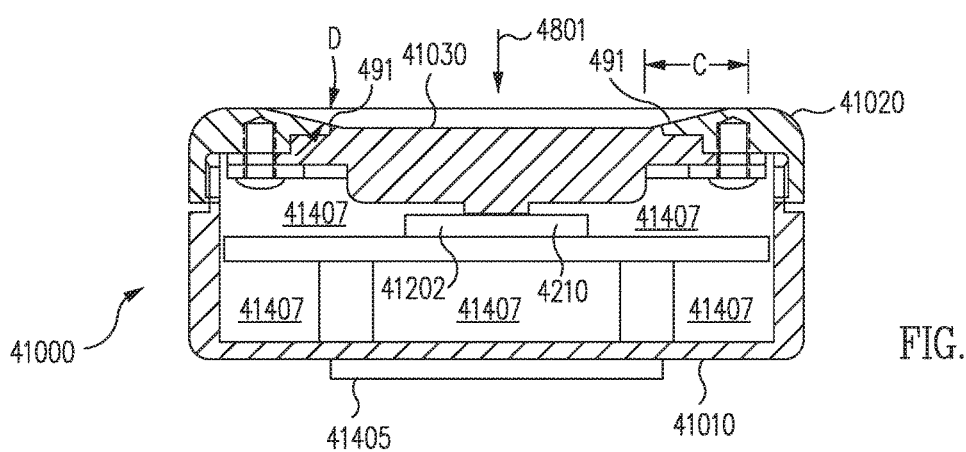
FIG. 77 is a cross-sectional view taken along line 8-8 of FIG. 63, showing voids within which sound damping or insulation can be disposed so as to substantially mitigate sound produced by the switch when the switch is actuated, according to an embodiment.

FIG. 77 shows that sound damping/insulation can be placed in voids 41407 of housing 41010. By placing sound damping/insulation in voids 41407 of housing 41010, sound from the switch 41201 can be substantially attenuated. Thus, a louder switch 41201 can be used while still maintaining sound from the switch 41201 at an inaudible level. Further, the use of such sound damping/insulation can reduce noise if switch 41201 malfunctions and becomes noisier.

Any desired combination of sound damping/insulation around the switch 41201, sound damping/insulation along the interior walls of housing 41010, and sound damping/insulation placed in voids 41407 of housing 41010 can be utilized. For example, sound damping/insulation around the switch 41201, sound damping/insulation along the interior walls of housing 41010, and sound damping/insulation placed in voids 41407 of housing 41010 can be utilized.

Hook and loop fasteners, e.g., Velcro®, snaps, or other fastening mechanisms can be used to attach the push-to-talk switch to any desired part of a person's body, clothing, or equipment. For example, hook and loop fasteners 41405 can be formed to the lower surface of the push-to-talk switch and complimentary hook and loop fasteners 41406 can be formed to a desired location on a police officer's uniform. In this manner, the push-to-talk switch can easily and conveniently be attached to the police officer's uniform.

The push-to-talk switch can be configured as a ring to be worn upon a finger. The push-to-talk switch can be configured to attach to a ring that is worn upon a finger.

Figure 78:
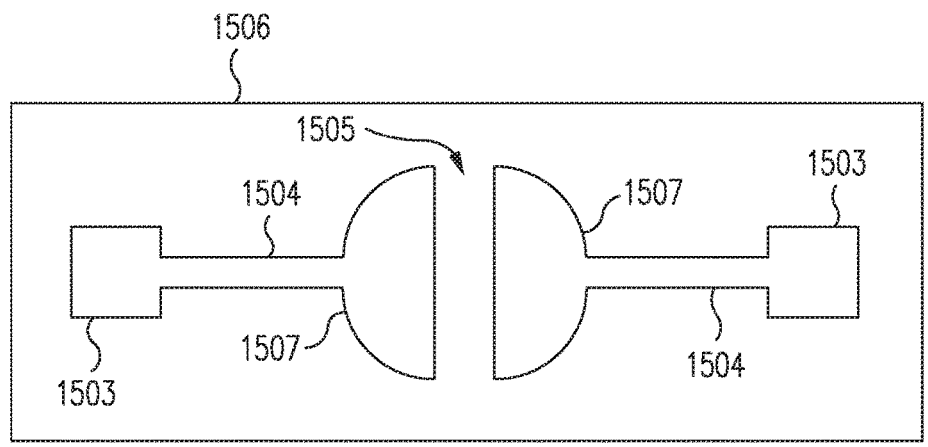
FIG. 78 is a top view of a contact switch, according to an embodiment.
Figure 79:
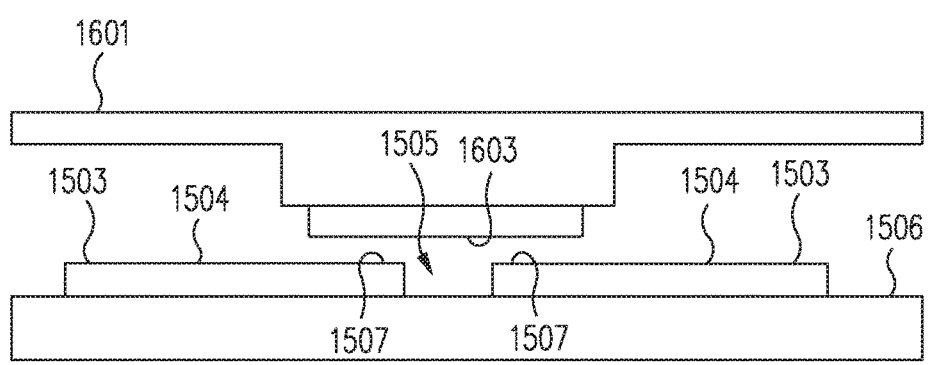
FIG. 79 is a side view of a contact switch, showing the formation of a diaphragm and a metal contact, according to an embodiment.

Referring now to FIGS. 78 and 79, the switch can be a contact switch that comprises, for example, copper traces formed upon a substrate such as a printed circuit board 1506 to define two lower conductive contacts 1507, pads 1503, and conductive conduits 1504 interconnecting lower contacts 1502 and pads 1503. Pads 1503 can be used as solder pads or the like to facilitate electrical connection of the switch.

An upper conductive contact 1603 (shown in FIG. 79) can be formed upon a flexible diaphragm 1601, such that pushing the button of the push-to-talk switch causes the diaphragm 1601 to bend downwardly and thus causes the upper contact 1603 to bridge the gap 1505 so as to provide electrical connection between the lower contacts 1507 and thereby turn the switch on. In this manner, a very quiet switch can be formed.

According to one embodiment, a push-to-talk switch can be reduced substantially in size. Contemporary push-to-talk switches are approximately three inches in diameter. The diameter of a push-to-talk switch in one embodiment can be one to two inches, or less. Such reduction in size can be facilitated, for example, by the sloped bezel 41020 that makes the effective or target size of the switch larger as discussed above. Thus, a smaller push-to-talk switch can be as easy or easier to actuate since the user does not have to be as accurate in hitting the button 41030 as with a contemporary push-to-talk switch.

The substantially silent push-to-talk switch in one embodiment can be either a standalone push-to-talk switch or a push-to-talk switch that is built into or integrated with another device, such as a two-way radio or a microphone and/or speaker for a two-way radio.

In view of the foregoing, a push-to-talk switch that has enhanced reliability is provided. More particularly, the standalone push-to-talk switch in one embodiment is more likely to operate properly regardless of how the button thereof is pushed. Thus, the amount of effort and/or fumbling done by a user in order to actuate the push-to-talk switch can be substantially mitigated. Further, because the push-to-talk switch is substantially silent, it can be used in applications such as covert operations and battle situations where the sound of actuating the switch could have life threatening adverse consequences.

Figure 80:
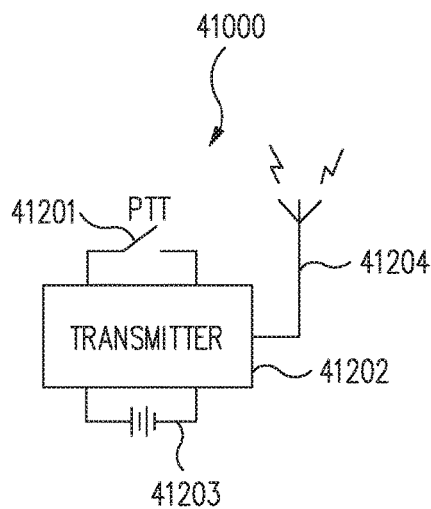
FIG. 80 is a block diagram of a wireless push-to-talk switch, according to an embodiment.

In one or more embodiments, the transmitter 41202 can be the same transmitter 41202 as that of FIG. 80. The transmitter 41202 can be configured to transmit both a signal representative of actuation/deactuation of a switch (such as push-to-talk switch 41201 of FIG. 80) and a signal representative of voice from microphone 41301.

Figure 82:
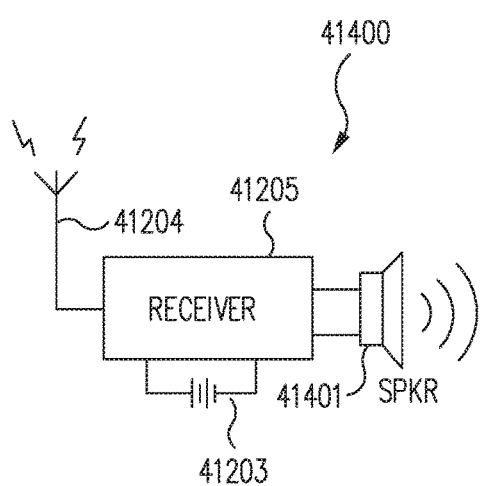
FIG. 82 is a block diagram of a wireless speaker for a two-way radio, according to an embodiment.

Referring now to FIG. 82, a wireless speaker 41400 can comprise a speaker 41401 in electrical communication with a receiver 41205, according to an embodiment. The receiver 41205 can have an antenna 41204. The receiver 41205 also has a power source, such as a battery 41203. In one embodiment, the battery 41203 can be user replaceable.

The wireless speaker 41400 can be configured to receive signals representative of voice that have been received by a two-way radio and can be configured to provide sound (the voice) to the user. For example, wireless speaker 41400 can provide sound to a user via an earpiece/microphone assembly like that of earpiece/microphone assembly 4950 of FIG. 72.

Figure 81:
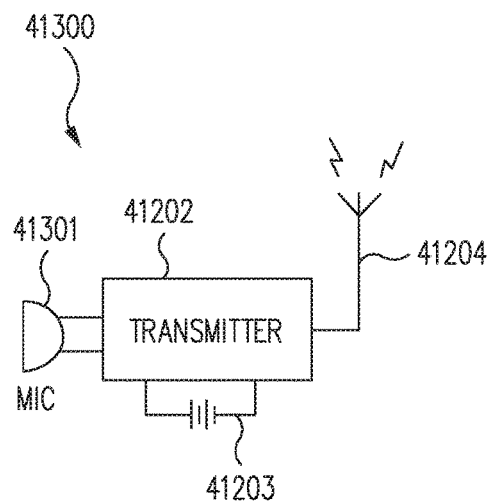
FIG. 81 is a block diagram of a wireless microphone for a two-way radio, according to an embodiment.
Figure 86:
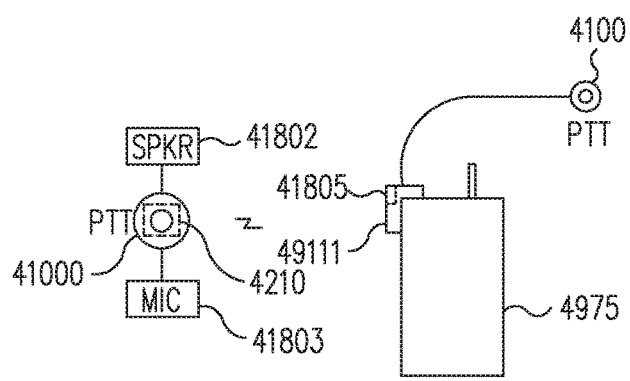
FIG. 86 is a block diagram of a two-way radio system having a wireless push-to-talk switch, a wired push-to-talk switch, a wireless speaker, and a wireless microphone, in which a single transceiver of the push-to-talk switch, speaker, and microphone facilitates wireless communication between the push-to-talk switch, the speaker, the microphone, and the two-way radio, according to an embodiment.

Transmitter 41202 of FIG. 80, transmitter 41202 of FIG. 81, and/or receiver 41205 of FIG. 82 can be defined by transmitter/transceiver 4210 (such as transceiver 4210 of FIG. 86). Transmitter 41202 of FIG. 80, transmitter 41202 of FIG. 81, and receiver 41205 of FIG. 82 can be a single transceiver or can be any desired combination of separate transmitters and receivers.

Figure 83:
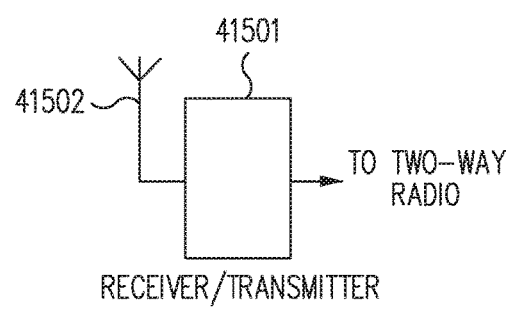
FIG. 83 is a block diagram of a receiver-transmitter (or transceiver) for a two-way radio, in which the receiver is configured to receive signals from a wireless push-to-talk switch or a wireless microphone and to communicate the signals to the two-way radio or to transmit signals from the two-way radio to a wireless speaker, and in which the receiver, transmitter, or transceiver are in wired connection with the two-way radio, according to an embodiment.

Referring now to FIG. 83, a receiver 41501 can be in wired electrical communication with a two-way radio, according to an embodiment. The receiver 41501 can receive signals representative of actuation/deactuation of push-to-talk switch 41201 (or of wireless push-to-talk switch 41000 of FIG. 63). The receiver 41501 can have an antenna 41502. The receiver 41501 can be configured to be part of a side mount for a two-way radio. Instead of receiver 41501, a transceiver can be used so as to facilitate transmission of signals representative of voice received by the two-way radio to the receiver 41202 of FIG. 82 so that voice can be heard via speaker 41401.

The receiver 41501, whether part of a side mount for a two-way radio or not, can have a dedicated battery. The receiver 41501 can receive electrical power from a two-way radio or from any other desired source of electrical power.

Figure 84:
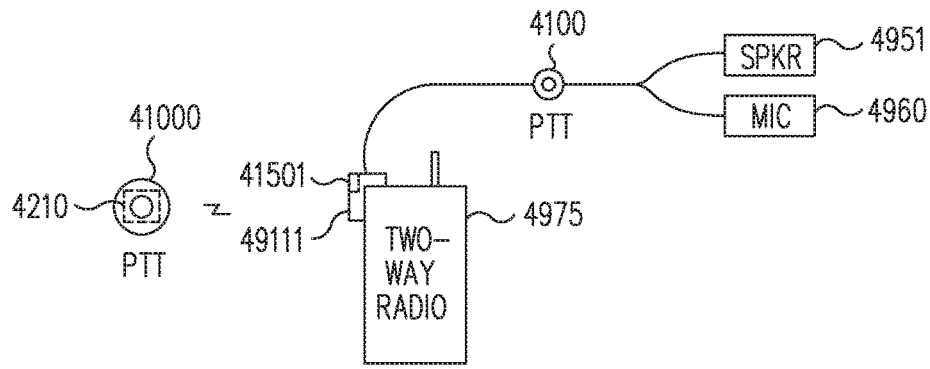
FIG. 84 is a block diagram of a two-way radio system having a wireless push-to-talk switch, a wired push-to-talk switch, a wired speaker, and a wired microphone, according to an embodiment.

Referring now to FIG. 84, according on one embodiment a wireless push-to-talk switch 41000 can be used with a two-way radio 4975, according to an embodiment.

Wired push-to-talk switch 4100, wired speaker 4951, and wired microphone 4960 can be in wired electrical communication with radio 4975.

Pushing the button of the wireless push-to-talk switch 41000 causes the transmitter/transceiver 4210 (which can be a transmitter such as transmitter 41202 of FIG. 80) of the wireless push-to-talk switch 41000 to transmit a wireless signal to two-way radio 4975 so as to effect transmission of voice from microphone 4960 from the two-way radio.

Sidemount 49111 of two-way radio 4975 can comprise a receiver 41501 that receives the wireless signal from wireless push-to-talk switch 41000. The receiver 41501 can be in wired communication with the two-way radio 4975. Receiver 41501 communicates signals received from wireless push-to-talk switch 41000 to two-way radio 4975.

Figure 85:
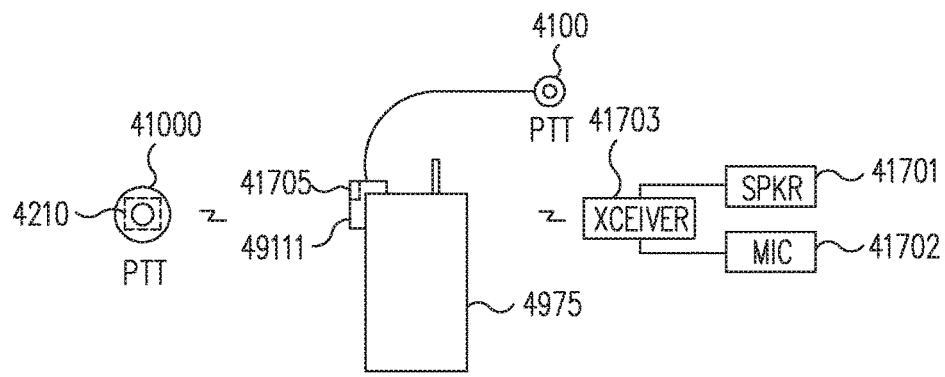
FIG. 85 is a block diagram of a two-way radio system having a wireless push-to-talk switch, a wired push-to-talk switch, a wireless speaker, and a wireless microphone, in which a single transceiver of the speaker and microphone facilitates wireless communications between the speaker and microphone and the two-way radio, according to an embodiment.

Referring now to FIG. 85, according to one embodiment, a wireless push-to-talk switch 41000 can be used with a two-way radio 4975, according to an embodiment. Wired push-to-talk switch 4100, wireless speaker 41701, and wireless microphone 41702 are in communication with two-way radio 4975.

Pushing the button of the wireless push-to-talk switch 41000 causes the transmitter/transceiver 4210 (which can be a transmitter such as transmitter 41202 of FIG. 81) of the wireless push-to-talk switch 41000 to transmit a wireless signal to two-way radio 4975 so as to effect transmission of voice from microphone 4960 from the two-way radio 4975.

Wireless speaker 41701 and wireless microphone 41702 can communicate with the two-way radio 4975 via a dedicated transceiver 41703 that can be separate from transmitter/transceiver 4210.

Sidemount 49111 of two-way radio 4975 can comprise a transceiver 41705 that receives the wireless signal from wireless push-to-talk switch 41000 and from transceiver 41703 and that also transmits signals to transceiver 41703. Thus, transceiver 41705 can receive signals representative of actuation/deactuation of wireless push-to-talk switch 41000 and can receive signals representative of voice from microphone 41702. Transceiver 41705 can also transmit signals representative of voice from two-way radio 4975 to speaker 41701. The transceiver 41705 can be in wired communication with the two-way radio 4975. Transceiver 41705 communicates signals received from wireless push-to-talk switch 41000 to two-way radio 4975.

Referring now to FIG. 86, according to one embodiment, a wireless push-to-talk switch 41000 can be used with a two-way radio 4975, according to an embodiment. A speaker 41802 and microphone 41803 can be in wired electrical communication with wireless push-to-talk switch 41000. Wired push-to-talk switch 4100 can be in wired communication with radio 4975.

Pushing the button of the wireless push-to-talk switch 41000 causes the transceiver 4210 of the wireless push-to-talk switch 41000 to transmit a wireless signal to two-way radio 4975, so as to effect transmission of voice from microphone 41803 via the two-way radio 4975. Thus, voice from microphone 41803 can be transmitted, such as by the same transceiver 4210. Alternatively, voice can be transmitted to the two-way radio 4975 by a different transmitter/transceiver from that with which the push-to-talk signal is transmitted to the two-way radio.

Sidemount 49111 of two-way radio 4975 can comprise a transceiver 41805 that receives the wireless signal from wireless push-to-talk switch 1000 and from the microphone 41803 and that provides a wired signal to two-way radio 4975 that effects transmission of two-way radio 4975. The transceiver 41805 can also transmit a signal representative of received voice to transceiver 4210 of wireless push-to-talk switch 41000 so as to facilitate listening to the voice via speaker 41802.

As those skilled in the art will appreciate, side mounts can contain impedance matching electronics and are commonly used to attach microphones, speakers, and push-to-talk switches to portable two-way radios.

Figure 87:
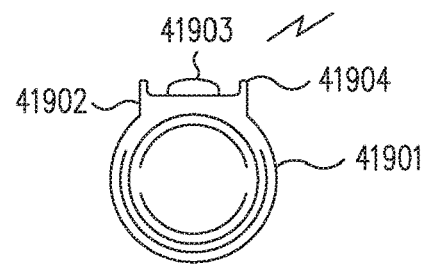
FIG. 87 is a side view of a wireless push-to-talk switch ring, according to an embodiment.

Referring now to FIG. 87, according to an embodiment, a wireless push-to-talk switch 41902 can be attached to a ring 41901, according to an embodiment. A button 41903 can effect actuation/deactuation of the wireless push-to-talk switch 41902. Protrusions or ridges 41904 can mitigate the occurrence of unintended actuation of wireless push-to-talk switch 41902, such as by bumping the ring 41901.

A police officer, for example, can discreetly actuate a two-way radio (to effect transmission thereof) without a suspect knowing that the two-way radio has been actuated. In this manner, voice from the police officer and nearby people is broadcast to the police dispatcher and other police officers.

Figure 88:
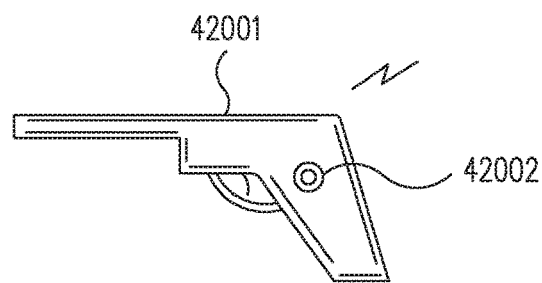
FIG. 88 is a side view of a firearm having a wireless push-to-talk switch, according to an embodiment.

Referring now to FIG. 88, according to an embodiment, a wireless push-to-talk switch 42002 can be attached to a firearm 42001, according to an embodiment. Such attachment of the wireless push-to-talk switch 42002 to the firearm 42001 can allow an officer to actuate the wireless push-to-talk switch discreetly and without removing a hand from the firearm.

Figure 89:
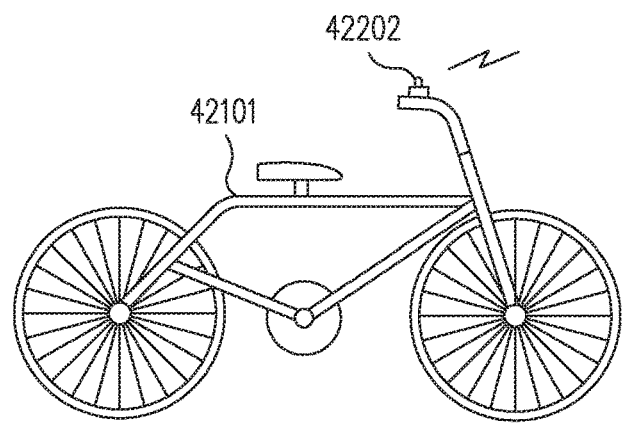
FIG. 89 is a side view of a bicycle having a wireless push-to-talk switch, according to an embodiment.

Referring now to FIG. 89, according to an embodiment, a wireless push-to-talk switch 42202 can be attached to a vehicle, such as a bicycle 42101, according to an embodiment. Such attachment of the wireless push-to-talk switch 42202 to a bicycle 42101 can allow a police officer, for example, to actuate the wireless push-to-talk switch discreetly and without removing a hand from the handlebars of the bicycle.

Figure 90:
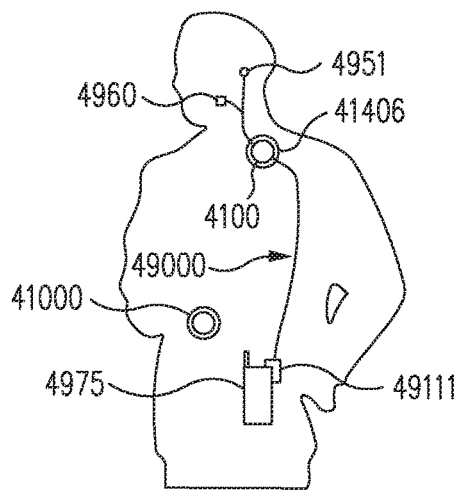
FIG. 90 is a front view of a person wearing a wireless push-to-talk switch and also wearing a wired push-to-talk switch, a wired speaker, and a wired microphone, according to an embodiment.

Referring now to FIG. 90, according to an embodiment, a wireless push-to-talk switch 41000 can be used with a wired speaker 4951, a wired microphone 4960, a wired push-to-talk switch 4100, and a two-way radio 4975, according to an embodiment. The wireless push-to-talk switch 41000 can be placed at any desired location on the person, clothing, equipment, vehicle, or any other item. A transmitter can be contained within the wireless push-to-talk switch 41000 as shown in FIGS. 63 and 80 or can be located outside of wireless push-to-talk switch 41000. A receiver that receives signals from the transmitter can be located in sidemount 49111, can be built into the two-way radio 4975, or can be at any other desired location.

The speaker 4951, microphone 4960, and wired push-to-talk switch 4100 can be operated as in the contemporary two-way radio system of FIG. 62. Use of the wireless push-to-talk switch 41000 adds flexibility by allowing the user to choose another place to effect transmission of the two-way radio 4975. The location of the wireless push-to-talk switch 41000 can be selected such that effecting transmission of the two-way radio via the wireless push-to-talk switch 41000 can be done discreetly.

Wired push-to-talk switch 4100 communicates with two-way radio 4975 via a wired connection through sidemount 49111 as is done according to contemporary practice. Wired push-to-talk switch 4100 will generally be placed at a different location with respect to wireless push-to-talk switch 41000.

Figure 91:
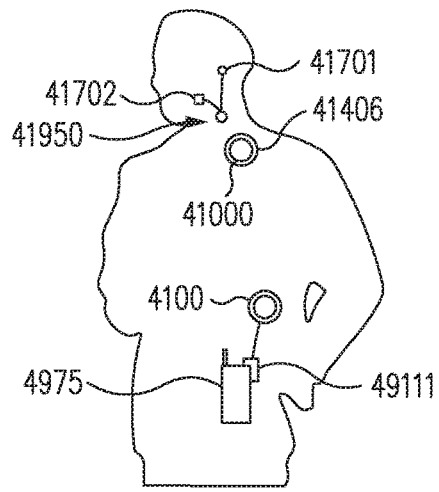
FIG. 91 is a front view of a person wearing a wireless push-to-talk switch and a wireless microphone-speaker assembly and also wearing a wired push-to-talk switch, according to an embodiment.

Referring now to FIG. 91, according to an embodiment, a wireless push-to-talk switch 41000 can be used with a wireless speaker 41701, a wireless microphone 41702, a wired push-to-talk switch 4100, and a two-way radio 4975, according to an embodiment. A transceiver 41950 facilitates communication of the wireless speaker 41701 and the wireless microphone 41702 with the two-way radio 4975. The transceiver 41950 can be disposed within a housing of the speaker 41701, within a housing of the microphone 41702, or in a separate, dedicated housing as shown.

A transceiver that receives signals from the transmitter of the wireless push-to-talk switch 41000 and from the transceiver 41950 and that transmits signals to the transceiver 41950 can be located in sidemount 49111, can be built into two-way radio 4975, or can be at any other desired location.

The use of a wireless push-to-talk switch with a wired push-to-talk switch can make it easier to discreetly use the wireless push-to-talk switch since a suspect will expect a police officer, for example, to use the wired push-to-talk switch.

Figure 92:
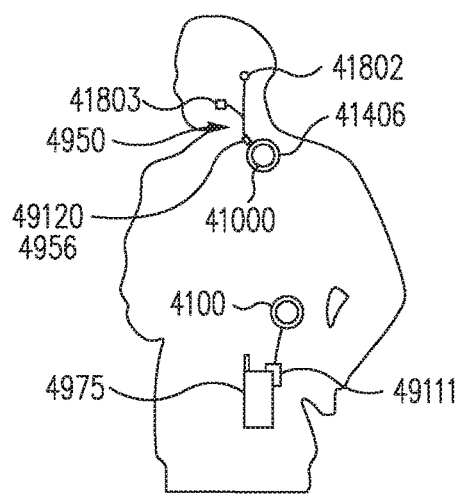
FIG. 92 is a front view of a person wearing a wireless push-to-talk switch-microphone-speaker assembly and also wearing a wired push-to-talk switch, according to an embodiment.

Referring now to FIG. 92, according to an embodiment a wireless push-to-talk switch 41000 can be used with a wireless speaker 41802, a wireless microphone 41803, a wired push-to-talk switch 4100, and a two-way radio 4975, according to an embodiment. A transceiver 4210 (FIG. 64) facilitates communication of the wireless speaker 41802, wireless microphone 41803, and the wireless push-to-talk switch 41000 with the two-way radio 4975. The transceiver 4210 can be disposed within a housing of the wireless speaker 41802, the wireless microphone 41803, or the wireless push-to-talk switch 41000.

In the embodiments of FIGS. 90-92, a receiver or a transceiver can be disposed within the sidemount 49111 to facilitate communication with the wireless speaker 41701 or 41802, wireless microphone 41702 or 41803, and the wireless push-to-talk switch 41000.

The receiver of the two-way radio that receives a signal representative of actuation/deactuation of the wireless push-to-talk switch and/or representative of voice from the wireless microphone can be a separate receiver from that used in conventional radio communications by the two-way radio or can be the same receiver used in conventional radio communications by the two-way radio. Similarly, the transmitter of the two-way radio that transmits a signal representative of voice to the wireless speaker can be a separate transmitter from that used in conventional radio communications by the two-way radio or can be the same transmitter used in conventional radio communications by the two-way radio.

Embodiments of the wireless push-to-talk switch can be attached to any desired part of a person, a person's clothing, a person's equipment, a vehicle or any other desired object. For example, embodiments of the wireless push-to-talk switch can be attached to a lapel, a badge, a shirt pocket, a belt, a pistol, a pistol holster, a baton, a mace or pepper spray dispenser, a flashlight, a Taser®, or a ring.

In many instances, the wireless push-to-talk switch can be integrated with, built into, or permanently attached to an object. For example, embodiments of the wireless push-to-talk switch can be built into a badge, a pistol, a pistol holster, a baton, a mace or pepper dispenser, a flashlight, a Taser®, or a ring.

Embodiments can include any number or combination of wireless push-to-talk switch, wireless microphone, wireless speaker, wired push-to-talk switch, wired microphone, and wired speaker.

Embodiments can include push-to-talk switches, microphones, and/or speakers that are both wired and wireless. That is, a single push-to-talk switch, microphone, and/or speakers can be both wired and wireless. Such wired/wireless push-to-talk switches, microphones, and/or speakers can provide redundancy that can be important in critical application such as police work, firefighting, and warfare.

The receiver for the wireless push-to-talk switch, wireless microphone, and/or wireless speaker can be in the two-way radio, attached to the two-way radio, or in any other desired location. For example, the receiver for wireless push-to-talk switch can be in a side mount that is attached to and in wired communication with the two-way radio. The receiver for the wireless push-to-talk switch, wireless microphone, and wireless speaker can receive electrical power from the two-way radio or from a dedicated battery, such as a battery contained within the receiver.

Wireless communication between the wireless push-to-talk switch, wireless microphone, and/or wireless speaker and the receiver can, for example, use radio waves, infrared radiation, ultrasound, or any other desired type of signal. The use of radio waves can include the use of amplitude modulation, frequency modulation, spread spectrum (direct sequence, frequency hopping, redundant channel, for example), Bluetooth®, WiFi® or any other desired system.

Embodiments of the wireless push-to-talk system can include cables (such as those associated with wired push-to-talk switch, wired microphone, and wired speakers) or can eliminate the use of such cables. The elimination of such cables has several advantages, as discussed below.

According to one or more embodiments, the cable associated with a contemporary stand alone push-to-talk switch is eliminated. Elimination of the cable enhances the convenience associated with use of a two-way radio by simplifying the user's dressing and undressing. There is no cable to route and attach to the clothing.

Elimination of the cable also eliminates a potential source of snagging, since the cable can no longer get caught on tree branches, bushes, and the like. The snagging of a cable can endanger the safety of a police officer, firefighter, or military personnel.

Elimination of the cable further eliminates a potential for malfunction of the two-way radio since the cable is no longer used. As those skilled in the art will appreciate, cables are often the source of problems associated with the use of two-way radios. Cables, particularly the connectors thereof, are undesirably susceptible to having the conductors thereof open and/or short in a manner that inhibits usage of a two-way radio.

Further, according to one or more embodiments, the push-to-talk switch can be actuated discretely. In this manner, a conversation can be transmitted without another person being aware that the conversation is being transmitted. For example, a police officer can transmit the conversation to the dispatcher and/or other police officers without a suspect knowing that the conversation is being transmitted since the police office does not have to key the microphone of the two-way radio to effect the transmission.

More than one wireless push-to-talk switch can be used with a single two-way radio. More than one wired push-to-talk switch can also be used with a single two-way radio. For example, a user can have one wireless push-to-talk switch on the user's belt, another wireless push-to-talk switch on the handle of the user's pistol, and a wired push-to-talk switch on the lapel. Thus, any desired number and combination of wireless push-to-talk and wired push to talk switches can be use with a single two-way radio.

Use of the wireless push-to-talk switch can be particularly beneficial when an embodiment is attached to an item that is better operated (at least at some times) with two hands. For example, the wireless push-to-talk switch can be attached to the steering wheel of an automobile, bicycle handlebars, a pistol, or a rifle. In this manner, the item can be operated better, e.g., more effectively, more efficiently, and/or more safely.

One or more embodiments provide a speaker that is substantially resistant to damage, a microphone that is less susceptible to picking up unwanted noises, and an acoustic tube that is comparatively inconspicuous. One or more embodiments can accommodate a variety of different types of electronic devices, such as cellular telephones and music devices. One or more embodiments can provide a push-to-talk switch having a button that is substantially easier to operate, particularly in emergency situations. One or more embodiments can provide a push-to-talk switch that has a wireless connection to the cable assembly (and consequently to the two-way radio).

Figure 93:
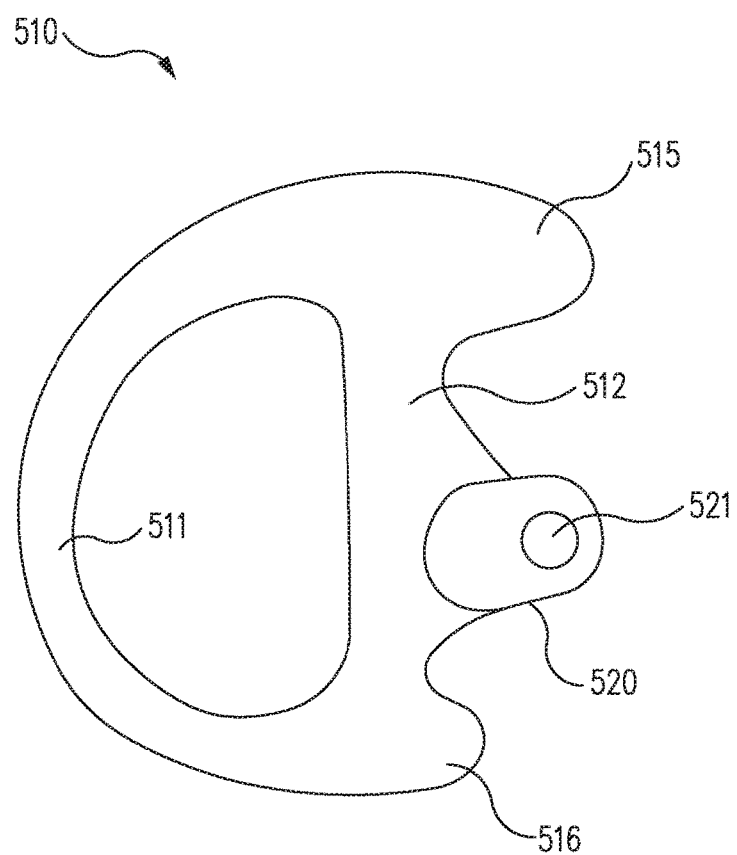
FIG. 93 is a side view of the inboard (toward the head) side of a contemporary left earpiece having a lower lobe (the opposite or outboard side being substantially the same as the inboard side, but lacking the protrusion that goes into the ear), according to an embodiment.

Referring now to FIG. 93, a contemporary earpiece 510 comprises a generally arcuate rib 511 and a generally vertical rib 512. An upper lobe 515 (e.g., also referred to as a top lobe) is formed at the top, near where the generally arcuate rib 511 and the generally vertical rib 512 intersect. Similarly, a lower lobe 516 (e.g., also referred to as a bottom lobe) is formed at the bottom, typically near where the generally arcuate rib 511 and the generally vertical rib 512 intersect. This lower lobe 516 is captured between the tragus 5505 and the antitragus 5504, while the top lobe is captured by the crus 5506 of the helix 5507 and the antihelix 5510 (see FIG. 98). A protrusion 520 (also referred to as a stem) extends away from the generally vertical rib 512 and is configured to enter the ear canal 5509. A bore 521 formed in the protrusion 520 transmits sound to a point proximate the eardrum. Acoustic tubing attaches to the contemporary earpiece 510 such that a generally contiguous sound channel is formed by the acoustic tubing and bore 521.

In many instances, the generally arcuate rib 511 can be too large for the concha. In such instances generally arcuate rib 511 bends and thereby urges lower lobe 516 against the ear. The pressure of lower lobe 516 against the ear as it presses between the tragus 5505 and the antitragus 5504 can cause discomfort. During extended wear, this generally constant pressure can become substantially painful. It can result in tissue damage that can cause further pain. Infection can even result.

It has previously been thought that lower lobe 516 was necessary to maintain an earpiece, such as contemporary earpiece 510, securely within the wearer's ear. However, as discussed herein, the present disclosure provides various embodiments in which an earpiece may be provided that lacks the lower lobe, yet remains securely within the wearer's ear even during intense physical activity.

Figure 94:
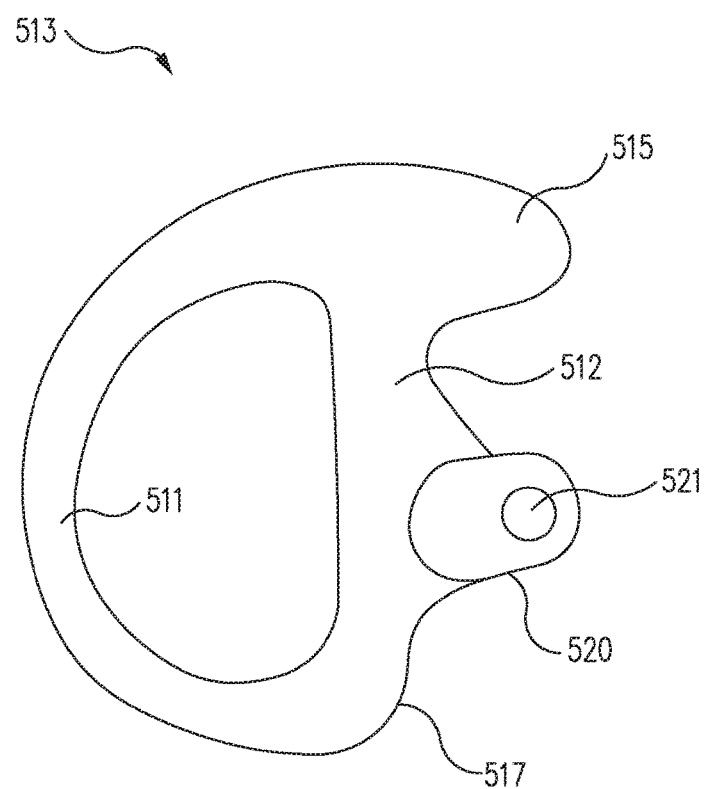
FIG. 94 is a side view of the inboard side of a left earpiece that has a smooth bend where the lower lobe of a contemporary earpiece is located and thus substantially lacks the lower lobe, according to an embodiment.
Figure 95:
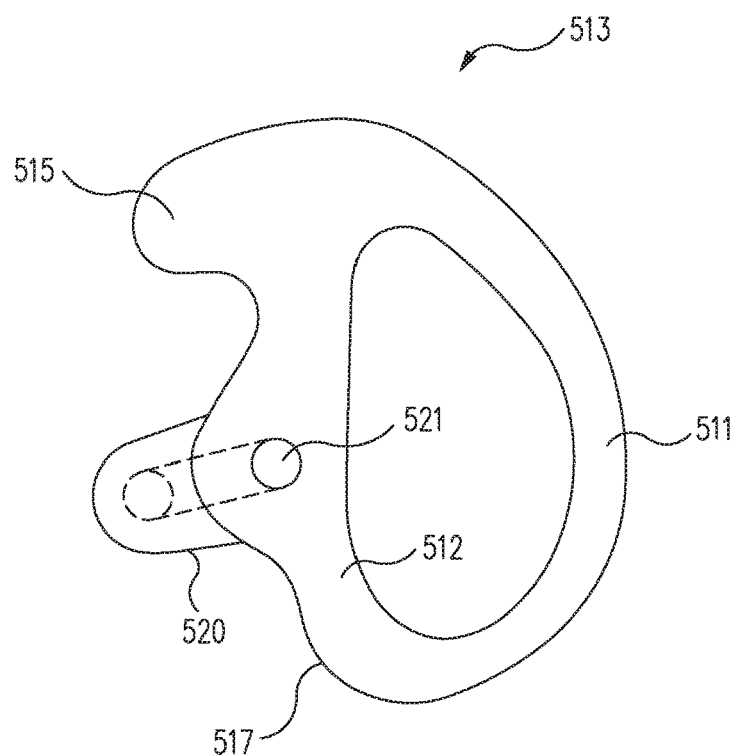
FIG. 95 is a side view of the outboard side of the left earpiece of FIG. 94, showing the bore in dashed lines, according to an embodiment.
Figure 96:
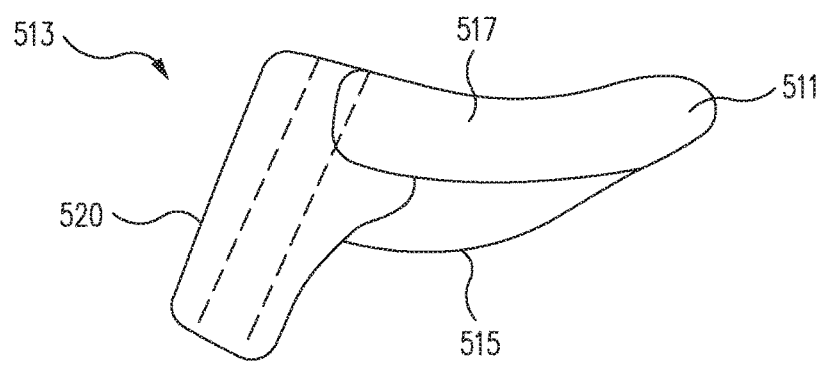
FIG. 96 is a bottom view of the left earpiece of FIG. 94, showing the bore in dashed lines, according to an embodiment.

Referring now to FIGS. 94-96, according to one or more embodiments, an earpiece 513 may be provided wherein the lower lobe (such as lower lobe 516 of the contemporary earpiece 510 of FIG. 93), is omitted. Rather, instead of such a lower lobe, a smooth rounded surface 517 (e.g., a smooth bend) may be provided in earpiece 513. The smooth rounded surface 517 does not extend substantially away from the intersection of the generally arcuate rib 511 and the generally vertical rib 512 in the manner that a lower lobe does, and thus does not extend substantially into the space between the tragus 5505 and the antitragus 5504.

According to an embodiment, when earpiece 513 is used in an ear where the generally arcuate rib 511 is too large for the ear (does not fit within the concha without substantial deformation), the generally arcuate rib 511 merely bends or collapses without adverse affect. Since there is no lower lobe, there is consequently no pressure on the antitragus 5504 and the tragus 5505, no rubbing, and no cause of discomfort.

Thus, in an exemplary embodiment the earpiece 513 can comprise a generally arcuate rib 511 having upper and lower ends, a generally vertical rib 512 extending substantially between the upper and lower ends, and an upper lobe 515 formed at the upper end of the generally arcuate rib 511. A smooth rounded surface 517 can be formed at the lower end of the generally arcuate rib 511. The earpiece 513 can be configured to be generally shaped like a D. However, those skilled in the art will appreciate that other embodiments are likewise suitable. For example, either the generally vertical rib 512 or the generally arcuate rib 511 can be modified substantially or omitted.

The earpiece 513 can further comprise a protrusion 520 having a bore 521 formed therethrough. The protrusion 520 can be configured to extend at least partially into the ear canal 5509. The bore can transmit sound, such as from a two-way radio, to the wearer's eardrum.

The earpiece 513 can be formed of a resilient polymer. For example, in one embodiment, the earpiece 513 can be formed of a resilient polymer having a Shore A durometer of between 35 and 45. More particularly, the earpiece 513 can be formed of a resilient polymer having a Shore A durometer of approximately 40. Alternatively, in another embodiment, the earpiece 513 can be formed of a more rigid material.

In various exemplary embodiments, the generally arcuate rib 511 can bend to accommodate a wide range of ear sizes. For example, the generally arcuate rib 511 can collapse so as to accommodate a range of ear sizes. Such collapsing of the earpiece 513 is made substantially more comfortable by the lack or partial lack of the lower lobe. That is, as the generally arcuate rib 511 collapses, there is no lower lobe or not enough lower lobe to torque, twist, bend, or otherwise move or deform in a manner that can cause discomfort.

One embodiment of the earpiece 513 can be configured to fit at least extra large sized ears. Similarly, one embodiment of the earpiece 513 can be configured to fit at least extra large sized ears and large sized ears. Moreover, a single embodiment of the earpiece 513 can be configured to fit most adult ears. For example, the earpiece 513 can be configured to fit at least 70% of ears of men between 19 and 40 years old. Bending of the generally arcuate rib 511 and lack of the lower lobe cooperate to facilitate the fitting of such a large range of sizes.

At least one embodiment comprises a portable communication system comprising a radio and also comprising earpiece 513 having a smooth rounded surface 517 instead of a lower lobe, as described above. Further, one or more embodiments can be used in applications other than security, law enforcement, and military applications. For example, one or more embodiments can be used with cellular telephones, portable music devices (such as iPods®, CD players, MP3 players, cassette players, or other types), and other mobile devices. In such applications, a speaker can be in acoustic communication with the bore 521 of the earpiece 513 via acoustic tubing or the like. Alternatively, a speaker can be attached directly to the earpiece 513, such as by mounting the speaker to the earpiece 513 or by placing the speaker inside or partially inside of the earpiece 513.

The earpiece 513 can also be used as a sound attenuating earplug, such as by configuring the protrusion 520 to seal or partially seal the ear. Alternatively, a member that seals or partially seals the ear can be added to the earpiece 513.

Since less material is used (because a portion of the earpiece 513 is reduced in size or eliminated), the earpiece 513 can be less expensive to manufacture. Since such earpieces 513 may be frequently purchased in bulk, such cost savings can be substantial. Further, since a single earpiece 513 fits a greater range of ear sizes, fewer earpieces 513 need to be inventoried by law enforcement departments and the like. Such reduction in inventory may save such agencies substantial money.

Figure 97:
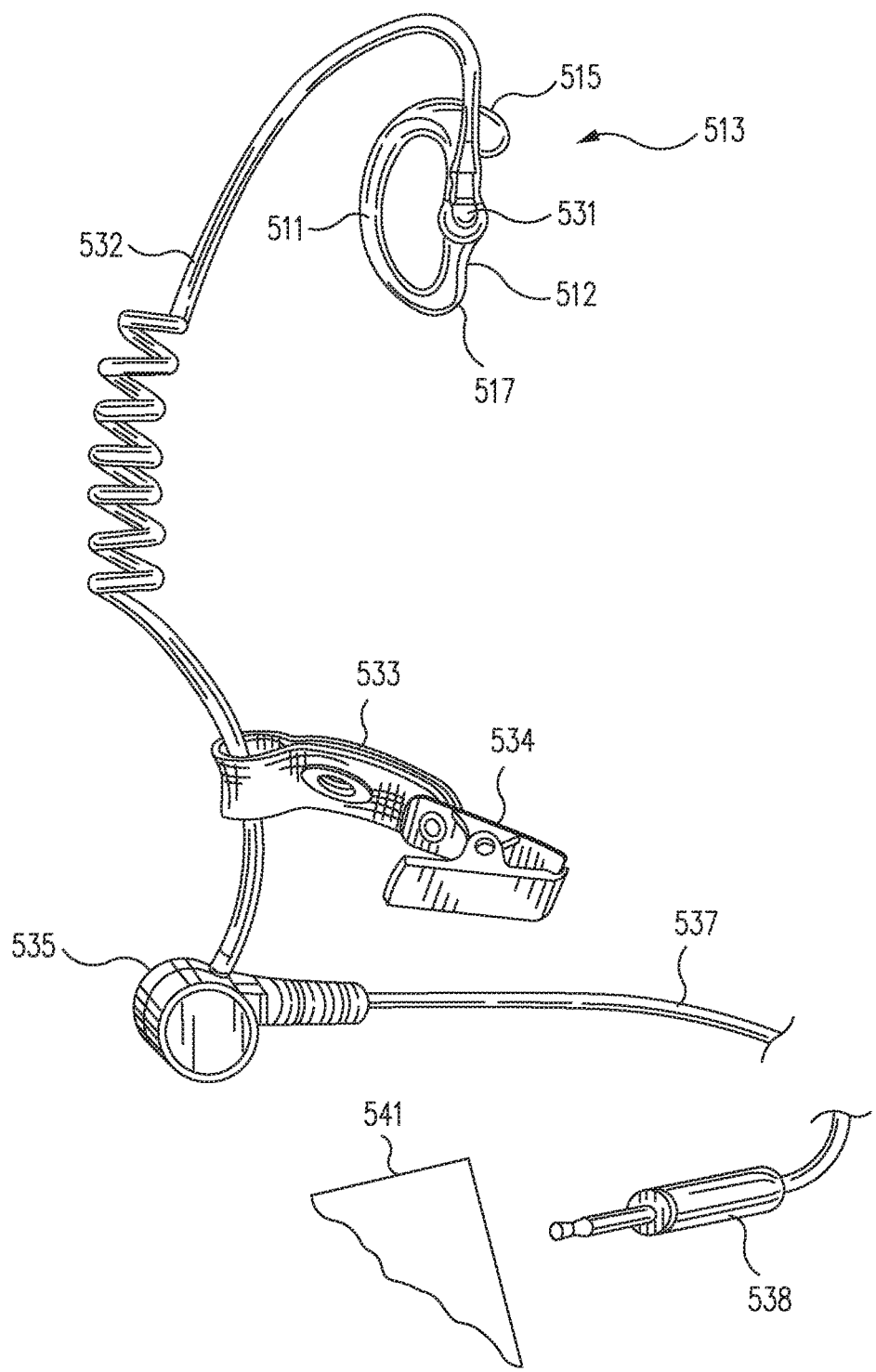
FIG. 97 is a perspective view of the left earpiece of FIGS. 94-96 attached to acoustic tubing via a barbed fitting and having a speaker also attached to the acoustic tubing, wherein the speaker has a plug for attachment to a two-way radio, according to an embodiment.

Referring now to FIG. 97, the earpiece 513 can be attached to acoustic tubing 532, such as via a barbed fitting 531. A strap 533 can be used to secure acoustic tubing 532 to a wearer's clothing, such as via a clip 534. A speaker 535 converts electrical signals received via electrical cable 537 from a two-way radio 541 into sound that is transmitted to the eardrum via acoustic tubing 532 and via bore 521 (see FIGS. 94-96) of the earpiece 513. A plug 538 can be used to connect electrical cable 537 to two-way radio 541.

According to various embodiments, an earpiece assembly can have a flanged extension that is suitable for use as hearing protection, is suitable for facilitating listening to a two-way radio or the like, or is suitable for providing a combination of hearing protection and such listening. One or more embodiments can comprise a solid extension so as to substantially attenuate ambient sound. Alternatively, one or more embodiments can comprise a hollow or partially hollow extension to allow at least some ambient sound or sound from a radio to pass therethrough.

Referring now to FIG. 98, a left human ear or pinna 5500 typically has anatomical structures such as a cymba concha 5501, a concha bowl 5508, a ridge 5502 of the concha bowl 5508, a cavum concha 5503, an antitragus 5504, a tragus 5505, a helix 5507, a crus 5506 of helix 5507, and an antihelix 5510. The right pinna (not shown) is generally similar to the left pinna 5500 and can be substantially a mirror image thereof.

According to an embodiment, examples of grab points 1-7 are provided by at least some of the various anatomical structures of the pinna 5500. The grab points 1-7 and/or anatomical structures of the ear proximate the grab points 1-7 can grab or otherwise hold, capture, and/or maintain the earpiece 5111 (see FIG. 99, for example) within the pinna 5500, e.g., within the concha bowl 5508 thereof. For example, the grab points 1-7 can define detents, grabbers, locks, fingers, tabs, or other structures or features that engage the earpiece 5111 and mechanically limit undesirable movement of the earpiece 5111.

Thus, the grab points 1-7 can tend to resist movement of the earpiece 5111. More particularly, the grab points 1-7 can tend to resist movement of the earpiece 5111 that would result in separation of the earpiece 5111 from the pinna 5500. The grab points 1-7 can capture the earpiece 5111 substantially within the concha bowl 5508. The grab points 1-7 can tend to resist other movement of the earpiece 5111. For example, the grab points can tend to resist translational or rotational movement of the earpiece 5111 that would move the earpiece 5111 away from a desired position substantially within the concha bowl 5508. The earpiece 5111 can be configured to complement a portion of the pinna 5500, so as to facilitate the use of the grab points 1-7. For example, the earpiece 5111 can be substantially a mirror image of one or more portions of the pinna 5500.

Figure 99:
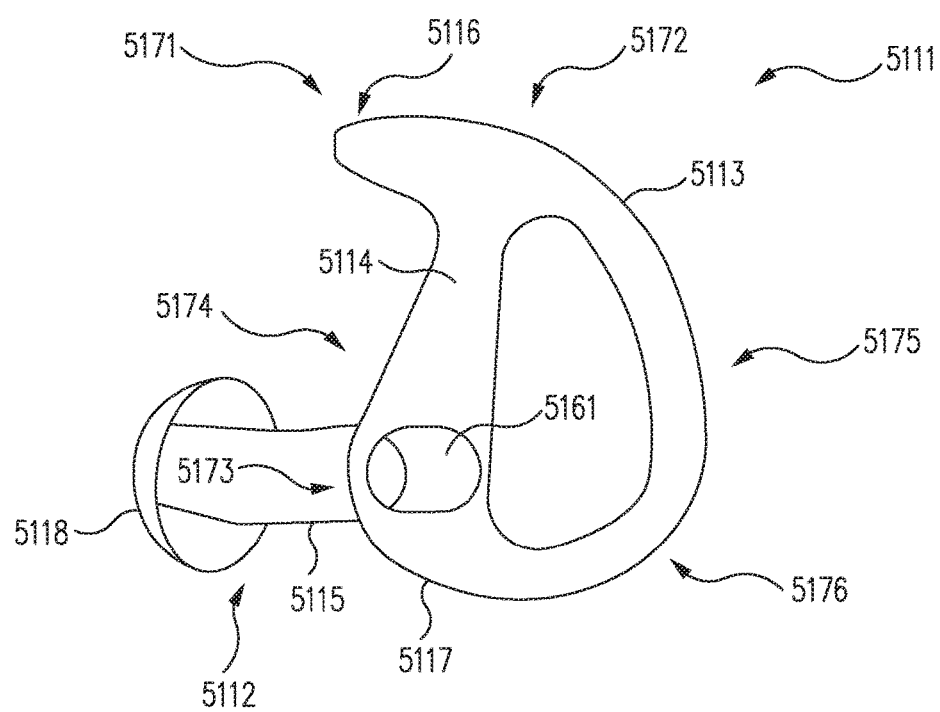
FIG. 99 is a perspective view of an earpiece having a flanged extension, according to an embodiment.
Figure 100:
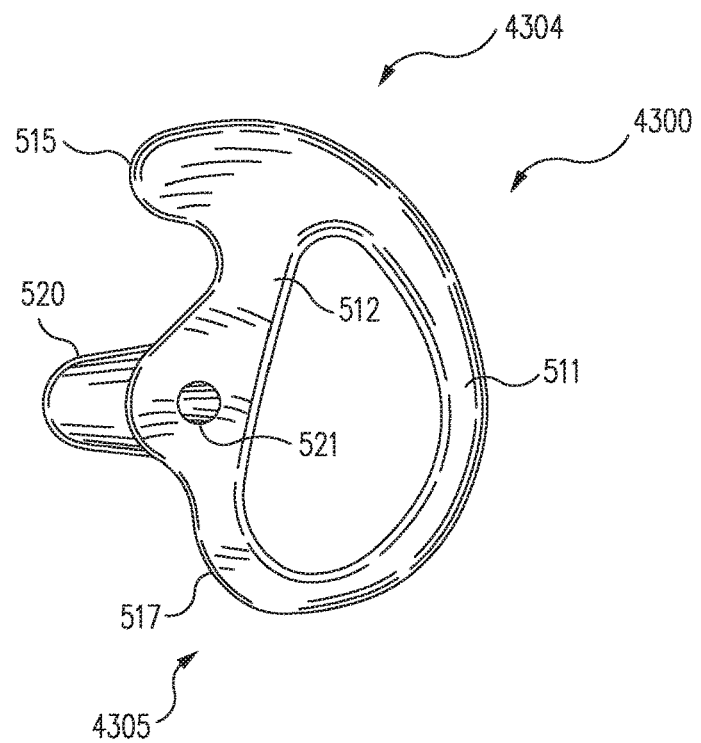
FIG. 100 is a side view of the outboard (away from the head) side of a left earpiece that lacks a lower lobe, according to an embodiment.
Figure 101:
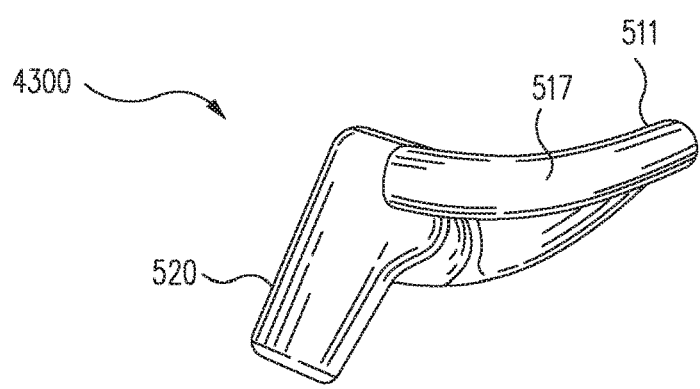
FIG. 101 is a bottom view of the left earpiece of FIG. 100, according to an embodiment.
Figure 102:
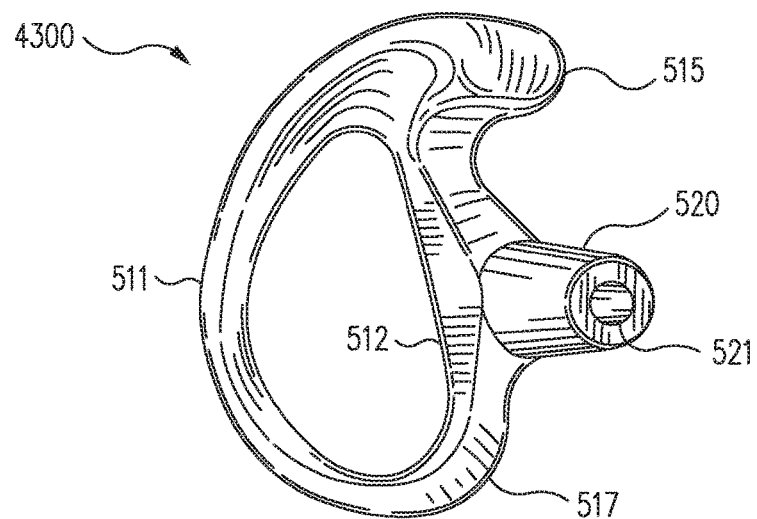
FIG. 102 is a side view of the inboard (toward from the head) side of the left earpiece of FIG. 100, according to an embodiment.
Figure 103:
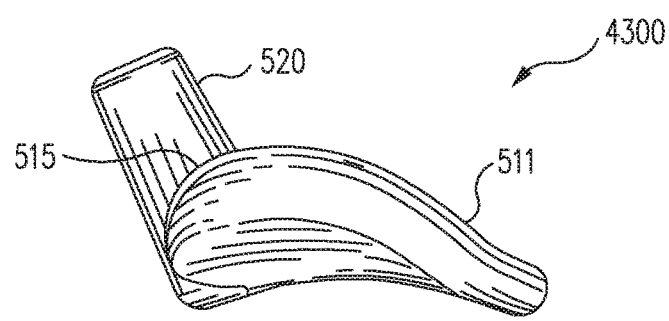
FIG. 103 is a top view of the left earpiece of FIG. 100, according to an embodiment.
Figure 104:
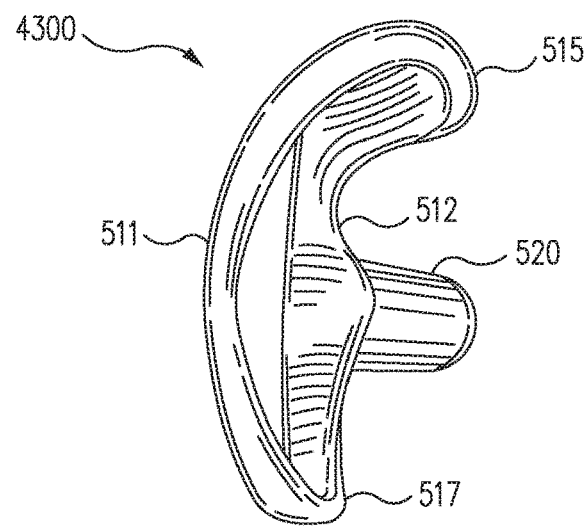
FIG. 104 is a back view of the left earpiece of FIG. 100, according to an embodiment.
Figure 105:
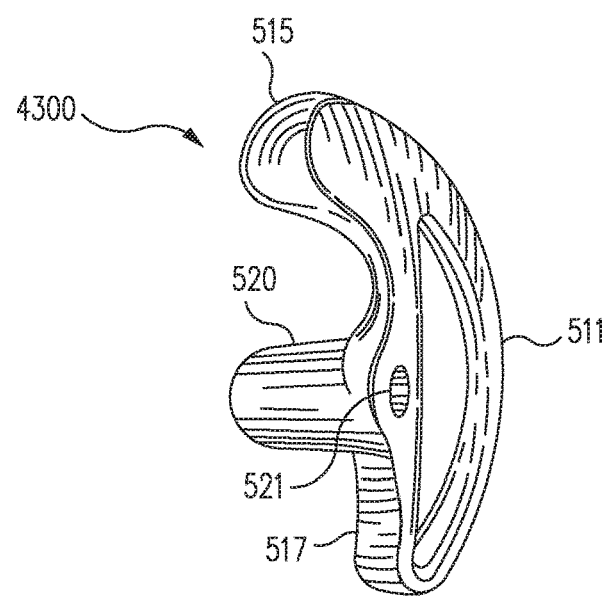
FIG. 105 is a front view of the left earpiece of FIG. 100, according to an embodiment.
Figure 106:
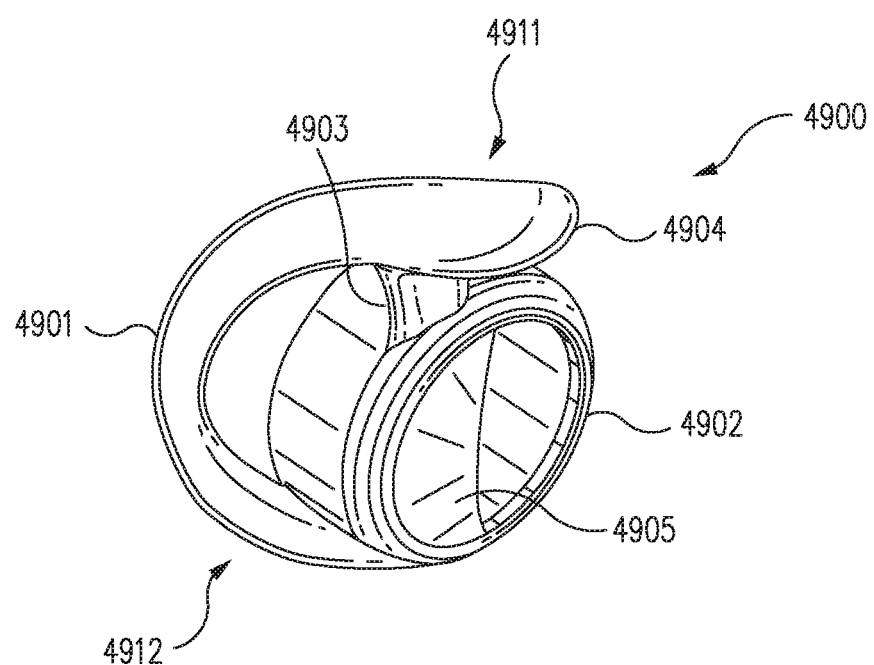
FIG. 106 is a front-left-bottom perspective view of an earpiece, according to an embodiment.
Figure 107:
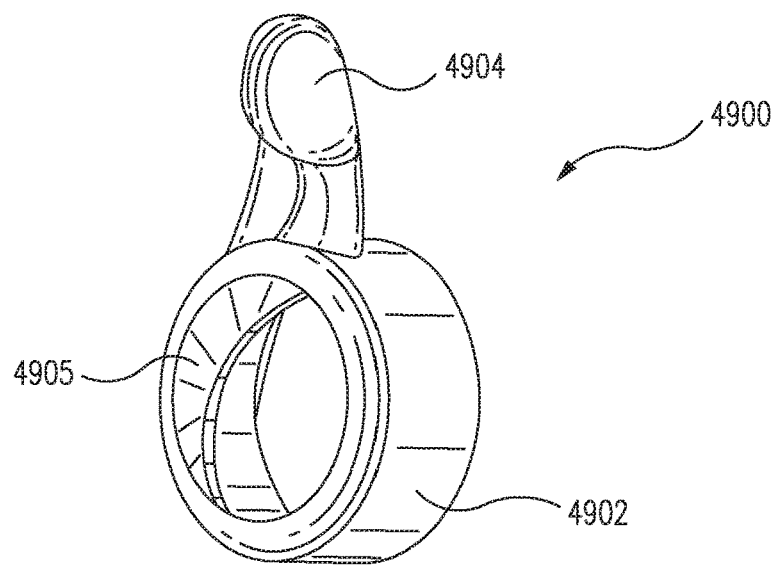
FIG. 107 is a front-left-top perspective view of the earpiece of FIG. 106, according to an embodiment.
Figure 108:
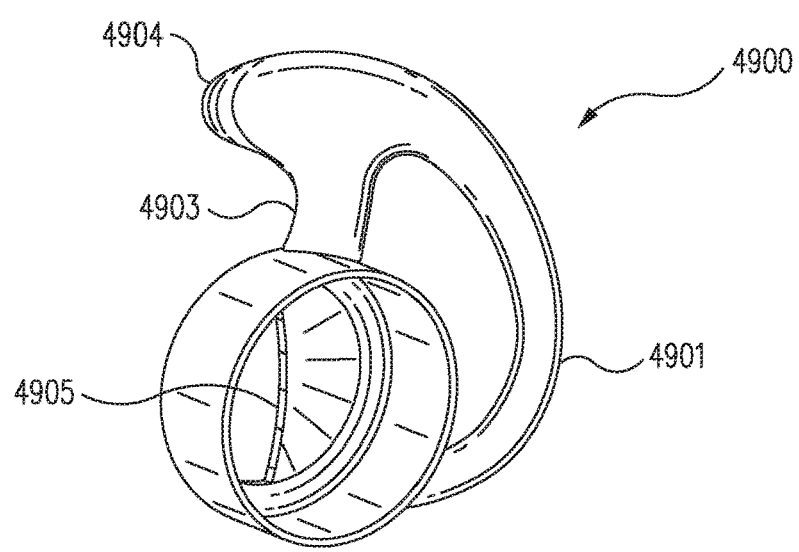
FIG. 108 is a rear-left-top perspective view of the earpiece of FIG. 106, according to an embodiment.
Figure 109:
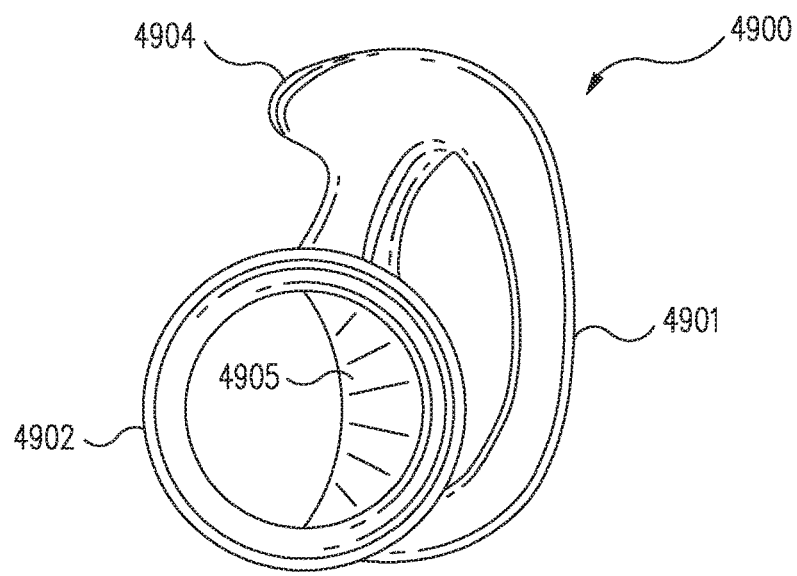
FIG. 109 is a rear plan view of the earpiece of FIG. 106, according to an embodiment.
Figure 110:
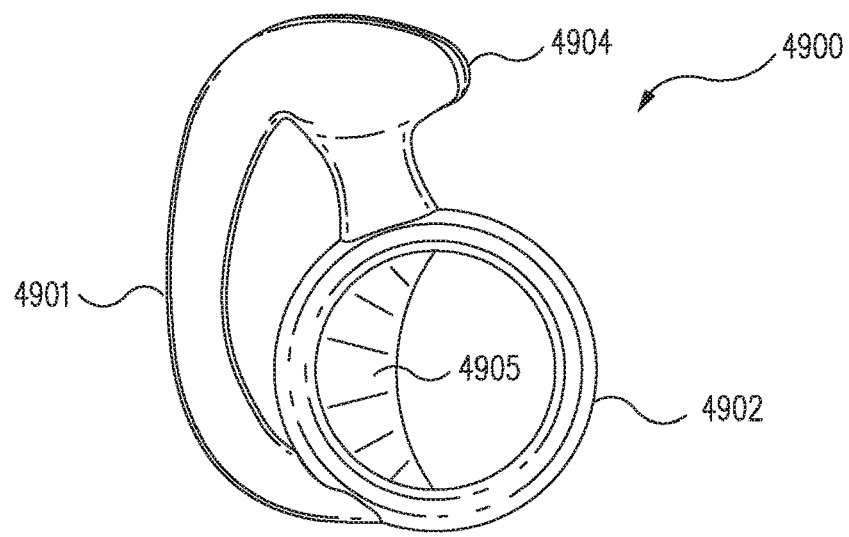
FIG. 110 is a front plan view of the earpiece of FIG. 106, according to an embodiment.
Figure 111:
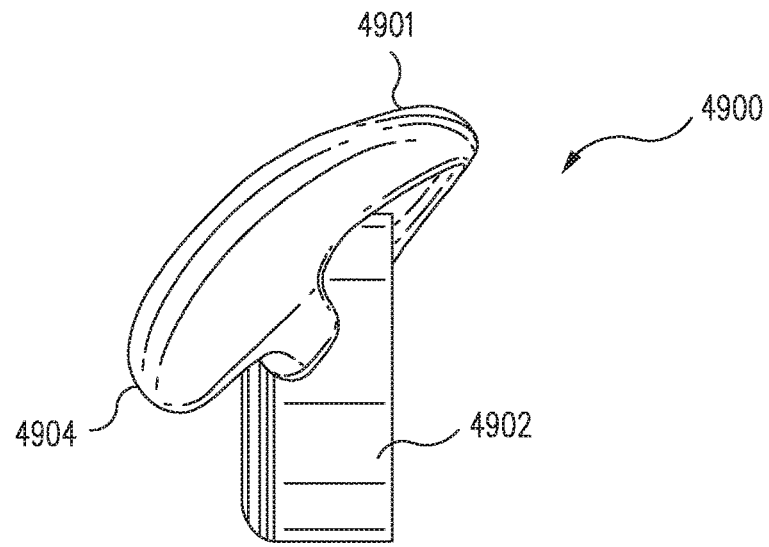
FIG. 111 is a left side elevation view of the earpiece of FIG. 106, according to an embodiment.
Figure 112:
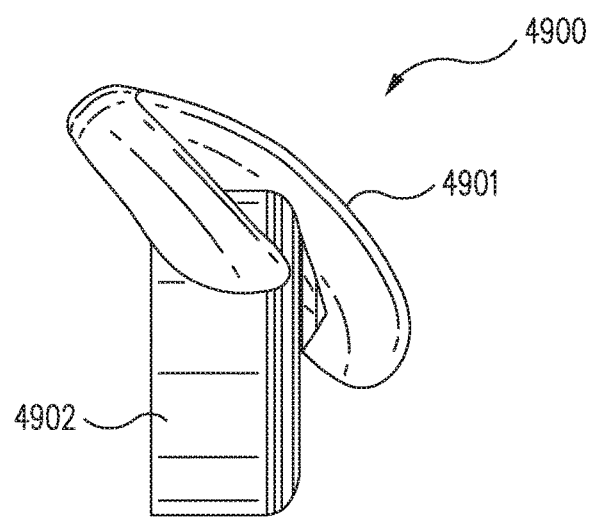
FIG. 112 is a right side elevation view of the earpiece of FIG. 106, according to an embodiment.
Figure 113:
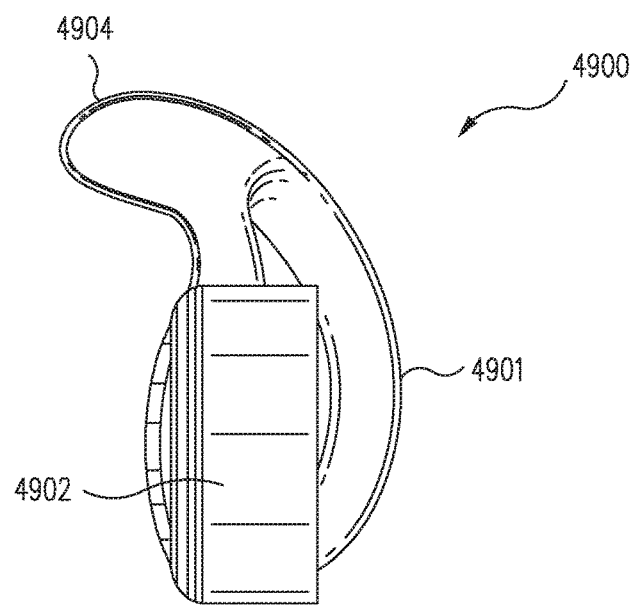
FIG. 113 is a top side elevation view of the earpiece of FIG. 106, according to an embodiment.
Figure 114:
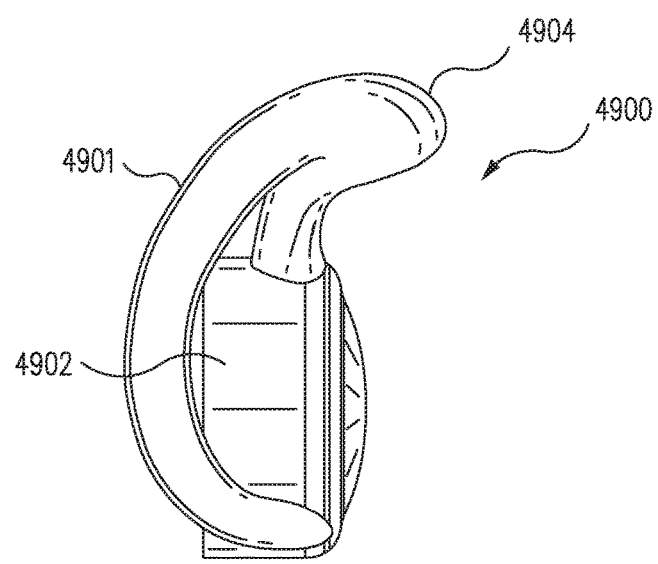
FIG. 114 is a bottom side elevation view of the earpiece of FIG. 106, according to an embodiment.
Figure 115:
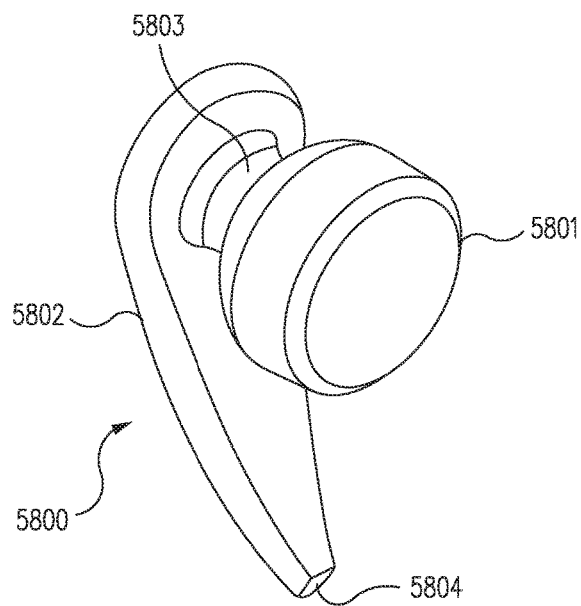
FIG. 115 is a front-left-top perspective view of an example of an attachment for the earpiece of FIG. 106, where the attachment may represent a portion of a communications cable, a wireless telecommunications device (e.g., a wireless audio headphone or a Bluetooth® headset with headphone and microphone), an audio headphone (e.g., an earbud), an earplug, or other type of device configured to mate with the earpiece, according to an embodiment.
Figure 116:
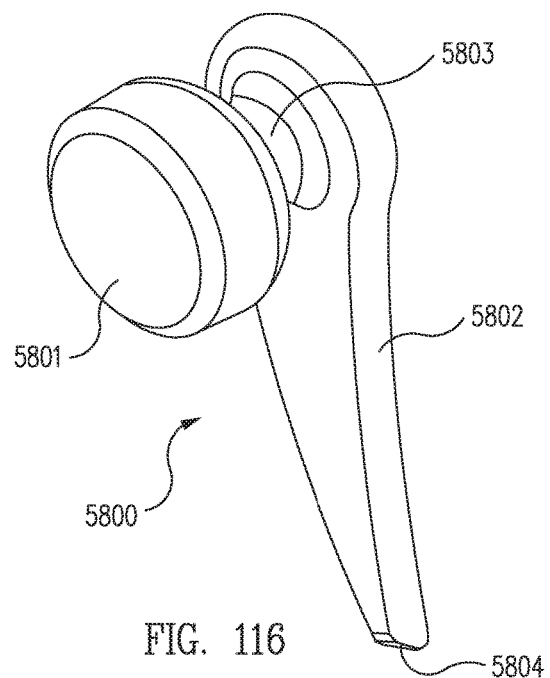
FIG. 116 is a front-right-top perspective view of the example attachment of FIG. 115, according to an embodiment.
Figure 117:
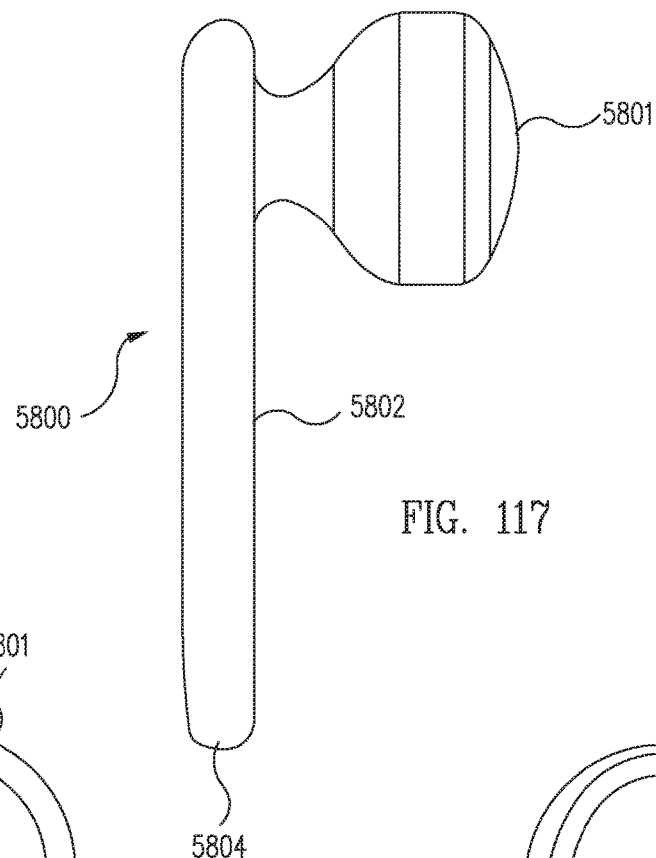
FIG. 117 is a left side elevational view of the example attachment of FIG. 115, according to an embodiment.
Figure 118:
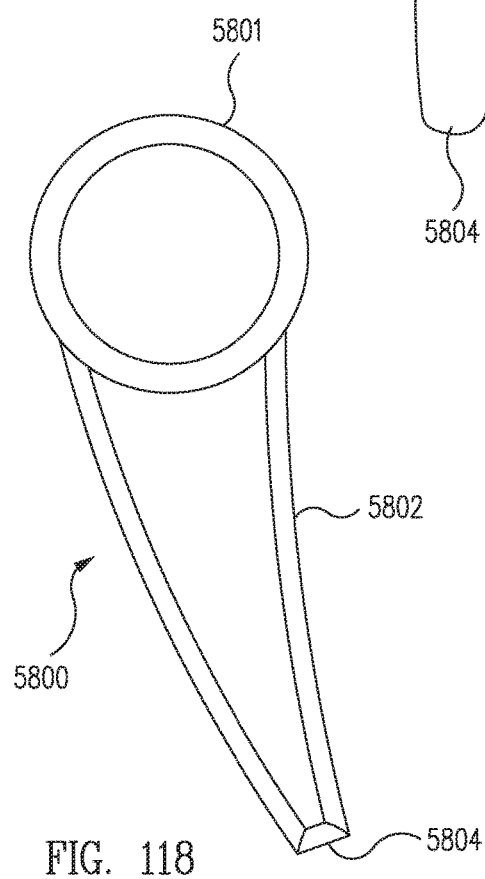
FIG. 118 is a front plan view of the example attachment of FIG. 115, according to an embodiment.
Figure 119:
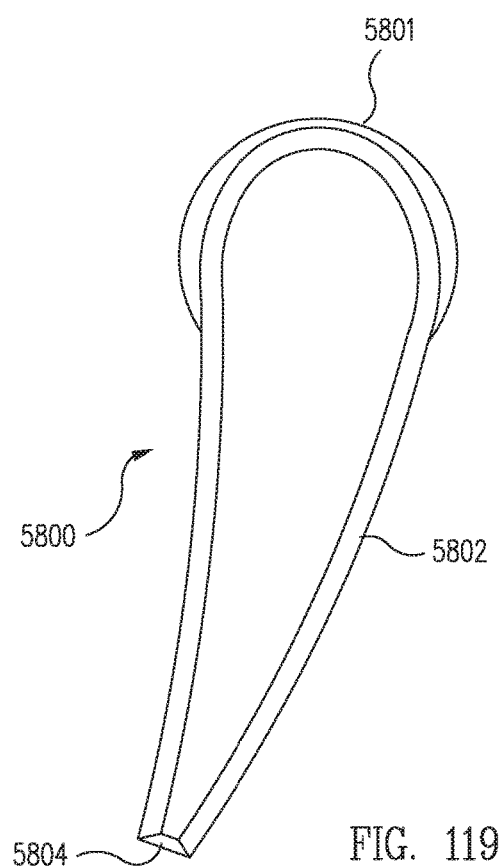
FIG. 119 is a rear plan view of the example attachment of FIG. 115, according to an embodiment.

As shown in FIG. 99, earpiece 5111 may include an extension 5112, a generally arcuate rib 5113, a generally vertical rib 5114, a stem 5115, an upper lobe 5116, a smooth curve 5117, a flange 5118, and an aperture 5161 (also referred to as an opening or a hole).

According to an embodiment, a first grab point 1 can be at a forward and uppermost end of the cymba concha 5501. A front, top portion 5171 (see FIG. 99) of the earpiece 5111 can be disposed underneath the ridge of the cymba concha 5501 and behind the helix 5507 just above the crus 5506 of helix 5507.

According to an embodiment, a second grab point 2 can be located where a top rim 5172 (see FIG. 99) of the earpiece 5111 fits snugly under or puts pressure against a top part of the ridge 5502 of the concha bowl 5508. According to an embodiment, a third grab point 3 can be the underneath lower portion 5173 (see FIG. 99) of the earpiece 5111 when the earpiece 5111 is placed within the concha bowl 5508. The lower portion 5173 of the earpiece 5111 can be captured beneath the crus 5506 of helix 5507. According to an embodiment, a middle front part 5174 (FIG. 99) of the earpiece 5111 can go over the crus 5506 of helix 5507 and slightly into the ear canal 5509 to define a fourth grab point 4 on top of and underneath the crus 5506 of helix 5507. According to an embodiment, a fifth grab point 5 can extend from where a top part of the cavum concha 5503 splits into the narrow flexible ring that forms itself to the backside of the concha bowl 5508. The fifth grab point 5 can grab the back side 5175 (see FIG. 99) of the earpiece 5111.

According to an embodiment, a sixth grab point 6 can be defined at the bottom of the pinna 5500. The sixth grab point 6 can grab the earpiece 5111 at the flare 5176 (FIG. 99) of the earpiece 5111. The flare 5176 can continue around to the underside of the antitragus 5504 and the rim of the outer portion of the ear canal 5509.

According to an embodiment, a seventh grab point 7 can be defined. The seventh grab point can be defined by the underside of the tragus 5505. The seventh grab point 7 can grab the lower portion 5173 of the earpiece 5111. According to some embodiments, a structure such as the top of the protrusion 520 (see FIGS. 94-96) and/or a structure such as the top of the extension 12, 242, or 5112, or stem 15 or 5115, can contact the ear proximate grab point 4 and/or a structure such as the bottom of the protrusion 520 and/or a structure such as the bottom of the extension 12, 242, or 5112, or stem 15 or 5115, can contact the ear proximate grab point 7.

According to various embodiments, additional grab points can be provided. For example, an eighth grab point (not shown) and a ninth grab point (not shown) can be provided within the ear canal 5509 by using an ergonomically shaped extension (such as extension 12, 242, or 5112) or stem (such as stem 15 or 5115). By use of the term ergonomic, it can be meant that the extension or stem substantially conforms to the direction of a first bend of the ear canal 5509. Thus, the extension or stem can slide into the ear canal 5509 more easily and can tend to center itself into the central portion of the ear canal 5509. The extension or stem can apply pressure to the bottom of the ear canal 5509 or to all of the ear canal 5509 so as to seal the ear canal 5509 and thus provide sound attenuation.

According to an embodiment, the extension or stem can be short and have no flanges. The extension or stem can push up against the top part of the ear canal 5509 to form yet another grab point. The ergonomic aspects of the extension or stem can keep an opening (such as from which sound is directed toward the ear drum) formed in the extension or stem generally centered within the ear canal 5509. Thus, the extension or stem can be configured such that the distal end of the extension or stem does not undesirably abut a wall of the ear canal 5509 in the manner that a straight earplug does.

In another embodiment, a further grab point may be provided by the tragus 5505 and the antitragus 5504. In this regard, in an embodiment where an earpiece (e.g., earpiece 510 of FIG. 93) is provided with a lower lobe (e.g., lower lobe 516 shown in FIG. 93), such a lower lobe may be positioned between the tragus 5505 and the antitragus 5504 which may press against the lower lobe to assist in holding the earpiece in place and resist movement thereof.

The configuration and size of the anatomical structures and features of the human ear can vary substantially from one individual to another. Not all of the described grab points will necessarily limit the motion of the earpiece 5111 in every instance. In some ears, only a portion of the grab points will limit the motion of the earpiece 5111. Other anatomical structures or features of the ear can function as grab points. Thus, the discussion and illustration of grab points is by way of example only, and not by way of limitation.

There is a common problem associated with the use of contemporary earplugs, whereby the earplugs can be pushed further and further into the ear canal 5509. Over time, as the earplugs are worn, the ear becomes desensitized to the presence of the earplugs. Because of this desensitization, a user can tend to push the contemporary earplugs further into the ear canal 5509 with each subsequent use. Of course, it is not desirable to push the earplugs further and further into the ear canal 5509. When pushed in too far, an earplug can cause substantial discomfort and damage to the eardrum.

According to an embodiment, the earpiece 5111 keeps the extension 5112 from being pushed past the second turn of the ear canal 5509. A contemporary earplug (which lacks the earpiece 5111) can be undesirably pushed past the second turn of the ear canal 5509 after the ear canal 5509 has become desensitized to the earplug, as discussed above.

Further, there are situations in which a person wearing earplugs is subjected to rapid compression. For example, the person can be descending while scuba diving, flying, or skydiving. In such situations, contemporary earplugs can be undesirably pushed further into the ear canal 5509, potentially to the point of contacting and/or damaging the eardrum.

According to various embodiments, the Hocks filter 51 (see FIG. 26) and/or the bore 22 (see FIG. 23) allow air to pass through the earpiece 5111 and/or the extension 5112. When air passes through the earpiece 5111 and/or the extension 5112, pressure within the ear canal 5509 can tend to equalize with respect to pressure outside of the ear canal 5509. Thus, the extension 5112 can be inhibited from being pushed further into the ear canal 5509 by such increasing external pressure. The earpiece 5111 also inhibits the extension 5112 from being pushed further into the ear canal 5509 by such increasing pressure, for example. According to an embodiment, the earpiece 5111 can be configured such that at least one grab point of an ear tends to hold the earpiece 5111 within the ear. More particularly, the earpiece 5111 can be configured such that the grab points are defined by anatomical structures as discussed.

Referring now to FIGS. 100-105, various views of an earpiece 4300 are shown, according to an embodiment. As with the embodiment of FIGS. 94-96, the lower lobe (such as lower lobe 516 of the earpiece 510 of FIG. 93), is omitted. Rather, instead of such a lower lobe, a smooth rounded surface 517 is provided.

The generally arcuate rib 511 can have an upper end 4304 and a lower end 4305. A generally vertical rib 512 can extend substantially between the upper end 4304 and the lower end 4305, and an upper lobe 515 can be formed at the upper end of the generally arcuate rib 511. A smooth bend 517 can be formed at the lower end of the generally arcuate rib 511. The earpiece can be configured to be generally shaped like a D. However, those skilled in the art will appreciate that other embodiments are likewise suitable. For example, either the generally vertical rib 512 or the generally arcuate rib 511 can be modified substantially or omitted.

Similar to the embodiment of FIGS. 94-96, the earpiece 4300 can further comprise a protrusion 520 having a bore 521 formed therethrough. The protrusion 520 can be configured to extend at least partially into the ear canal 5509. The bore 521 can transmit sound, such as from a two-way radio, to the wearer's eardrum. Alternatively, the bore 521 can be occluded or omitted so as to facilitate hearing protection.

FIGS. 106-122 show an earpiece 4900 and/or attachment 5800 (also referred to as an arm), according to various embodiments. FIGS. 106-114 show the earpiece 4900 without the attachment 5800. FIGS. 115-119 show the attachment 5800 without the earpiece 4900. FIG. 120-122 show the assembled earpiece 4900 and attachment 5800.

Referring now to FIGS. 106-114 and 120-122, an earpiece 4900 can comprise a generally arcuate rib 4901. Earpiece 4900 includes an upper lobe 4904. An upper end 4911 of the generally arcuate rib 4901 can be connected to a lower end 4912 of the generally arcuate rib 4901 via a generally vertical rib 4903 and/or annulus 4902. The annulus 4902 can have a cover 4905. The cover 4905 can be either partial, as shown, or can be substantially complete such that the cover substantially closes the annulus 4902. The cover 4905 can be formed on the inboard (toward the head) side of the annulus 4902 and/or on the outboard (away from the head) side of the annulus 4902. The annulus 4902 can be approximately centered with respect to the outer opening of the ear canal 5509.

Referring now to FIGS. 115-122, an attachment 5800 can be configured to mate with the earpiece 4900. For example, the attachment 5800 can have a generally cylindrical protrusion 5801 that is configured to be received within the annulus 4902 such that the attachment 5800 can rotate with respect to the earpiece 4900. The protrusion 5801 can define a male member and the annulus 4902 can define a female member.

The attachment 5800 can have a speaker. For example, the protrusion 5801 can either be a speaker and/or can contain a speaker. The attachment 5800 can have an extension 5802. The extension 5802 can be connected to the protrusion 5801 via a neck 5803, for example. The extension 5802 can be oriented, e.g., rotated, to extend generally downwardly from the earpiece 4900. The extension 5802 can have a microphone 5804 disposed proximate the distal end thereof.

The extension 5802 can be a portion of a communications cable, a wireless telecommunications device (e.g., a wireless audio headphone or a Bluetooth® headset with headphone and microphone), an audio headphone (e.g., an earbud), an earplug, or other type of device configured to mate with the earpiece.

The terms "stem," "protrusion," "extension," "insert," "ear insert," and the like can refer to a structure that protrudes from the earpiece and that can be configured to extend into the ear canal 5509.

One or more embodiments of the present invention provide an earpiece that is more comfortable, less costly, easier to inventory, and more effective with respect to contemporary earpieces.

Although described herein as being for use in human ears, one or more embodiments can also be used in non-human ears. For example, an embodiment can be configured for canine ears, to mitigate noise exposure and/or facilitate communication with police or military dogs. As those skilled in the art will appreciate, such dogs are commonly exposed to noisy environments, such as those environments sometimes encountered in police work and on the battlefield. Further, it is frequently desirable to communicate with such dogs. Their ability to respond to radio commands has been established.

Thus, one or more embodiments can mitigate noise exposure and/or facilitate communications. Noise exposure is mitigated by at least partially blocking the ear canal 5509 with an extension from an earpiece. Communications are facilitated by providing a passage for sound through the extension. The extension extends to a point proximate the eardrum so that sound is delivered more directly to the eardrum. Thus, less volume is needed. The use of less volume is useful in covert operations. As stated above, it may also facilitate the use of smaller, less powerful, and/or less expensive speakers.

In view of the foregoing, one or more embodiments can provide sound protection and/or communications facilitation in a manner that is comfortable, unobtrusive (and thus suitable for covert use), and effective. The earpiece is less likely to loosen or fall out as compared to contemporary earplugs. Positioning a sound output port close to the eardrum facilitates the use of lower electronic device volumes, while at the same time better assuring that communications are heard.

When using the cellular telephone cable assembly, the speaker can readily be heard because the earpiece delivers sound directly to the user's ear. Less extraneous noise is picked up by the microphone as compared to that which occurs when a cellular telephone is used as a speaker phone, because the microphone is positioned nearer to the user's mouth. Third parties cannot readily hear both sides of a conversation because the incoming portion of the conversation can be very low in volume since it is delivered directly to the user's ear.

Susceptibility to radio frequency interference is substantially eliminated and security is enhanced because a wireless connection between the cellular telephone and the microphone and speaker is not used.

Further, the cellular telephone cable assembly is less bulky, cumbersome, and inconvenient to use than contemporary headsets and their associated cable assemblies.

The term "sound" as used herein can refer to acoustic sound and can also refer to electrical or other signals that are representative of acoustic sound. Thus, it can be said that sound is communicated through the cable assembly, even when referring to electrical signals.

Embodiments described above illustrate, but do not limit, the invention. It should also be understood that numerous modifications and variations are possible in accordance with the principles of the present invention. Accordingly, the scope of the invention is defined only by the following claims.

What is claimed is:

1. A device comprising:
    an earpiece configured to fit within a concha of an ear, the earpiece comprising:
        a bendable rib having upper and lower ends configured to define a top rim of the earpiece proximate the upper end, wherein the top rim of the earpiece is configured to be captured by a top part of a concha bowl ridge of an ear to help secure the earpiece within the ear, and
        a lobe formed at the upper end of the bendable rib and extending therefrom to define a front top portion of the earpiece, wherein the front top portion of the earpiece is configured to be captured by a forward end of a cymba concha of the ear to help secure the earpiece within the ear; and an extension that extends from the earpiece adjacent to the lower end of the bendable rib and is configured to fit proximate an ear canal of the ear, wherein the bendable rib and the lobe of the earpiece are configured to hold the extension in place with respect to the ear canal and inhibit the extension from entering the ear canal beyond a desired position within the ear canal.

2. The device of claim 1, wherein:
the desired position within the ear canal is selected, at least in part, according to a length of the extension to be shallower than contact with an ear drum of the ear and deeper than or equal to half way through the ear canal, relative to the ear drum.

3. The device of claim 1, wherein:
the desired position of the extension within the ear canal is sufficiently deep within the ear canal to mitigate ambient sound reaching an ear drum of the ear.

4. The device of claim 1, wherein the extension has at least one flange formed thereon to help seal the ear canal and mitigate communication of sound through the ear canal.

5. The device of claim 1, wherein the extension comprises a bore and/or a filter configured to allow air to pass through the earpiece and/or the extension to help prevent an increasing external air pressure from pushing the extension into the ear canal beyond the desired position within the ear canal.

6. The device of claim 1, the earpiece further comprising a vertical structure coupled between the upper and lower ends of the bendable rib configured to help inhibit the extension from entering the ear canal beyond the desired position within the ear canal, wherein at least a portion of the extension is configured to extend from the vertical structure into the ear canal.

7. The device of claim 6, wherein the vertical structure and the extension are formed integrally.

8. The device of claim 1, wherein:
the earpiece comprises an aperture configured to receive the extension; and
the aperture is configured to position the extension substantially at a top of the ear canal, at a bottom of the ear canal, at one side of the ear canal, or at a center of the ear canal.

9. The device of claim 1, wherein the extension comprises a bore configured to facilitate communication of sound therethrough, the device further comprising:
a speaker attached to or coupled within the earpiece and/or an acoustic tube attached to the extension; and
a cable assembly attached to the speaker and configured to attach to a radio, a cellular telephone, or a music device.

10. A method comprising:
placing a bendable rib of an earpiece in a concha of an ear, the earpiece comprising:
a bendable rib having upper and lower ends configured to define a top rim of the earpiece proximate the upper end, wherein the top rim of the earpiece is configured to be captured by a top part of a concha bowl ridge of an ear to help secure the earpiece within the ear,
a lobe formed at the upper end of the bendable rib and extending therefrom to define a front top portion of the earpiece, wherein the front top portion of the earpiece is configured to be captured by a forward end of a cymba concha of the ear to help secure the earpiece within the ear; and
placing an extension extending from the earpiece adjacent to the lower end of the bendable rib into an ear canal of the ear, wherein the bendable rib and the lobe of the earpiece are configured to hold the extension in place with respect to the ear canal and inhibit the extension from entering the ear canal beyond a desired position within the ear canal.

11. The method of claim 10, wherein:
the earpiece further comprises a vertical structure coupled between the upper and lower ends of the bendable rib configured to help inhibit the extension from entering the ear canal beyond the desired position within the ear canal;
at least a portion of the extension is configured to extend from the vertical structure into the ear canal; and
the desired position within the ear canal is selected, at least in part, according to a length of the extension to be shallower than contact with an ear drum of the ear and deeper than or equal to half way through the ear canal, relative to the ear drum.

12. The method of claim 10, wherein:
the extension is configured to mitigate communication of sound through the ear canal to protect the ear drum of the ear from damage caused by the ambient sound.

13. The method of claim 10, wherein the extension comprises a bore and/or a filter configured to allow air to pass through the earpiece and/or the extension to help prevent an increasing external air pressure from pushing the extension into the ear canal beyond the desired position within the ear canal.

14. The method of claim 10, wherein the extension comprises a bore configured to facilitate communication of sound therethrough, the method further comprising:
attaching a speaker to or within the earpiece and/or to an acoustic tube attached to the extension; and
attaching a cable assembly to the speaker.

15. A method comprising:
providing an earpiece configured to fit in a concha of an ear, the earpiece comprising:
a bendable rib having upper and lower ends configured to define a top rim of the earpiece proximate the upper end, wherein the top rim of the earpiece is configured to be captured by a top part of a concha bowl ridge of an ear to help secure the earpiece within the ear,
a lobe formed at the upper end of the bendable rib and extending therefrom to define a front top portion of the earpiece, wherein the front top portion of the earpiece is configured to be captured by a forward end of a cymba concha of the ear to help secure the earpiece within the ear; and
attaching an extension to the earpiece adjacent to the lower end of the bendable rib such that the extension extends from the earpiece, wherein the bendable rib and the lobe of the earpiece are configured to hold the extension in place with respect to the ear canal and inhibit the extension from entering the ear canal beyond a desired position within the ear canal.

16. The method of claim 15, wherein:
the desired position within the ear canal is selected, at least in part, according to a length of the extension to be shallower than contact with an ear drum of the ear and deeper than or equal to half way through the ear canal, relative to the ear drum.

17. The method of claim 15, wherein:
the desired position of the extension within the ear canal is sufficiently deep within the ear canal to mitigate ambient sound reaching an ear drum of the ear.

18. The method of claim 15, wherein:
- the earpiece further comprises a vertical structure coupled between the upper and lower ends of the bendable rib configured to help inhibit the extension from entering the ear canal beyond the desired position within the ear canal; and
- at least a portion of the extension is configured to extend from the vertical structure into the ear canal.

19. The method of claim 18, wherein the vertical structure and the extension are formed integrally.

20. The method of claim 15, wherein the extension comprises a bore and/or a filter configured to allow air to pass through the earpiece and/or the extension to help prevent an increasing external air pressure from pushing the extension into the ear canal beyond the desired position within the ear canal.

* * * * *

UNITED STATES PATENT AND TRADEMARK OFFICE
CERTIFICATE OF CORRECTION

PATENT NO. : 10,440,459 B2
APPLICATION NO. : 15/333050
DATED : October 8, 2019
INVENTOR(S) : Richard C. Smith et al.

Page 1 of 2

It is certified that error appears in the above-identified patent and that said Letters Patent is hereby corrected as shown below:

In the Specification

In Column 1, Line 7, remove "Ser."

In Column 1, Line 8, remove "Ser."

In Column 1, Line 9, remove "Ser."

In Column 1, Line 10, remove "Ser."

In Column 1, Line 11, remove "Ser."

In Column 1, Line 12, remove "Ser."

In Column 1, Line 14, remove "Ser."

In Column 1, Line 15, remove "Ser."

In Column 1, Line 16, remove "Ser."

In Column 1, Line 18, remove "Ser."

In Column 1, Line 19, remove "Ser."

In Column 1, Line 20, remove "Ser."

In Column 1, Line 22, remove "Ser."

In Column 1, Line 24, remove "Ser."

Signed and Sealed this
Twenty-ninth Day of December, 2020

Andrei Iancu
*Director of the United States Patent and Trademark Office*

CERTIFICATE OF CORRECTION (continued)
U.S. Pat. No. 10,440,459 B2

In Column 1, Line 25, remove "Ser."

In Column 1, Line 27, remove "Ser."

In Column 1, Line 28, remove "Ser."

In Column 1, Line 29, remove "Ser."

In Column 1, Line 31, remove "Ser."

In Column 1, Line 33, remove "Ser."

In Column 1, Line 34, remove "Ser."

In Column 1, Line 35, remove "Ser."

In Column 1, Line 37, remove "Ser."

In Column 1, Line 38, remove "Ser."

In Column 1, Line 40, remove "Ser."

In Column 1, Line 41, remove "Ser."

In Column 1, Line 43, remove "Ser."

In Column 1, Line 45, remove "Ser."

In Column 1, Line 46, remove "Ser."

In Column 1, Line 48, remove "Ser."

In Column 16, Line 11, change "fainted" to "formed"